United States Patent
Zhang et al.

(10) Patent No.: US 12,165,366 B2
(45) Date of Patent: Dec. 10, 2024

(54) POINT CLOUD ENCODING METHOD AND DECODING METHOD USING ROTATION MATRIXES, ENCODER, AND DECODER

(71) Applicant: Huawei Technologies Co., Ltd., Shenzhen (CN)

(72) Inventors: Dejun Zhang, Shenzhen (CN); Bo Liu, Beijing (CN); Wei Hu, Beijing (CN); Wenhai Wu, Beijing (CN); Tian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/145,998

(22) Filed: Jan. 11, 2021

(65) Prior Publication Data
US 2021/0183110 A1    Jun. 17, 2021

Related U.S. Application Data

(63) Continuation of application No. PCT/CN2019/095884, filed on Jul. 12, 2019.

(30) Foreign Application Priority Data

Jul. 12, 2018    (CN) .......................... 201810766911.3

(51) Int. Cl.
*G06T 9/00*    (2006.01)
*G06T 3/60*    (2024.01)
(Continued)

(52) U.S. Cl.
CPC .................. *G06T 9/00* (2013.01); *G06T 3/60* (2013.01); *G06T 3/602* (2013.01); *G06T 9/001* (2013.01);
(Continued)

(58) Field of Classification Search
None
See application file for complete search history.

(56) References Cited

U.S. PATENT DOCUMENTS

| 9,767,598 B2 | 9/2017 | Winder |
| 11,328,450 B2 * | 5/2022 | Zhang ....................... G06T 9/00 |

(Continued)

FOREIGN PATENT DOCUMENTS

| CN | 102317973 A | 1/2012 |
| CN | 104298998 A | 1/2015 |

(Continued)

OTHER PUBLICATIONS

"Some linear transformations on R2" Fall 2013 lecture notes for MATH130 at Clark University found at: https://www2.clarku.edu/faculty/djoyce/ma130/lintrans2.pdf (Year: 2013).*

(Continued)

*Primary Examiner* — Tyler W. Sullivan
(74) *Attorney, Agent, or Firm* — Conley Rose, P.C.

(57) ABSTRACT

A point cloud decoding method related to the field of coding technologies and includes reconstructing a point cloud comprising one or more patches. The one or more patches comprise a current patch. The reconstructing process may include transforming coordinates (x2, y2) of a second point of the current patch in a second coordinate system to coordinates (x1, y1) of a first point of the current patch in a first coordinate system, where the coordinates (x1, y1) of the first point of the current patch in the first coordinate system may be obtained based on the coordinates (x2, y2) of the second point of the current patch in the second coordinate system and a transform matrix.

18 Claims, 14 Drawing Sheets

(51) Int. Cl.
  *G06T 3/602* (2024.01)
  *G06T 15/00* (2011.01)
  *H04N 19/20* (2014.01)
  *H04N 19/46* (2014.01)

(52) U.S. Cl.
  CPC ............. *G06T 15/00* (2013.01); *H04N 19/20* (2014.11); *H04N 19/46* (2014.11)

(56) References Cited

U.S. PATENT DOCUMENTS

| | | | |
|---|---|---|---|
| 11,651,523 B2 * | 5/2023 | Aflaki | H04N 19/85 382/242 |
| 11,699,248 B2 * | 7/2023 | Kuma | G06T 9/00 345/419 |
| 2010/0207936 A1 | 8/2010 | Minear et al. | |
| 2012/0206438 A1 | 8/2012 | Porikli et al. | |
| 2013/0215115 A1 | 8/2013 | Jenkins | |
| 2013/0321393 A1 | 12/2013 | Winder | |
| 2015/0070354 A1 | 3/2015 | Wu et al. | |
| 2017/0347120 A1 | 11/2017 | Chou et al. | |
| 2019/0197739 A1 * | 6/2019 | Sinharoy | G06T 9/00 |
| 2019/0311500 A1 * | 10/2019 | Mammou | G06T 9/001 |
| 2019/0355152 A1 | 11/2019 | Li et al. | |
| 2020/0013235 A1 * | 1/2020 | Tsai | H04N 19/597 |
| 2020/0014953 A1 * | 1/2020 | Mammou | H04N 19/17 |
| 2020/0074593 A1 * | 3/2020 | Wang | H04N 19/182 |
| 2020/0153885 A1 * | 5/2020 | Lee | G06T 15/04 |
| 2021/0176474 A1 * | 6/2021 | Kato | H04N 19/597 |
| 2021/0304443 A1 * | 9/2021 | Zhang | G06T 9/40 |
| 2021/0337237 A1 * | 10/2021 | Zakharchenko | H04N 19/70 |

FOREIGN PATENT DOCUMENTS

| | | |
|---|---|---|
| CN | 104424655 A | 3/2015 |
| CN | 107093201 A | 8/2017 |
| CN | 107403456 A | 11/2017 |
| CN | 107633539 A | 1/2018 |
| CN | 108235007 A | 6/2018 |
| CN | 110662087 A | 1/2020 |
| JP | 2016163342 A | 9/2016 |
| JP | 2019012431 A | 1/2019 |
| JP | 2020017946 A | 1/2020 |
| KR | 102473729 B1 | 12/2022 |
| WO | 2017126314 A1 | 7/2017 |
| WO | WO-2019199726 A1 * | 10/2019 ............. G06T 9/001 |
| WO | WO-2019234290 A1 * | 12/2019 ............. G06T 9/001 |

OTHER PUBLICATIONS

"Geometric Transformations" found at https://web.ma.utexas.edu/users/gilbert/M340L/LA05GeometricTrans.pdf (Year: 2013).*
Sebastian Schwarz(Nokia Technologies), Nokia's response to CfP for Point Cloud Compression (Category 2), International Organisation for Standardisation Organisation Internationale De Normalisation, Coding of Moving Pictures and Audio, ISO/IEC JTC1/SC29/WG11 MPEG2017/M41779, Oct. 2017, Macau, CN, 22 pages. XP030070121.
C. Guede(Technicolor) et al, Geometry image coding improvements, International Organisation for Standardisation Organisation Internationale De Normalisation, Coding of Moving Pictures and Audio, ISO/IEC JTC1/SC29/WG11 MPEG2016/ M42111, Jan. 2018, Gwangju, Korea, 15 pages1 XP030070453.
Anonymous, Rotation matrix, Wikipedia, Jul. 10, 2018, 22 pages.
Zhou, J., et al., "Trends and technologies of video coding," Telecommunications Science, 2017, 10 pages.
Mammou, K., "First Working Draft for PCC Category 2," Internatonal Organizaton for Standardization Organisaton Internatonale De Normalisaton, ISO/IEC JTC 1/SC 29/WG 11, Coding of Moving Pictures and Audio, ISO/IEC JTC1/SC29/WG11, MPEG 2012/N17374, Jan. 2018, Gwangju, Korea, 5 pages.
Wikipedia, "Rotation matrix" (published on Apr. 28, 2018), https://web.archive.org/web/20180428010630/https://en.wikipedia.org/wiki/Rotation_matrix, 21 pages.

* cited by examiner

POINT CLOUD ENCODING METHOD AND DECODING METHOD USING ROTATION MATRIXES, ENCODER, AND DECODER

CROSS-REFERENCE TO RELATED APPLICATIONS

This application is a continuation of International Patent Application No. PCT/CN2019/095884 filed on Jul. 12, 2019, which claims priority to Chinese Patent Application No. 201810766911.3 filed on Jul. 12, 2018. The disclosures of the aforementioned applications are hereby incorporated by reference in their entireties.

TECHNICAL FIELD

Embodiments of this application relate to the field of coding technologies, and in particular, to a point cloud encoding method, a point cloud decoding method, an encoder, and a decoder.

BACKGROUND

With continuous development of three-dimensional (3D) sensor (for example, 3D scanner) technologies, it is increasingly convenient to collect point cloud data, and the point cloud data is collected on an increasingly large scale. Therefore, how to effectively encode and decode the point cloud data becomes an urgent problem to be resolved.

SUMMARY

Embodiments of this application provide a point cloud encoding method, a point cloud decoding method, an encoder, and a decoder, to help improve point cloud coding performance.

According to a first aspect, an embodiment of this application provides a point cloud encoding method. The method includes acquiring a normal axis of a to-be-encoded patch in a to-be-encoded point cloud and description information of a minimum bounding rectangle corresponding to the to-be-encoded patch, where the normal axis of the to-be-encoded patch and the description information of the minimum bounding rectangle corresponding to the to-be-encoded patch are used to determine a tangent axis of the to-be-encoded patch and a bitangent axis of the to-be-encoded patch, and encoding a syntax element into a bitstream, where the syntax element is used to indicate the tangent axis of the to-be-encoded patch and the bitangent axis of the to-be-encoded patch, and the syntax element includes an index of the normal axis of the to-be-encoded patch and information used to indicate the description information of the minimum bounding rectangle corresponding to the to-be-encoded patch. In an example, the method may be performed by an encoder.

The minimum bounding rectangle corresponding to the to-be-encoded patch is a minimum bounding rectangle of a two-dimensional image (which is referred to as a pre-occupancy map hereinafter) obtained by pre-projecting the patch from a three-dimensional space to a two-dimensional space.

The description information of the minimum bounding rectangle corresponding to the patch is information used to describe the minimum bounding rectangle corresponding to the patch, and is further used to describe a side size (which may also be referred to as a two-dimensional size) of the minimum bounding rectangle.

Both the index of the normal axis of the to-be-encoded patch and the information used to indicate the description information of the minimum bounding rectangle corresponding to the to-be-encoded patch are patch-level information.

Optionally, the description information of the minimum bounding rectangle corresponding to the patch may include a relationship between sizes of sides of the minimum bounding rectangle corresponding to the patch.

Optionally, the information used to indicate the description information of the minimum bounding rectangle corresponding to the to-be-encoded patch may include an index of the relationship between sizes of sides of the minimum bounding rectangle corresponding to the to-be-encoded patch, or size information (or side size information) of the minimum bounding rectangle corresponding to the to-be-encoded patch.

In one aspect, the description information of the minimum bounding rectangle corresponding to the patch may reflect a pose of the patch. For example, the pose of the patch may be represented by whether an occupancy map obtained by mapping the patch from the three-dimensional space to the two-dimensional space is vertical or horizontal. In another aspect, whether an occupancy map of a patch of a same pose is vertical or horizontal affects a size of an occupancy map of a point cloud obtained by packing the occupancy map of the patch. Therefore, the tangent axis and the bitangent axis of the to-be-encoded patch are determined based on the normal axis of the to-be-encoded patch and the description information of the minimum bounding rectangle corresponding to the to-be-encoded patch. This is favorable to implementing that occupancy maps of patches are closely arranged in the occupancy map of the point cloud by adjusting an orientation (a vertical orientation or a horizontal orientation) of the occupancy map of the to-be-encoded patch, thereby helping perform image-/video-based encoding on a depth map and a texture map that are determined based on the occupancy map of the point cloud. That is, this can improve point cloud encoding performance, and further improve point cloud decoding performance.

In a possible design, the method may further include determining the tangent axis of the to-be-encoded patch and the bitangent axis of the to-be-encoded patch based on the normal axis of the to-be-encoded patch and the description information of the minimum bounding rectangle corresponding to the to-be-encoded patch, and projecting the to-be-encoded patch from the three-dimensional space to the two-dimensional space based on the tangent axis of the to-be-encoded patch and the bitangent axis of the to-be-encoded patch.

In a possible design, determining the tangent axis of the to-be-encoded patch and the bitangent axis of the to-be-encoded patch based on the normal axis of the to-be-encoded patch and the description information of the minimum bounding rectangle corresponding to the to-be-encoded patch may include determining, according to a projection rule, the tangent axis of the to-be-encoded patch and the bitangent axis of the to-be-encoded patch based on the normal axis of the to-be-encoded patch and the description information of the minimum bounding rectangle corresponding to the to-be-encoded patch, where the projection rule refers to distribution, in the two-dimensional space, of one or more occupancy map obtained by projecting one or more patches in the to-be-encoded point cloud to the two-dimensional space. For example, the projection rule may indicate vertical projection or horizontal projection.

Optionally, the projection rule may be a preset projection rule (or the projection rule is referred to as a predefined rule, for example, the projection rule may be a rule predefined according to a protocol for an encoder side and a decoder side, or the projection rule may be a default rule).

Optionally, the projection rule may not be preset. For example, the projection rule may be determined according to a rate-distortion cost criterion. If the projection rule is not preset, further optionally, the syntax element may further include information used to indicate the projection rule. The information used to indicate the projection rule is frame-level information.

In a possible design, determining the tangent axis of the to-be-encoded patch and the bitangent axis of the to-be-encoded patch based on the normal axis of the to-be-encoded patch and the description information of the minimum bounding rectangle corresponding to the to-be-encoded patch may include determining, based on a mapping relationship, a target tangent axis and a target bitangent axis that correspond to both the normal axis of the to-be-encoded patch and the description information of the minimum bounding rectangle corresponding to the to-be-encoded patch, where the mapping relationship is a mapping relationship between the following items: a plurality of normal axes of a patch, a plurality of types of description information of a minimum bounding rectangle corresponding to the patch, a plurality of tangent axes of the patch, and a plurality of bitangent axes of the patch, and the target tangent axis is the tangent axis of the to-be-encoded patch, and the target bitangent axis is the bitangent axis of the to-be-encoded patch. For example, the mapping relationship may be predefined. For example, the mapping relationship is predefined according to a protocol. Further, the mapping relationship may be stored, for example but not limited to, in one or more tables. In this case, the possible design may be implemented by looking up a table.

In a possible design, determining the tangent axis of the to-be-encoded patch and the bitangent axis of the to-be-encoded patch based on the normal axis of the to-be-encoded patch and the description information of the minimum bounding rectangle corresponding to the to-be-encoded patch may include looking up a table based on the normal axis of the to-be-encoded patch and the description information of the minimum bounding rectangle corresponding to the to-be-encoded patch, to obtain a target tangent axis and a target bitangent axis that correspond to both the normal axis of the to-be-encoded patch and the description information of the minimum bounding rectangle corresponding to the to-be-encoded patch, where the target tangent axis is the tangent axis of the to-be-encoded patch, and the target bitangent axis is the bitangent axis of the to-be-encoded patch, and the table that is looked up includes a mapping relationship between the following items: a plurality of normal axes of a patch, a plurality of types of description information of a minimum bounding rectangle corresponding to the patch, a plurality of tangent axes of the patch, and a plurality of bitangent axes of the patch.

In a possible design, if a projection rule indicates vertical projection, an axis on which a longest side of the minimum bounding rectangle corresponding to the to-be-encoded patch is located is the bitangent axis of the to-be-encoded patch, and an axis on which a shortest side of the minimum bounding rectangle corresponding to the to-be-encoded patch is located is the tangent axis of the to-be-encoded patch, or if a projection rule indicates horizontal projection, an axis on which a longest side of the minimum bounding rectangle corresponding to the to-be-encoded patch is located is the tangent axis of the to-be-encoded patch, and an axis on which a shortest side of the minimum bounding rectangle corresponding to the to-be-encoded patch is located is the bitangent axis of the to-be-encoded patch. The projection rule refers to distribution, in the two-dimensional space, of one or more occupancy map obtained by projecting one or more patches in the to-be-encoded point cloud to the two-dimensional space. The normal axis of the to-be-encoded patch is perpendicular to the two-dimensional space. This possible design is described using an example in which "a horizontal axis of a two-dimensional plane is a tangent axis of a patch, and a vertical axis of the two-dimensional plane is a bitangent axis of the patch".

Alternatively, if the horizontal axis of the two-dimensional plane is the bitangent axis of the patch, and the vertical axis of the two-dimensional plane is the tangent axis of the patch, if a projection rule indicates vertical projection, an axis on which a longest side of the minimum bounding rectangle corresponding to the to-be-encoded patch is located is the tangent axis of the to-be-encoded patch, and an axis on which a shortest side of the minimum bounding rectangle corresponding to the to-be-encoded patch is located is the bitangent axis of the to-be-encoded patch, or if a projection rule indicates horizontal projection, an axis on which a longest side of the minimum bounding rectangle corresponding to the to-be-encoded patch is located is the bitangent axis of the to-be-encoded patch, and an axis on which a shortest side of the minimum bounding rectangle corresponding to the to-be-encoded patch is located is the tangent axis of the to-be-encoded patch.

In an example, in this embodiment of this application, the tangent axis that is of the to-be-encoded patch and that is used in a pre-projection process is referred to as a reference tangent axis of the to-be-encoded patch, and the tangent axis is denoted as a U0 axis, and the bitangent axis that is of the to-be-encoded patch and that is used in the pre-projection process is referred to as a reference bitangent axis of the to-be-encoded patch, and the bitangent axis is denoted as a V0 axis. In addition, the tangent axis of the to-be-encoded patch and the bitangent axis of the to-be-encoded patch that are determined based on the normal axis of the to-be-encoded patch and the description information of the minimum bounding rectangle corresponding to the to-be-encoded patch are respectively denoted as a U1 axis and a V1 axis. Based on this, there may be the following cases.

In a possible design, the U1 axis is the same as the U0 axis, and the V1 axis is the same as the V0 axis.

In another possible design, the U1 axis is the same as the V0 axis, and the V1 axis is the same as the U0 axis.

It should be noted that, for ease of description, the example in which "a horizontal axis of a two-dimensional plane is a tangent axis of a patch, and a vertical axis of the two-dimensional plane is a bitangent axis of the patch" is used for description in all specific implementations. A general description is provided herein, and details are not described below.

According to a second aspect, an embodiment of this application provides a point cloud decoding method. The method includes parsing a bitstream to obtain a syntax element, where the syntax element includes an index of a normal axis of a to-be-decoded patch in a to-be-decoded point cloud and information used to indicate description information of a minimum bounding rectangle corresponding to the to-be-decoded patch, determining a tangent axis of the to-be-decoded patch and a bitangent axis of the to-be-decoded patch based on the index of the normal axis of the to-be-decoded patch and the information used to indicate the description information of the minimum bounding rectangle corresponding to the to-be-decoded patch, where the index and the information are obtained through parsing, and reconstructing geometry information of the to-be-decoded point cloud based on one or more tangent axes and one or more bitangent axes of one or more patches in the to-be-decoded point cloud, where the one or more patches include the to-be-decoded patch. In an example, the method may be performed by a point cloud decoder.

Geometry information of a point cloud refers to coordinate values of a point in the point cloud (for example, each point in the point cloud) in a three-dimensional space.

Optionally, the description information of the minimum bounding rectangle corresponding to the to-be-decoded patch includes a relationship between sizes of sides of the minimum bounding rectangle corresponding to the to-be-decoded patch.

Optionally, the information used to indicate the description information of the minimum bounding rectangle corresponding to the to-be-decoded patch includes an index of the relationship between sizes of sides of the minimum bounding rectangle corresponding to the to-be-decoded patch, or size information of the minimum bounding rectangle corresponding to the to-be-decoded patch.

In a possible design, determining a tangent axis of the to-be-decoded patch and a bitangent axis of the to-be-decoded patch based on the index of the normal axis of the to-be-decoded patch and the information used to indicate the description information of the minimum bounding rectangle corresponding to the to-be-decoded patch, where the index and the information are obtained through parsing includes determining, according to a projection rule, the tangent axis of the to-be-decoded patch and the bitangent axis of the to-be-decoded patch based on the normal axis of the to-be-decoded patch and the description information of the minimum bounding rectangle corresponding to the to-be-decoded patch, where the projection rule refers to distribution, in a two-dimensional space, one or more occupancy map obtained by projecting one or more patches in the to-be-decoded point cloud to the two-dimensional space.

In a possible design, the projection rule is preset, or the syntax element further includes information used to indicate the projection rule, and correspondingly, the projection rule is a projection rule indicated by the syntax element that is obtained by parsing the bitstream.

In a possible design, determining a tangent axis of the to-be-decoded patch and a bitangent axis of the to-be-decoded patch based on the index of the normal axis of the to-be-decoded patch and the information used to indicate the description information of the minimum bounding rectangle corresponding to the to-be-decoded patch, where the index and the information are obtained through parsing includes determining, based on a mapping relationship, a target tangent axis and a target bitangent axis that correspond to both the normal axis of the to-be-decoded patch and the description information of the minimum bounding rectangle corresponding to the to-be-decoded patch, where the mapping relationship is a mapping relationship between the following items a plurality of normal axes of a patch, a plurality of types of description information of a minimum bounding rectangle corresponding to the patch, a plurality of tangent axes of the patch, and a plurality of bitangent axes of the patch, and the target tangent axis is the tangent axis of the to-be-decoded patch, and the target bitangent axis is the bitangent axis of the to-be-decoded patch.

In a possible design, determining a tangent axis of the to-be-decoded patch and a bitangent axis of the to-be-decoded patch based on the index of the normal axis of the to-be-decoded patch and the information used to indicate the description information of the minimum bounding rectangle corresponding to the to-be-decoded patch, where the index and the information are obtained through parsing includes looking up a table based on the normal axis of the to-be-decoded patch and the description information of the minimum bounding rectangle corresponding to the to-be-decoded patch, to obtain a target tangent axis and a target bitangent axis that correspond to both the normal axis of the to-be-decoded patch and the description information of the minimum bounding rectangle corresponding to the to-be-decoded patch, where the target tangent axis is the tangent axis of the to-be-decoded patch, and the target bitangent axis is the bitangent axis of the to-be-decoded patch, and the table includes a mapping relationship between the following items: a plurality of normal axes of a patch, a plurality of types of description information of a minimum bounding rectangle corresponding to the patch, a plurality of tangent axes of the patch, and a plurality of bitangent axes of the patch.

In a possible design, if a projection rule indicates vertical projection, an axis on which a longest side of the minimum bounding rectangle corresponding to the to-be-decoded patch is located is the bitangent axis of the to-be-decoded patch, and an axis on which a shortest side of the minimum bounding rectangle corresponding to the to-be-decoded patch is located is the tangent axis of the to-be-decoded patch, or if a projection rule indicates horizontal projection, an axis on which a longest side of the minimum bounding rectangle corresponding to the to-be-decoded patch is located is the tangent axis of the to-be-decoded patch, and an axis on which a shortest side of the minimum bounding rectangle corresponding to the to-be-decoded patch is located is the bitangent axis of the to-be-decoded patch. The projection rule refers to distribution, in a two-dimensional space, of one or more occupancy map obtained by projecting one or more patches in the to-be-decoded point cloud to the two-dimensional space. The normal axis of the to-be-decoded patch is perpendicular to the two-dimensional space.

Any technical solution provided in the second aspect corresponds to the corresponding point cloud encoding method provided in the first aspect. Therefore, for beneficial effects that can be achieved and explanations of related content, refer to the foregoing descriptions.

According to a third aspect, an embodiment of this application provides a point cloud encoding method. The method includes obtaining a reference tangent axis of a to-be-encoded patch in a to-be-encoded point cloud and a reference bitangent axis of the to-be-encoded patch, determining a tangent axis of the to-be-encoded patch and a bitangent axis of the to-be-encoded patch based on the reference tangent axis of the to-be-encoded patch and the reference bitangent axis of the to-be-encoded patch, where a rotation angle of the tangent axis of the to-be-encoded patch relative to the reference tangent axis of the to-be-encoded patch is θ, and a rotation angle of the bitangent axis of the to-be-encoded patch relative to the reference bitangent axis of the to-be-encoded patch is θ, and encoding a syntax element into a bitstream, where the syntax element is used to indicate the tangent axis of the to-be-encoded patch and the bitangent axis of the to-be-encoded patch, and the syntax element includes an index of a normal axis of the to-be-encoded patch and information used to indicate the rotation angle θ of the to-be-encoded patch. In an example, the method may be performed by an encoder.

The rotation angle θ may be an angle obtained by counterclockwise rotating the tangent axis of the to-be-encoded patch relative to the reference tangent axis of the to-be-encoded patch, and is an angle obtained by counterclockwise rotating the bitangent axis of the to-be-encoded patch relative to the reference bitangent axis of the to-be-encoded patch. Alternatively, the rotation angle θ may be an angle obtained by clockwise rotating the tangent axis of the to-be-encoded patch relative to the reference tangent axis of the to-be-encoded patch, and is an angle obtained by clockwise rotating the bitangent axis of the to-be-encoded patch relative to the reference bitangent axis of the to-be-encoded patch.

In this way, positions of occupancy maps of patches in an occupancy map of a point cloud may be adjusted by properly setting the rotation angle such that the occupancy maps of the patches are closely arranged in the occupancy map of the point cloud. This improves point cloud encoding performance, and further improves point cloud decoding performance. In addition, in comparison with the technical solution provided in the first aspect, according to this technical solution, the positions of the occupancy maps of the patches in the occupancy map of the point cloud can be more flexibly set such that the occupancy maps of the patches are arranged more densely (or more closely) in the occupancy map of the point cloud.

In a possible design, the information used to indicate the rotation angle θ of the to-be-encoded patch includes the rotation angle θ, or an index of the rotation angle θ, or an identifier of a patch that matches the to-be-encoded patch.

In a possible design, the identifier of the patch that matches the to-be-encoded patch is used to indicate an index of the patch that matches the to-be-encoded patch, or used to indicate that there is the patch that matches the to-be-encoded patch in an encoded point cloud and an index of the patch that matches the to-be-encoded patch.

In a possible design, the method may further include determining the rotation angle θ from a plurality of candidate rotation angles according to a rate-distortion cost criterion. In this case, the information used to indicate the rotation angle θ of the to-be-encoded patch includes the rotation angle θ, or an index of the rotation angle θ.

In a possible design, the method may further include obtaining a rotation angle of the patch that matches the to-be-encoded patch in the encoded point cloud, and using the obtained rotation angle as the rotation angle θ of the to-be-encoded patch. In this case, the information used to indicate the rotation angle θ of the to-be-encoded patch includes an index of the patch that matches the to-be-encoded patch. In an inter prediction mode, the encoder needs to transmit, to a decoder, the identifier of the patch that matches the to-be-encoded patch. Therefore, in this possible design, the information used to indicate the rotation angle θ does not need to be additionally transmitted. Therefore, bitstream transmission overheads can be reduced. In addition, the encoder does not need to obtain the rotation angle θ. Therefore, calculation complexity of the encoder can be reduced.

In a possible design, the method may further include projecting the to-be-encoded patch from a three-dimensional space to a two-dimensional space based on the tangent axis of the to-be-encoded patch and the bitangent axis of the to-be-encoded patch, to obtain an occupancy map of the to-be-encoded patch, and determining a minimum bounding rectangle of the occupancy map of the to-be-encoded patch, where the syntax element further includes size information of the minimum bounding rectangle of the occupancy map of the to-be-encoded patch.

According to a fourth aspect, an embodiment of this application provides a point cloud decoding method. The method includes parsing a bitstream to obtain a syntax element, where the syntax element includes an index of a normal axis of a to-be-decoded patch in a to-be-decoded point cloud and information used to indicate a rotation angle θ of the to-be-decoded patch, obtaining a reference tangent axis of the to-be-decoded patch and a reference bitangent axis of the to-be-decoded patch based on the index of the normal axis of the to-be-decoded patch, where the index is obtained through parsing, determining a tangent axis of the patch and a bitangent axis of the patch based on the reference tangent axis of the to-be-decoded patch, the reference bitangent axis of the to-be-decoded patch, and the information that is used to indicate the rotation angle θ of the to-be-decoded patch and that is obtained through parsing, and reconstructing geometry information of the to-be-decoded point cloud based on one or more tangent axes and one or more bitangent axes of one or more patches in the to-be-decoded point cloud, where the one or more patches include the to-be-decoded patch. In an example, the method may be performed by a decoder.

In a possible design, the information used to indicate the rotation angle θ of the to-be-decoded patch includes the rotation angle θ, or an index of the rotation angle θ, or an identifier of a patch that matches the to-be-decoded patch.

In a possible design, the identifier of the patch that matches the to-be-decoded patch is used to indicate an index of the patch that matches the to-be-decoded patch, or used to indicate whether there is the patch that matches the to-be-decoded patch in a decoded point cloud and an index of the patch that matches the to-be-decoded patch.

In a possible design, the information used to indicate the rotation angle θ of the to-be-decoded patch includes the identifier of the patch that matches the to-be-decoded patch, and determining a tangent axis of the patch and a bitangent axis of the patch based on the reference tangent axis of the to-be-decoded patch, the reference bitangent axis of the to-be-decoded patch, and the information that is used to indicate the rotation angle θ of the to-be-decoded patch and that is obtained through parsing includes determining, based on the identifier that is of the patch matching the to-be-decoded patch and that is obtained through parsing, the patch that matches the to-be-decoded patch, and obtaining a rotation angle θ of the patch that matches the to-be-decoded patch, and determining the tangent axis of the to-be-decoded patch and the bitangent axis of the to-be-decoded patch based on the reference tangent axis of the to-be-decoded patch, the reference bitangent axis of the to-be-decoded patch, and the rotation angle θ.

In a possible design, the syntax element further includes size information of a minimum bounding rectangle of an occupancy map of the to-be-decoded patch, and the reconstructing geometry information of the to-be-decoded point cloud based on one or more tangent axes and one or more bitangent axes of one or more patches in the to-be-decoded point cloud includes reconstructing the geometry information of the to-be-decoded point cloud based on the one or more tangent axes and the one or more bitangent axes of the one or more patches in the to-be-decoded point cloud and the size information of the minimum bounding rectangle of the occupancy map of the to-be-decoded patch, where the size information is obtained by parsing the bitstream.

Any technical solution provided in the fourth aspect corresponds to the corresponding point cloud encoding method provided in the third aspect. Therefore, for beneficial effects that can be achieved and explanations of related content, refer to the foregoing descriptions.

According to a fifth aspect, an embodiment of this application provides a point cloud encoding method. The method includes determining a prediction mode of a to-be-encoded point cloud from a candidate prediction mode set, where the candidate prediction mode set includes an inter prediction mode and an intra prediction mode, and the prediction mode of the to-be-encoded point cloud is used to determine a method for obtaining a tangent axis of a to-be-encoded patch in the to-be-encoded point cloud and a bitangent axis of the to-be-encoded patch, and encoding a syntax element into a bitstream, where the syntax element is used to indicate the method for obtaining the tangent axis of the to-be-encoded patch and the bitangent axis of the to-be-encoded patch, and the syntax element includes information used to indicate the prediction mode of the to-be-encoded point cloud. In an example, the method may be performed by an encoder. This technical solution provides an implementation solution to determining "a method for obtaining a tangent axis and a bitangent axis of a to-be-encoded patch". This technical solution can support a scenario in which a plurality of methods for obtaining the tangent axis and the bitangent axis of the to-be-encoded patch coexist.

In a possible design, when the prediction mode of the to-be-encoded point cloud is the inter prediction mode, the method for obtaining the tangent axis of the to-be-encoded patch and the bitangent axis of the to-be-encoded patch includes obtaining a reference tangent axis of the to-be-encoded patch and a reference bitangent axis of the to-be-encoded patch, determining the tangent axis of the to-be-encoded patch and the bitangent axis of the to-be-encoded patch based on the reference tangent axis of the to-be-encoded patch and the reference bitangent axis of the to-be-encoded patch, where a rotation angle of the tangent axis of the to-be-encoded patch relative to the reference tangent axis of the to-be-encoded patch is θ, and a rotation angle of the bitangent axis of the to-be-encoded patch relative to the reference bitangent axis of the to-be-encoded patch is θ, and obtaining a rotation angle of a patch that matches the to-be-encoded patch in an encoded point cloud, and using the obtained rotation angle as the rotation angle θ of the to-be-encoded patch, where the syntax element further includes an identifier of the patch that matches the to-be-encoded patch and an index of a normal axis of the to-be-encoded patch. For a specific implementation, refer to the related design in the third aspect.

In a possible design, when the prediction mode of the to-be-encoded point cloud is the intra prediction mode, the method for obtaining the tangent axis of the to-be-encoded patch and the bitangent axis of the to-be-encoded patch includes obtaining a reference tangent axis of the to-be-encoded patch and a reference bitangent axis of the to-be-encoded patch, determining the tangent axis of the to-be-encoded patch and the bitangent axis of the to-be-encoded patch based on the reference tangent axis of the to-be-encoded patch and the reference bitangent axis of the to-be-encoded patch, where a rotation angle of the tangent axis of the to-be-encoded patch relative to the reference tangent axis of the to-be-encoded patch is θ, and a rotation angle of the bitangent axis of the to-be-encoded patch relative to the reference bitangent axis of the to-be-encoded patch is θ, and determining a rotation angle θ of the to-be-encoded patch from a plurality of candidate rotation angles according to a rate-distortion cost criterion, where the syntax element further includes the rotation angle θ or an index of the rotation angle θ, and an index of a normal axis of the to-be-encoded patch. For a specific implementation, refer to the related design in the third aspect.

In a possible design, when the prediction mode of the to-be-encoded point cloud is the intra prediction mode, the method for obtaining the tangent axis of the to-be-encoded patch and the bitangent axis of the to-be-encoded patch includes acquiring a normal axis of the to-be-encoded patch and description information of a minimum bounding rectangle corresponding to the to-be-encoded patch, and determining the tangent axis of the to-be-encoded patch and the bitangent axis of the to-be-encoded patch based on the normal axis of the to-be-encoded patch and the description information of the minimum bounding rectangle corresponding to the to-be-encoded patch, where the syntax element further includes an index of the normal axis of the to-be-encoded patch and information that is used to indicate the description information of the minimum bounding rectangle corresponding to the to-be-encoded patch. For a specific implementation, refer to the related design in the first aspect.

According to a sixth aspect, an embodiment of this application provides a point cloud decoding method. The method includes parsing a bitstream to obtain a syntax element, where the syntax element is used to indicate a method for obtaining a tangent axis of a to-be-decoded patch in a to-be-decoded point cloud and a bitangent axis of the to-be-decoded patch, the syntax element includes information used to indicate a prediction mode of the to-be-decoded point cloud, and the prediction mode of the to-be-decoded point cloud includes an inter prediction mode or an intra prediction mode, and obtaining the method for obtaining the tangent axis of the to-be-decoded patch and the bitangent axis of the to-be-decoded patch according to the method, indicated by the syntax element, for obtaining the tangent axis of the to-be-decoded patch and the bitangent axis of the to-be-decoded patch.

In a possible design, when the prediction mode of the to-be-decoded point cloud is the inter prediction mode, and the syntax element further includes an identifier of a patch that matches the to-be-decoded patch and an index of a normal axis of the to-be-decoded patch, the method for obtaining the tangent axis of the to-be-decoded patch and the bitangent axis of the to-be-decoded patch includes obtaining a reference tangent axis of the to-be-decoded patch and a reference bitangent axis of the to-be-decoded patch based on the index that is of the normal axis of the to-be-decoded patch and that is obtained through parsing, determining, based on the identifier that is of the patch matching the to-be-decoded patch and that is obtained through parsing, the patch that matches the to-be-decoded patch, and obtaining a rotation angle θ of the patch that matches the to-be-decoded patch, and determining the tangent axis of the to-be-decoded patch and the bitangent axis of the to-be-decoded patch based on the reference tangent axis of the to-be-decoded patch, the reference bitangent axis of the to-be-decoded patch, and the rotation angle θ. For a specific implementation, refer to the related design in the fourth aspect.

In a possible design, when the prediction mode of the to-be-decoded point cloud is the intra prediction mode, and the syntax element further includes a rotation angle θ of the to-be-decoded patch or an index of the rotation angle θ of the to-be-decoded patch, and an index of a normal axis of the to-be-decoded patch, the method for obtaining the tangent axis of the to-be-decoded patch and the bitangent axis of the to-be-decoded patch includes obtaining a reference tangent axis of the to-be-decoded patch and a reference bitangent axis of the to-be-decoded patch based on the index that is of the normal axis of the to-be-decoded patch and that is obtained through parsing, and determining the tangent axis of the to-be-decoded patch and the bitangent axis of the to-be-decoded patch based on the reference tangent axis of the to-be-decoded patch, the reference bitangent axis of the to-be-decoded patch, and the rotation angle θ. For a specific implementation, refer to the related design in the fourth aspect.

In a possible design, when the prediction mode of the to-be-decoded point cloud is the intra prediction mode, and the syntax element further includes an index of a normal axis of the to-be-decoded patch and information used to indicate description information of a minimum bounding rectangle corresponding to the to-be-decoded patch, the method for obtaining the tangent axis of the to-be-decoded patch and the bitangent axis of the to-be-decoded patch includes determining the tangent axis of the to-be-decoded patch and the bitangent axis of the to-be-decoded patch based on the index of the normal axis of the to-be-decoded patch and the information used to indicate the description information of the minimum bounding rectangle corresponding to the to-be-decoded patch, where the index of the normal axis and the information used to indicate the description information are obtained through parsing. For a specific implementation, refer to the related design in the second aspect.

Any technical solution provided in the sixth aspect corresponds to the corresponding point cloud encoding method provided in the fifth aspect. Therefore, for beneficial effects that can be achieved and explanations of related content, refer to the foregoing descriptions.

According to a seventh aspect, an embodiment of this application provides an encoder. The encoder includes a patch information generation module configured to acquire a normal axis of a to-be-encoded patch in a to-be-encoded point cloud and description information of a minimum bounding rectangle corresponding to the to-be-encoded patch, where the normal axis of the to-be-encoded patch and the description information of the minimum bounding rectangle corresponding to the to-be-encoded patch are used to determine a tangent axis of the to-be-encoded patch and a bitangent axis of the to-be-encoded patch, and an auxiliary information encoding module configured to encode a syntax element into a bitstream, where the syntax element is used to indicate the tangent axis of the to-be-encoded patch and the bitangent axis of the to-be-encoded patch, and the syntax element includes an index of the normal axis of the to-be-encoded patch and information used to indicate the description information of the minimum bounding rectangle corresponding to the to-be-encoded patch.

According to an eighth aspect, an embodiment of this application provides a decoder. The decoder includes an auxiliary information decoding module configured to parse a bitstream to obtain a syntax element, where the syntax element includes an index of a normal axis of a to-be-decoded patch in a to-be-decoded point cloud and information used to indicate description information of a minimum bounding rectangle corresponding to the to-be-decoded patch, and determine a tangent axis of the to-be-decoded patch and a bitangent axis of the to-be-decoded patch based on the index of the normal axis of the to-be-decoded patch and the information used to indicate the description information of the minimum bounding rectangle corresponding to the to-be-decoded patch, where the index and the information are obtained through parsing, and a point cloud geometry information reconstruction module configured to reconstruct geometry information of the to-be-decoded point cloud based on one or more tangent axes and one or more bitangent axes of one or more patches in the to-be-decoded point cloud, where the one or more patches include the to-be-decoded patch.

According to a ninth aspect, an embodiment of this application provides an encoder. The encoder includes a patch information generation module configured to obtain a reference tangent axis of a to-be-encoded patch in a to-be-encoded point cloud and a reference bitangent axis of the to-be-encoded patch, and determine a tangent axis of the to-be-encoded patch and a bitangent axis of the to-be-encoded patch based on the reference tangent axis of the to-be-encoded patch and the reference bitangent axis of the to-be-encoded patch, where a rotation angle of the tangent axis of the to-be-encoded patch relative to the reference tangent axis of the to-be-encoded patch is θ, and a rotation angle of the bitangent axis of the to-be-encoded patch relative to the reference bitangent axis of the to-be-encoded patch is θ, and an auxiliary information encoding module configured to encode a syntax element into a bitstream, where the syntax element is used to indicate the tangent axis of the to-be-encoded patch and the bitangent axis of the to-be-encoded patch, and the syntax element includes an index of a normal axis of the to-be-encoded patch and information used to indicate the rotation angle θ of the to-be-encoded patch.

According to a tenth aspect, an embodiment of this application provides a decoder. The decoder includes an auxiliary information decoding module configured to parse a bitstream to obtain a syntax element, where the syntax element includes an index of a normal axis of a to-be-decoded patch in a to-be-decoded point cloud and information used to indicate a rotation angle θ of the to-be-decoded patch, obtain a reference tangent axis of the to-be-decoded patch and a reference bitangent axis of the to-be-decoded patch based on the index of the normal axis of the to-be-decoded patch, where the index is obtained through parsing, and determine a tangent axis of the patch and a bitangent axis of the patch based on the reference tangent axis of the to-be-decoded patch, the reference bitangent axis of the to-be-decoded patch, and the information that is used to indicate the rotation angle θ of the to-be-decoded patch and that is obtained through parsing, and a point cloud geometry information reconstruction module configured to reconstruct geometry information of the to-be-decoded point cloud based on one or more tangent axes and one or more bitangent axes of one or more patches in the to-be-decoded point cloud, where the one or more patches include the to-be-decoded patch.

According to an eleventh aspect, an embodiment of this application provides an encoder. The encoder includes a prediction mode determining module configured to determine a prediction mode of a to-be-encoded point cloud from a candidate prediction mode set, where the candidate prediction mode set includes an inter prediction mode and an intra prediction mode, and the prediction mode of the to-be-encoded point cloud is used to determine a method for obtaining a tangent axis of a to-be-encoded patch in the to-be-encoded point cloud and a bitangent axis of the to-be-encoded patch, and an auxiliary information encoding module configured to encode a syntax element into a bitstream, where the syntax element is used to indicate the method for obtaining the tangent axis of the to-be-encoded patch and the bitangent axis of the to-be-encoded patch, and the syntax element includes information used to indicate the prediction mode of the to-be-encoded point cloud.

According to a twelfth aspect, an embodiment of this application provides decoder. The decoder includes an auxiliary information decoding module configured to parse a bitstream to obtain a syntax element, where the syntax element is used to indicate a method for obtaining a tangent axis of a to-be-decoded patch in a to-be-decoded point cloud and a bitangent axis of the to-be-decoded patch, the syntax element includes information used to indicate a prediction mode of the to-be-decoded point cloud, and the prediction mode of the to-be-decoded point cloud includes an inter prediction mode or an intra prediction mode, and obtain the method for obtaining the tangent axis of the to-be-decoded patch and the bitangent axis of the to-be-decoded patch according to the method, indicated by the syntax element, for obtaining the tangent axis of the to-be-decoded patch and the bitangent axis of the to-be-decoded patch.

According to a thirteenth aspect, an embodiment of this application provides a point cloud data encoding device, and the device may include a memory configured to store point cloud data, where the point cloud data includes a to-be-encoded patch, and an encoder configured to encode an identifier into a bitstream, where the identifier is used to indicate whether to determine a tangent axis and a bitangent axis of the to-be-encoded patch based on description information of a minimum bounding rectangle corresponding to the to-be-encoded patch. That is, the identifier is used to indicate whether to encode the to-be-encoded patch using the point cloud encoding method provided in the first aspect. When the identifier is used to indicate to determine the tangent axis and the bitangent axis of the to-be-encoded patch based on the description information of the minimum bounding rectangle corresponding to the to-be-encoded patch in a to-be-encoded point cloud, the encoder performs encoding according to any point cloud encoding method provided in the first aspect.

Alternatively, the identifier is used to indicate whether to determine the tangent axis and the bitangent axis of the to-be-encoded patch based on a rotation angle θ of the tangent axis of the to-be-encoded patch relative to a reference tangent axis of the to-be-encoded patch. If the identifier is used to indicate to determine the tangent axis and the bitangent axis of the to-be-encoded patch based on the rotation angle θ of the tangent axis of the to-be-encoded patch relative to the reference tangent axis of the to-be-encoded patch, the encoder may perform encoding according to any point cloud encoding method provided in the third aspect.

According to a fourteenth aspect, an embodiment of this application provides a point cloud data decoding device, and the device may include a memory configured to store point cloud data in form of a bitstream, where the point cloud data includes a to-be-decoded patch, and a decoder configured to parse the bitstream to obtain an identifier, where the identifier is used to indicate whether to determine a tangent axis and a bitangent axis of the to-be-decoded patch based on description information of a minimum bounding rectangle corresponding to the to-be-decoded patch. That is, the identifier is used to indicate whether to decode the to-be-decoded patch using the point cloud decoding method provided in the second aspect. When the identifier is used to indicate to determine the tangent axis and the bitangent axis of the to-be-decoded patch based on the description information of the minimum bounding rectangle corresponding to the to-be-decoded patch in a to-be-decoded point cloud, the decoder performs decoding according to any point cloud decoding method provided in the second aspect.

Alternatively, the identifier is used to indicate whether to determine the tangent axis and the bitangent axis of the to-be-decoded patch based on a rotation angle θ of the tangent axis of the to-be-decoded patch relative to a reference tangent axis of the to-be-decoded patch. If the identifier is used to indicate to determine the tangent axis and the bitangent axis of the to-be-decoded patch are determined based on the rotation angle θ of the tangent axis of the to-be-decoded patch relative to the reference tangent axis of the to-be-decoded patch, the decoder may perform decoding according to any point cloud decoding method provided in the fourth aspect.

According to a fifteenth aspect, an embodiment of this application provides an encoding device. The encoding device includes a nonvolatile memory and a processor that are coupled to each other, where the processor invokes program code stored in the memory to perform a portion of or all steps in any method according to the first aspect, the third aspect, or the fifth aspect.

According to a sixteenth aspect, an embodiment of this application provides a decoding device. The decoding device includes a nonvolatile memory and a processor that are coupled to each other, where the processor invokes program code stored in the memory to perform a portion of or all steps in any method according to the second aspect, the fourth aspect, or the sixth aspect.

According to a seventeenth aspect, an embodiment of this application provides a method for determining a tangent axis and a bitangent axis of a patch.

In a possible design, the method may include acquiring a normal axis of a patch in a point cloud and description information of a minimum bounding rectangle corresponding to the patch, and determining a tangent axis of the patch and a bitangent axis of the patch based on the normal axis of the patch and the description information of the minimum bounding rectangle corresponding to the patch.

In a possible design, the method may include obtaining a reference tangent axis of a patch and a reference bitangent axis of the patch in a point cloud, and determining a tangent axis of the patch and a bitangent axis of the patch based on the reference tangent axis of the patch and the reference bitangent axis of the patch, where a rotation angle of the tangent axis of the patch relative to the reference tangent axis of the patch is θ, and a rotation angle of the bitangent axis of the patch relative to the reference bitangent axis of the patch is θ.

For explanations of related content, beneficial effects, and the like of any method provided in the seventeenth aspect, refer to the foregoing corresponding descriptions. Details are not described herein again.

According to an eighteenth aspect, an embodiment of this application provides an apparatus for determining a tangent axis and a bitangent axis of a patch. The apparatus can be configured to perform any method provided in the seventeenth aspect. In an example, the apparatus may be a chip. In a possible design, functional modules of the apparatus may be obtained through division according to the method provided in the seventeenth aspect. For example, the functional modules may be obtained through division corresponding to functions, or two or more functions may be integrated into one processing module. In a possible design, the apparatus may include a memory and a processor. The memory is configured to store program code, and when the program code is executed by the processor, any method provided in the seventeenth aspect is performed.

According to a nineteenth aspect, an embodiment of this application provides a processing apparatus configured to implement functions of the foregoing apparatus for determining a tangent axis and a bitangent axis of a patch, or the encoder, or the decoder. The processing apparatus includes a processor and an interface. The processing apparatus may be a chip. The processor may be implemented using hardware or software. When the processor is implemented using hardware, the processor may be a logic circuit, an integrated circuit, or the like. When the processor is implemented using software, the processor may be a general-purpose processor, and is implemented by reading software code stored in a memory. The memory may be integrated into the processor, or may be located outside the processor and exist independently.

According to a twentieth aspect, an embodiment of this application provides a point cloud encoding method. The method includes projecting a to-be-encoded patch from a three-dimensional space to a two-dimensional space, to obtain a first occupancy map of the to-be-encoded patch, obtaining a second occupancy map of the to-be-encoded patch, where the second occupancy map of the to-be-encoded patch is obtained by counterclockwise or clockwise rotating the first occupancy map of the to-be-encoded patch by a rotation angle θ, and encoding a syntax element into a bitstream, where the syntax element includes information used to indicate the rotation angle θ.

It can be understood that, for ease of description, "an occupancy map obtained through projection" is named as the first occupancy map, and corresponds to "a reference occupancy map" in the embodiments. Likewise, the second occupancy map corresponds to "an occupancy map" in the embodiments. The descriptions are applicable to any solution (for example, any solution provided in the twentieth aspect to a twenty-third aspect) provided in the embodiments of this application.

In a possible design, coordinates (x2, y2) of a point in the second occupancy map of the to-be-encoded patch are obtained based on coordinates (x1, y1) of a point in the first occupancy map of the to-be-encoded patch and a rotation matrix, where the rotation matrix corresponds to the rotation angle.

In a possible design, the rotation matrix is determined based on the rotation angle θ, or is determined based on a functional relationship of the rotation angle θ.

In a possible design, the rotation matrix is represented as $$\begin{bmatrix} \cos\theta & -\sin\theta \\ \theta\sin & \cos\theta \end{bmatrix}.$$

In a possible design, when the rotation angle θ is 0°, the rotation matrix is represented as $$\begin{bmatrix} 1 & 0 \\ 0 & -1 \end{bmatrix},$$

when the rotation angle θ is 90°, the rotation matrix is represented as $$\begin{bmatrix} 0 & -1 \\ 1 & 0 \end{bmatrix},$$

when the rotation angle θ is 180°, the rotation matrix is represented as $$\begin{bmatrix} -1 & 0 \\ 0 & 1 \end{bmatrix},$$

and/or when the rotation angle θ is 270°, the rotation matrix is represented as $$\begin{bmatrix} 0 & 1 \\ -1 & 0 \end{bmatrix}.$$

In a possible design, coordinates (x1, y1) of a point P1 in the first occupancy map of the to-be-encoded patch and coordinates (x2, y2) of a point P2 in the second occupancy map of the to-be-encoded patch satisfy the following formula, where the coordinates (x2, y2) of the point P2 are obtained through rotation:

$$x2 = x1 * \cos\theta - y1 * \sin\theta$$
$$y2 = x1 * \sin\theta + y1 * \cos\theta.$$

In a possible design, coordinates (x2, y2) of P2 in the second occupancy map of the to-be-encoded patch are obtained according to the following formula:

$$x2 = x1 * \cos\theta - y1 * \sin\theta$$
$$y2 = x1 * \sin\theta + y1 * \cos\theta,$$

where (x1, y1) represents coordinates of a point P1 in the first occupancy map of the to-be-encoded patch, and represents the rotation angle.

In a possible implementation, the second occupancy map is obtained by counterclockwise or clockwise rotating the first occupancy map of the to-be-encoded patch by the rotation angle θ around a coordinate origin of a coordinate system constituted by a first tangent axis and a first bitangent axis.

It can be understood that, the first tangent axis corresponds to a reference tangent axis in the embodiments, and the first bitangent axis corresponds to a reference bitangent axis in the embodiments. The descriptions are applicable to any solution (for example, any solution provided in the twentieth aspect to the twenty-third aspect) provided in the embodiments of this application.

In a possible design, the information used to indicate the rotation angle θ is an index used to indicate the rotation angle θ.

In a possible design, a rotation angle by which a second tangent axis of the to-be-encoded patch rotates relative to a first tangent axis of the to-be-encoded patch is θ, and a rotation angle by which a second bitangent axis of the to-be-encoded patch rotates relative to a first bitangent axis of the to-be-encoded patch is θ.

It can be understood that, the second tangent axis corresponds to a tangent axis in the embodiments, and the second bitangent axis corresponds to a bitangent axis in the embodiments.

According to a twenty-first aspect, an embodiment of this application provides a point cloud decoding method. The method includes parsing a bitstream to obtain a syntax element, where the syntax element includes information used to indicate a rotation angle θ of a to-be-decoded patch, obtaining a second occupancy map of the to-be-decoded patch, obtaining a first occupancy map of the to-be-decoded patch, where the first occupancy map of the to-be-decoded patch is obtained by counterclockwise or clockwise counter-rotating the second occupancy map of the to-be-decoded patch by the rotation angle θ, and reconstructing geometry information of the to-be-decoded point cloud based on one or more first occupancy maps of one or more patches in the to-be-decoded point cloud, where the one or more patches include the to-be-decoded patch.

In a possible design, coordinates (x1, y1) of a point in the first occupancy map of the to-be-decoded patch are obtained based on coordinates (x2, y2) of a point in the second occupancy map of the to-be-decoded patch and a rotation matrix, where the rotation matrix corresponds to the rotation angle.

In a possible design, the rotation matrix is determined based on the rotation angle θ, or is determined based on a functional relationship of the rotation angle θ.

In a possible design, the rotation matrix is represented as $$\begin{bmatrix} \cos\theta & -\sin\theta \\ \sin\theta & \cos\theta \end{bmatrix},$$

or the rotation matrix is represented as an inverse matrix of $$\begin{bmatrix} \cos\theta & \sin\theta \\ -\sin\theta & \cos\theta \end{bmatrix}.$$

In a possible design, when the rotation angle θ is 0°, the rotation matrix is represented as $$\begin{bmatrix} 0 & -1 \\ 1 & 0 \end{bmatrix},$$

when the rotation angle θ is 90°, the rotation matrix is represented as $$\begin{bmatrix} 0 & -1 \\ 1 & 0 \end{bmatrix},$$

when the rotation angle θ is 180°, the rotation matrix is represented as $$\begin{bmatrix} -1 & 0 \\ 0 & 1 \end{bmatrix},$$

and/or when the rotation angle θ is 270°, the rotation matrix is represented as $$\begin{bmatrix} 0 & 1 \\ -1 & 0 \end{bmatrix}.$$

In a possible design, when the rotation angle θ is 0°, the rotation matrix is represented as an inverse matrix of $$\begin{bmatrix} 1 & 0 \\ 0 & -1 \end{bmatrix},$$

when the rotation angle θ is 90°, the rotation matrix is represented as an inverse matrix of $$\begin{bmatrix} 0 & -1 \\ 1 & 0 \end{bmatrix},$$

when the rotation angle θ is 180°, the rotation matrix is represented as an inverse matrix of $$\begin{bmatrix} -1 & 0 \\ 0 & 1 \end{bmatrix},$$

and/or when the rotation angle θ is 270°, the rotation matrix is represented as an inverse matrix of $$\begin{bmatrix} 0 & 1 \\ -1 & 0 \end{bmatrix}.$$

In a possible design, coordinates (x2, y2) of a point P2 in the second occupancy map of the to-be-decoded patch and coordinates (x1, y1) of a point P1 in the first occupancy map of the to-be-decoded patch satisfy the following formula, where the coordinates (x1, y1) of the point P1 are obtained through counter-rotation:

$$x2 = x1 * \cos\theta - y1 * \sin\theta$$
$$y2 = x1 * \sin\theta + y1 * \cos\theta$$

or $$x1 = x2 * \cos\theta + y2 * \sin\theta$$
$$y1 = -x2 * \sin\theta + y2 * \cos\theta.$$

In a possible design, coordinates (x1, y1) of a point P1 in the first occupancy map of the to-be-decoded patch are obtained according to the following formula:

$$x2 = x1 * \cos\theta - y1 * \sin\theta$$
$$y2 = x1 * \sin\theta + y1 * \cos\theta$$

or $$x1 = x2 * \cos\theta + y2 * \sin\theta$$
$$y1 = -x2 * \sin\theta + y2 * \cos\theta,$$

where (x2, y2) represents coordinates of a point P2 in the second occupancy map of the to-be-decoded patch, and θ represents the rotation angle.

In a possible implementation, the first occupancy map of the to-be-decoded patch is obtained by counterclockwise or clockwise counter-rotating the second occupancy map of the to-be-decoded patch by the rotation angle θ around a coordinate origin of a coordinate system constituted by a first tangent axis and a first bitangent axis.

In a possible design, the information used to indicate the rotation angle θ is an index used to indicate the rotation angle θ.

In a possible design, a rotation angle by which a second tangent axis of the to-be-decoded patch rotates relative to a first tangent axis of the to-be-decoded patch is θ, and a rotation angle by which a second bitangent axis of the to-be-decoded patch rotates relative to a first bitangent axis of the to-be-decoded patch is θ.

In a possible design, the obtaining a second occupancy map of the to-be-decoded patch includes parsing the bitstream to obtain the second occupancy map of the to-be-decoded patch, or parsing the bitstream to obtain information (for example, size information of a minimum bounding rectangle of the second occupancy map of the to-be-decoded patch) that is used to indicate the second occupancy map of the to-be-decoded patch, and obtaining the second occupancy map of the to-be-decoded patch based on the information that is used to indicate the second occupancy map of the to-be-decoded patch.

According to a twenty-second aspect, an embodiment of this application provides a point cloud encoding method. The method includes projecting a to-be-encoded patch from a three-dimensional space to a two-dimensional space, to obtain a first occupancy map of the to-be-encoded patch, obtaining a second occupancy map of the to-be-encoded patch, where coordinates (x2, y2) of a point in the second occupancy map of the to-be-encoded patch are obtained based on coordinates (x1, y1) of a point in the first occupancy map of the to-be-encoded patch and a rotation matrix, where the rotation matrix corresponds to a rotation angle θ, and encoding a syntax element into a bitstream, where the syntax element includes information used to indicate the rotation angle θ.

In a possible design, the rotation matrix is determined based on the rotation angle θ, or is determined based on a functional relationship of the rotation angle θ.

For a possible implementation of the rotation matrix, refer to the corresponding possible design in the twentieth aspect.

According to the twenty-third aspect, an embodiment of this application provides a point cloud decoding method. The method includes reconstructing geometry information of a to-be-decoded point cloud based on one or more first occupancy maps of one or more to-be-decoded patches in the to-be-decoded point cloud, where the one or more patches include a to-be-decoded patch, coordinates (x1, y1) of a first point of the to-be-decoded patch are obtained based on coordinates (x2, y2) of a second point of the to-be-decoded patch and a rotation matrix, and the rotation matrix corresponds to a rotation angle θ of the to-be-decoded patch.

In a possible design, that coordinates (x1, y1) of a first point of the to-be-decoded patch are obtained based on coordinates (x2, y2) of a second point of the to-be-decoded patch and a rotation matrix means that coordinates (x1, y1) of a point in a first occupancy map of the to-be-decoded patch are obtained based on coordinates (x2, y2) of a point in a second occupancy map of the to-be-decoded patch and a rotation matrix.

In a possible design, the coordinates (x1, y1) of the first point of the to-be-decoded patch are coordinates (x1, y1) of a point in a first occupancy map of the to-be-decoded patch, and the coordinates (x2, y2) of the second point of the to-be-decoded patch are coordinates (x2, y2) of a point in a second occupancy map of the to-be-decoded patch.

In a possible design, a first occupancy map of the to-be-decoded patch is obtained by counterclockwise or clockwise counter-rotating a second occupancy map of the to-be-decoded patch by the rotation angle θ, or a second occupancy map of the to-be-decoded patch is obtained by counterclockwise or clockwise rotating a first occupancy map of the to-be-decoded patch by the rotation angle θ.

In a possible design, the rotation matrix is determined based on the rotation angle θ, or is determined based on a functional relationship of the rotation angle θ.

For a possible implementation of the rotation matrix, refer to the corresponding possible design in the twentieth aspect.

In a possible design, coordinates (x1, y1) of a point P1 in the first occupancy map of the to-be-decoded patch and coordinates (x2, y2) of a point P2 in the second occupancy map of the to-be-decoded patch satisfy the following formula, where the coordinates (x2, y2) of the point P2 are obtained through rotation:

$$x2 = x1 * \cos\theta - y1 * \sin\theta$$
$$y2 = x1 * \sin\theta + y1 * \cos\theta.$$

According to a twenty-fourth aspect, an embodiment of this application provides an encoding apparatus. The apparatus includes a memory and a processor. The memory is configured to store program code. The processor is configured to invoke the program code to perform any point cloud encoding method in the first aspect, the third aspect, the fifth aspect, the twentieth aspect, or the twenty-second aspect.

According to a twenty-fifth aspect, an embodiment of this application provides a decoding apparatus. The apparatus includes a memory and a processor. The memory is configured to store program code. The processor is configured to invoke the program code to perform any point cloud decoding method in the second aspect, the fourth aspect, the sixth aspect, the twenty-first aspect, or the twenty-third aspect.

According to a twenty-sixth aspect, an embodiment of this application provides a computer-readable storage medium. The computer-readable storage medium stores program code. The program code includes an instruction used to perform a portion of or all steps of any method in the first aspect to the sixth aspect, the twentieth aspect, or the twenty-third aspect, or an instruction used to perform a portion of or all steps of the method in the seventeenth aspect.

According to a twenty-seventh aspect, an embodiment of this application provides a computer program product. When the computer program product runs on a computer, the computer is enabled to perform a portion of or all steps of any method in the first aspect to the sixth aspect, the twentieth aspect, or the twenty-third aspect, or the computer is enabled to perform a portion of or all steps of the method in the seventeenth aspect.

It should be understood that, for beneficial effects of any one of the encoder, the decoder, the point cloud data encoding device, the point cloud decoding device, the apparatus for determining a tangent axis and a bitangent axis of a patch, the processing apparatus, the encoding apparatus, the decoding apparatus, and the computer-readable storage medium, refer to the beneficial effects of the method embodiments provided in the foregoing corresponding aspects. Details are not described again.

DESCRIPTION OF EMBODIMENTS

In the descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. "A plurality of" means "two or more". In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution order, and the terms such as "first" and "second" do not indicate a definite difference.

In the descriptions of this application, that a reference coordinate system of a three-dimensional space is used as a world coordinate system (or referred to as a physical coordinate system), three axes of the world coordinate system are an X axis, a Y axis, and a Z axis, and a correspondence between the three axes and indexes of the three axes is shown in Table 1 is used as an example for description. The X axis is a horizontal axis, the Y axis is a vertical axis, and the Z axis is an axis perpendicular to a plane on which the X axis and the Y axis are located. A general description is provided herein, and details are not described below.

TABLE 1

| X axis | Y axis | Z axis |
|---|---|---|
| 0 | 1 | 2 |

Figure 1:
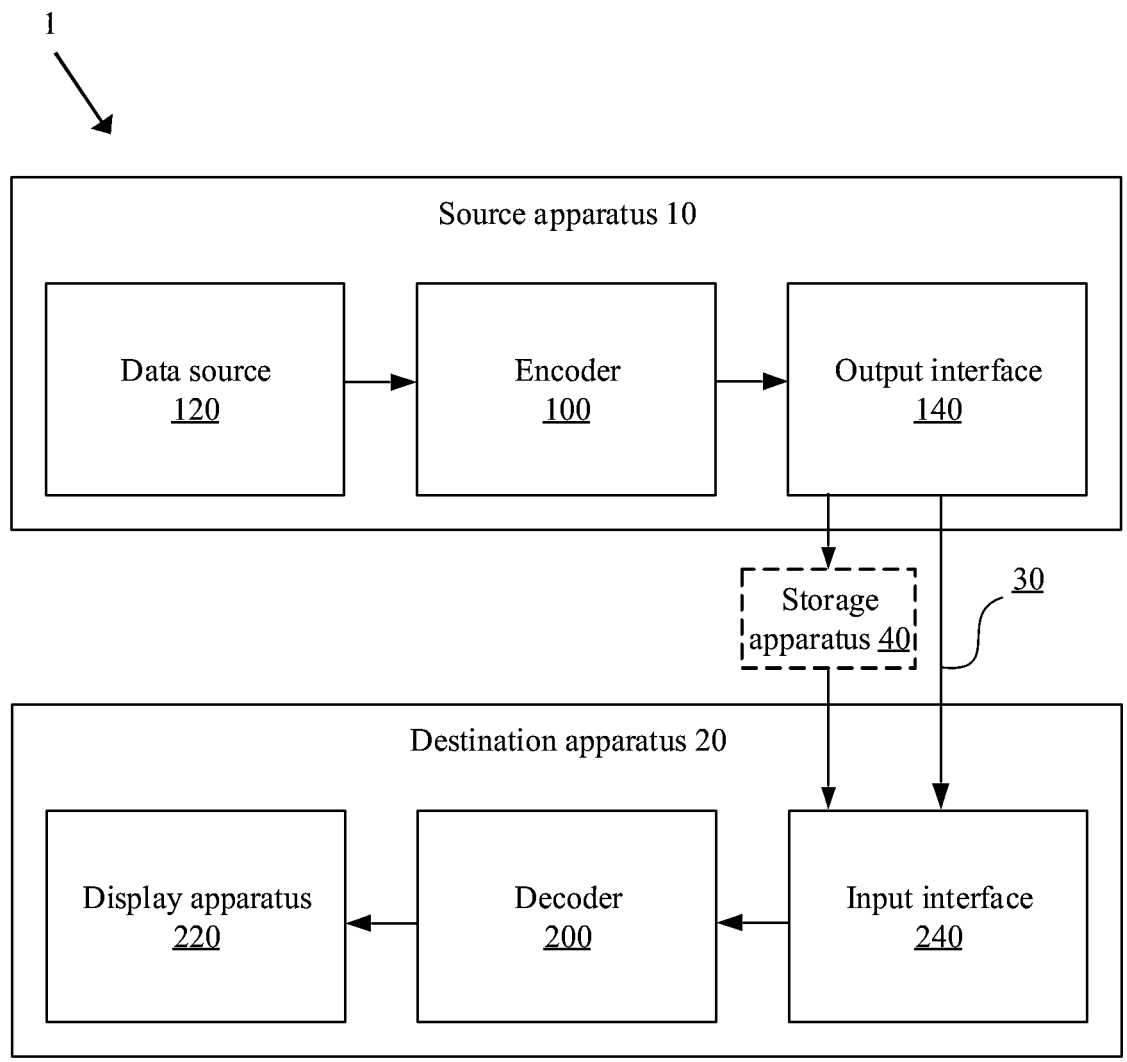
FIG. 1 is a block diagram of an example point cloud coding system applicable to an embodiment of this application.

FIG. 1 is a block diagram of an example point cloud coding system 1 applicable to an embodiment of this application. A term "point cloud coding" or "coding" may generally refer to point cloud encoding or point cloud decoding. An encoder 100 in the point cloud coding system 1 may encode a to-be-encoded point cloud according to any point cloud encoding method provided in this application. A decoder 200 in the point cloud coding system 1 may decode a to-be-decoded point cloud according to a point cloud decoding method, provided in this application, corresponding to a point cloud encoding method used by the encoder.

As shown in FIG. 1, the point cloud coding system 1 includes a source apparatus 10 and a destination apparatus 20. The source apparatus 10 generates encoded point cloud data. Therefore, the source apparatus 10 may be referred to as a point cloud encoding apparatus. The destination apparatus 20 may decode the encoded point cloud data generated by the source apparatus 10. Therefore, the destination apparatus 20 may be referred to as a point cloud decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a random-access memory (RAM), a read-only memory (ROM), an electrically erasable programmable ROM (EEPROM), a flash memory, or any other medium that can be used to store desired program code in a form of an instruction or a data structure that can be accessed by a computer, as described in this specification.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, an in-vehicle computer, and a similar apparatus.

The destination apparatus 20 may receive the encoded point cloud data from the source apparatus 10 over a link 30. The link 30 may include one or more media or apparatuses that can move the encoded point cloud data from the source apparatus 10 to the destination apparatus 20. In an example, the link 30 may include one or more communications media that enable the source apparatus 10 to directly send the encoded point cloud data to the destination apparatus 20 in real time. In this example, the source apparatus 10 may modulate the encoded point cloud data according to a communication standard (for example, a wireless communication protocol), and may send modulated point cloud data to the destination apparatus 20. The one or more communications media may include a wireless and/or wired communications medium, for example, a radio frequency (RF) spectrum or one or more physical transmission lines. The one or more communications media may constitute a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 20.

In another example, the encoded data may be output to a storage apparatus 40 through an output interface 140. Similarly, the encoded point cloud data may be accessed from the storage apparatus 40 through an input interface 240. The storage apparatus 40 may include any one of a plurality of distributed data storage media or locally accessible data storage media, for example, a hard drive, a BLU-RAY, a digital versatile disc (DVD), a compact disc (CD) ROM (CD-ROM), a flash memory, a volatile or nonvolatile memory, or any other appropriate digital storage medium configured to store the encoded point cloud data.

In another example, the storage apparatus 40 may correspond to a file server or another intermediate storage apparatus that can store the encoded point cloud data generated by the source apparatus 10. The destination apparatus 20 may access the stored point cloud data through streaming transmission or downloading from the storage apparatus 40. The file server may be any type of server that can store the encoded point cloud data and send the encoded point cloud data to the destination apparatus 20. Examples of the file server include a network server (for example, used for a website), a File Transfer Protocol (FTP) server, a network attached storage (NAS) apparatus, or a local disk drive. The destination apparatus 20 may access the encoded point cloud data through any standard data connection (including an internet connection). The standard data connection may include a wireless channel (for example, a WI-FI connection), a wired connection (for example, a digital subscriber line (DSL) or a cable modem), or a combination thereof that is suitable for access to the encoded point cloud data stored on the file server. Transmission of the encoded point cloud data from the storage apparatus 40 may be streaming transmission, downloading transmission, or a combination thereof.

The point cloud coding system 1 described in FIG. 1 is merely an example, and technologies in this application are applicable to a point cloud coding (for example, point cloud encoding or point cloud decoding) apparatus that does not necessarily include any data communication between a point cloud encoding apparatus and a point cloud decoding apparatus. In another example, data is retrieved from a local memory, is transmitted on a network in a streaming manner, and the like. The point cloud encoding apparatus may encode the data and store the data to the memory, and/or the point cloud decoding apparatus may retrieve the data from the memory and decode the data. In many examples, apparatuses that only encode data and store the data to the memory and/or retrieve the data from the memory and decode the data but that do not communicate with each other perform encoding and decoding.

In the example in FIG. 1, the source apparatus 10 includes a data source 120, the encoder 100, and the output interface 140. In some examples, the output interface 140 may include a modulator/demodulator (modem) and/or a transmitter. The data source 120 may include a point cloud capture apparatus (for example, a camera), a point cloud archive including previously captured point cloud data, a point cloud feed-in interface configured to receive point cloud data from a point cloud content provider, a computer graphics system configured to generate point cloud data, or a combination of these sources of point cloud data.

The encoder 100 may encode the point cloud data from the data source 120. In some examples, the source apparatus 10 directly sends the encoded point cloud data to the destination apparatus 20 through the output interface 140. In another example, the encoded point cloud data may be alternatively stored on the storage apparatus 40 such that the destination apparatus 20 subsequently accesses the encoded point cloud data for decoding and/or playing.

In the example in FIG. 1, the destination apparatus 20 includes the input interface 240, the decoder 200, and a display apparatus 220. In some examples, the input interface 240 includes a receiver and/or a modem. The input interface 240 may receive the encoded point cloud data over the link 30 and/or from the storage apparatus 40. The display apparatus 220 may be integrated with the destination apparatus 20 or may be located outside the destination apparatus 20. Generally, the display apparatus 220 displays decoded point cloud data. There may be a plurality of types of display apparatuses 220. For example, the display apparatus 220 may be, for example, a liquid-crystal display (LCD), a plasma display, an organic light-emitting diode (OLED) display, or another type of display apparatus.

Although not shown in FIG. 1, in some aspects, the encoder 100 and the decoder 200 may be respectively integrated with an audio encoder and an audio decoder, and may include an appropriate multiplexer-demultiplexer (MUX-DEMUX) unit or other hardware and software, to process encoding of both audio and a video in a same data stream or separate data streams. In some examples, if appropriate, the MUX-DEMUX unit may comply with the International Telecommunication Union (ITU) H.223 multiplexer protocol or another protocol such as a User Datagram Protocol (UDP).

The encoder 100 and the decoder 200 each may be implemented, for example, as any one of a plurality of circuits one or more microprocessors, a digital signal processor (DSP), an application-specific integrated circuit (ASIC), a field-programmable gate array (FPGA), discrete logic, hardware, or any combination thereof. If this application is implemented partially through software, the apparatus may store, in an appropriate non-volatile computer-readable storage medium, an instruction used for the software, and may use one or more processors to execute the instruction in hardware, to implement the technologies in this application. Any one of the foregoing content (including hardware, software, a combination of hardware and software, and the like) may be considered as one or more processors. The encoder 100 and the decoder 200 each may be included in one or more encoders or decoders, and the encoder or the decoder may be integrated as a part of a combined encoder/decoder (codec) in a corresponding apparatus.

In this application, the encoder 100 may be generally an apparatus that "signals" or "sends" some information to another apparatus such as the decoder 200. The term "signal" or "send" may generally refer to transmission of a syntax element and/or other data used for decoding compressed point cloud data. The transmission may occur in real time or almost in real time. Alternatively, the communication may occur after a period of time. For example, the communication may occur when a syntax element in an encoded bitstream is stored into a computer-readable storage medium during encoding, and the decoding apparatus may then retrieve the syntax element at any time after the syntax element is stored in the medium.

Figure 2:
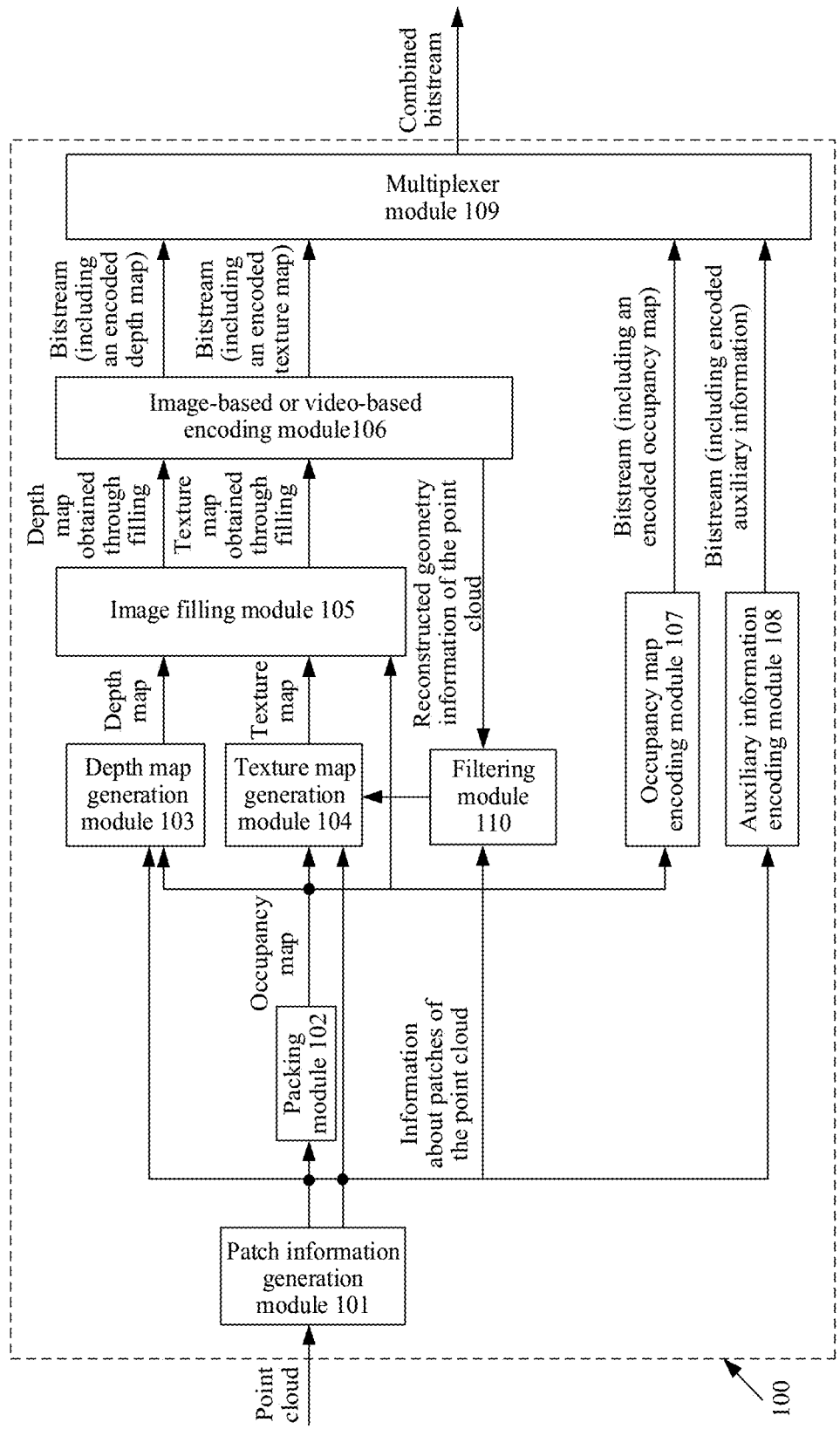
FIG. 2 is a schematic block diagram of an example encoder applicable to an embodiment of this application.

FIG. 2 is a schematic block diagram of an example encoder 100 applicable to an embodiment of this application. A Moving Picture Expert Group (MPEG) point cloud compression (PCC) encoding framework is used as an example for description in FIG. 2. In the example in FIG. 2, the encoder 100 may include a patch information generation module 101, a packing module 102, a depth map generation module 103, a texture map generation module 104, an image filling module 105, an image-based or video-based encoding module 106, an occupancy map encoding module 107, an auxiliary information encoding module 108, a multiplexer module 109, and the like.

The patch information generation module 101 is configured to segment a frame of point cloud into a plurality of patches using a method, and obtain related information and the like of the generated patches. The patch is a set of some points in one frame of point cloud, and generally one connected component region corresponds to one patch. The related information of the patch may include but is not limited to at least one of the following information: a quantity of patches obtained by segmenting a point cloud, position information of each patch in a three-dimensional space, an index of a tangent axis of each patch, an index of a bitangent axis of each patch, an index of a normal axis of each patch, a depth map generated when each patch is projected from the three-dimensional space to a two-dimensional space, a size of the depth map of each patch (for example, the width and the height of the depth map), an occupancy map generated when each patch is projected from the three-dimensional space to the two-dimensional space, and the like. Some of the related information, such as the quantity of patches obtained by segmenting the point cloud, the index of the normal axis of each patch, the size of the depth map of each patch, the position information of each patch in the point cloud, and size information of the occupancy map of each patch, may be used as auxiliary information and sent to the auxiliary information encoding module 108 for encoding (that is, compression coding). The occupancy map of each patch may be sent to the packing module 102 for packing. Further, patches in the point cloud are sorted in a specific order, for example, sorted in descending (ascending) order of the widths/heights of the occupancy maps of the patches, and then the occupancy maps of the patches are successively inserted into an available region of an occupancy map of the point cloud in the order of the sorted patches, to obtain the occupancy map of the point cloud. In addition, information about a specific position of each patch in the occupancy map of the point cloud, the depth map of each patch, and the like may be sent to the depth map generation module 103.

After obtaining the occupancy map of the point cloud, the packing module 102 may send the occupancy map of the point cloud to the occupancy map encoding module 107 for encoding. In addition, the occupancy map of the point cloud may be used to guide the depth map generation module 103 to generate a depth map of the point cloud and guide the texture map generation module 104 to generate a texture map of the point cloud.

The depth map generation module 103 is configured to generate the depth map of the point cloud based on the occupancy map of the point cloud, and the occupancy map and the depth map of each patch of the point cloud, and send the generated depth map to the image filling module 105 such that the image filling module 105 fills empty pixels in the depth map, to obtain a depth map obtained through filling. Video encoding is performed on the depth map obtained through filling, video decoding is performed to obtain a decoded depth map, and geometry information of a reconstructed point cloud is obtained based on the decoded depth map, the occupancy map of the point cloud, and the auxiliary information of each patch. Texture information of the point cloud and the geometry information of the reconstructed point cloud are sent to a coloring module. The coloring module is configured to color the reconstructed point cloud to obtain texture information of the reconstructed point cloud. The texture map generation module 104 is configured to generate the texture map of the point cloud based on the occupancy map of the point cloud, the texture information of the reconstructed point cloud, and the occupancy map of each patch of the point cloud, and send the generated texture map to the image filling module 105 such that the image filling module 105 fills empty pixels in the received texture map, to obtain a texture map obtained through filling. Optionally, the texture map generation module 104 may alternatively generate the texture map of the point cloud based on information obtained through filtering performed by a filtering module 110 on the geometry information of the reconstructed point cloud.

The image filling module 105 sends the depth map and the texture map that are obtained through filling to the image-based or video-based encoding module 106, for image-based or video-based encoding.

Finally, the image-based or video-based encoding module 106, the occupancy map encoding module 107, and the auxiliary information encoding module 108 send obtained encoding results (that is, bitstreams) to the multiplexer module 109. The multiplexer module 109 combines the bitstreams into one bitstream, where the bitstream may be sent to the output interface 140.

It can be understood that the encoder 100 shown in FIG. 2 is merely an example. In specific implementation, the encoder 100 may include more or fewer modules than the modules shown in FIG. 2. This is not limited in this embodiment of this application. For example, the encoder 100 may further include a prediction mode determining module configured to determine a prediction mode of a to-be-encoded point cloud, where the prediction mode may include an inter prediction mode, an intra prediction mode, or the like. The prediction mode of the to-be-encoded point cloud may be used as auxiliary information and sent to the auxiliary information encoding module 108 for encoding. Optionally, in some embodiments of this application, the prediction mode of the to-be-encoded point cloud may be sent to the patch information generation module 101. Subsequently, the patch information generation module 101 may determine a tangent axis and a bitangent axis of a patch based on the prediction mode of the to-be-encoded point cloud.

Figure 3:
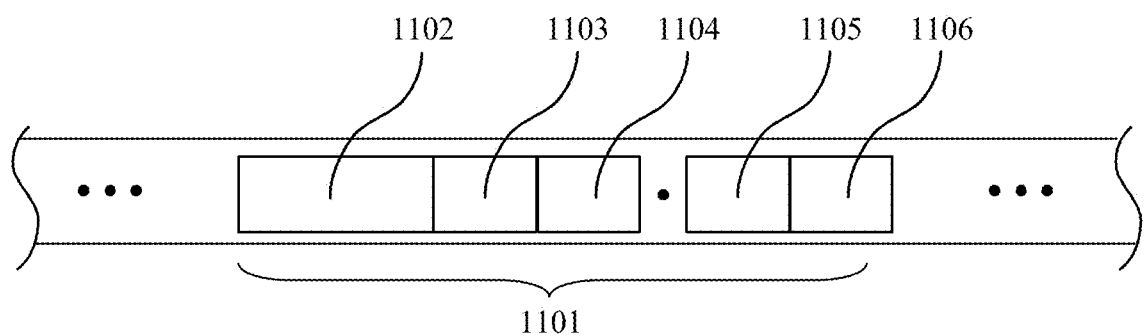
FIG. 3 is a schematic structural diagram of an example bitstream applicable to an embodiment of this application.

It can be learned from the foregoing description that the auxiliary information encoding module 108 may encode patch-level information (for example, the index of the normal axis of the patch) and frame-level information (for example, the quantity of patches included in the point cloud) into a bitstream. In an example, the encoder 100 may perform encoding based on a point cloud group, where each point cloud group may include at least two frames of point clouds. In this case, the auxiliary information encoding module 108 may further encode group of frames (GOF)-level information (for example, a quantity of frames of point clouds frames included in a point cloud group) into a bitstream. FIG. 3 is a schematic structural diagram of an example bitstream applicable to an embodiment of this application. The bitstream shown in FIG. 3 includes a part 1101 that is used to describe metadata information (which may also be referred to as a syntax element) in the bitstream. The part 1101 further includes the following fields.

A field 1102 is metadata information of a frame header of a GOF, and is used to describe GOF-level information. The field 1102 may include, for example, identification information of the GOF, a quantity of frames of point clouds included in the GOF, and common information (such as the following information used to indicate description information of a size of a bounding box of a point cloud group) of all the frames of point clouds in the GOF.

A field 1103 is metadata information of the $1^{st}$ frame of point cloud in the GOF, and is used to describe frame-level information related to the $1^{st}$ frame of point cloud. The field 1103 may include, for example, a quantity of patches included in the $1^{st}$ frame of point cloud, resolutions of occupancy maps of all patches, a maximum quantity of patches that can be included in each smallest unit in occupancy maps of point clouds, and common information (such as the following information used to indicate description information of a size of a bounding box of the point cloud) of all patches in the $1^{st}$ frame of point cloud.

A field 1104 is metadata information of a patch of the $1^{st}$ frame of point cloud in the GOF, and is used to describe patch-level information related to the $1^{st}$ frame of point cloud. Further, the patch-level information related to the $1^{st}$ frame of point cloud may sequentially include metadata information of the $1^{st}$ patch in the $1^{st}$ frame of point cloud, ..., metadata information of the $i^{th}$ patch, ..., and metadata information of the $I^{th}$ patch, where $1 \leq i \leq I$, both i and I are integers, and I represents the quantity of patches included in the $1^{st}$ frame of point cloud. The metadata information of the patch may include an index of a normal axis of the patch, and the like.

A field 1105 is metadata information of the $j^{th}$ frame of point cloud in the GOF, and is used to describe frame-level information related to the $j^{th}$ frame of point cloud. $1 \leq j \leq J$, and both j and J are integers. J represents the quantity of frames of point clouds included in the GOF.

A field 1106 is metadata information of a patch of the $j^{th}$ frame of point cloud in the GOF, and is used to describe patch-level information related to the $j^{th}$ frame of point cloud.

Figure 4:
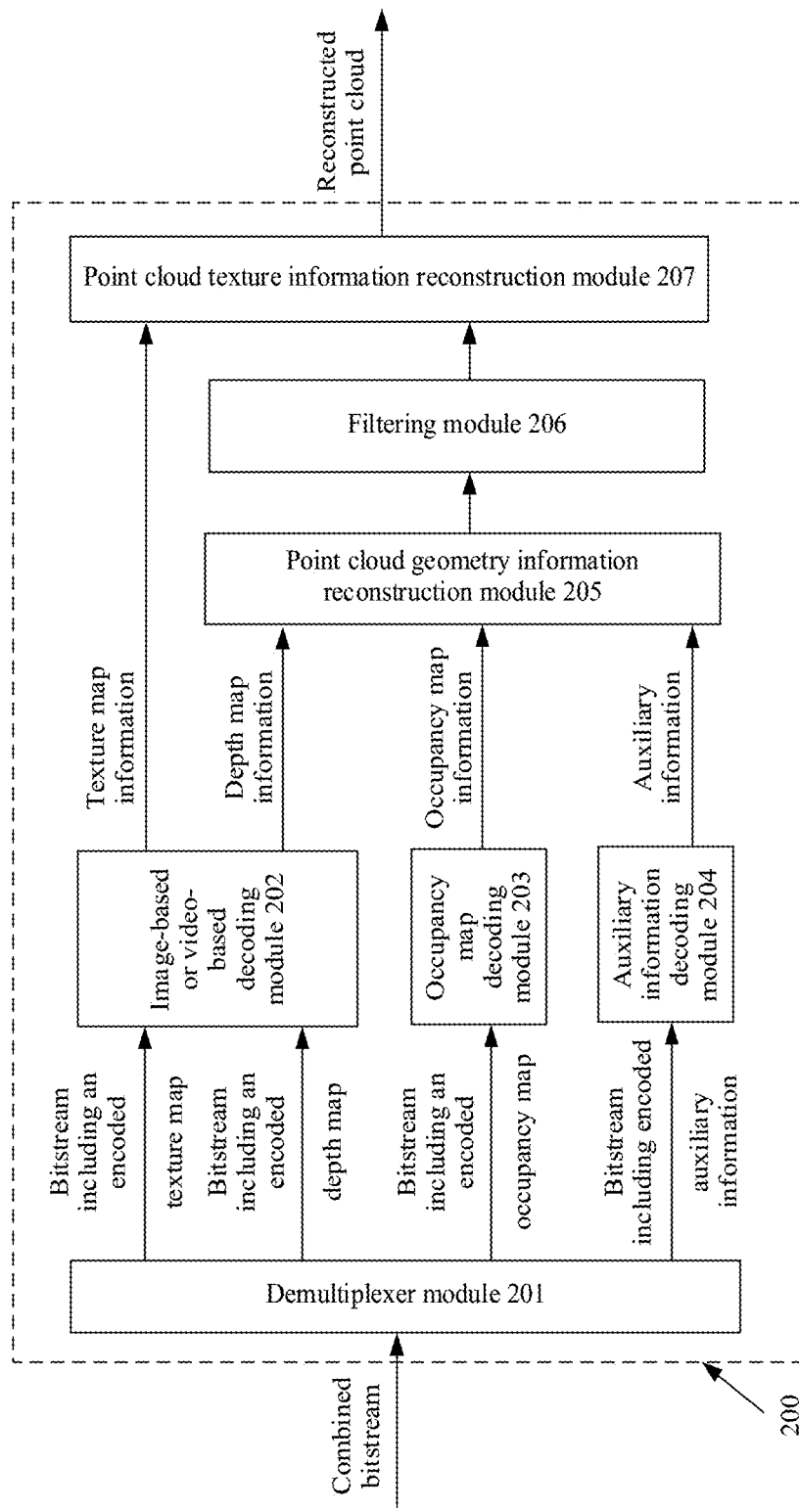
FIG. 4 is a schematic block diagram of an example decoder applicable to an embodiment of this application.

FIG. 4 is a schematic block diagram of an example decoder 200 applicable to an embodiment of this application. An MPEG PCC decoding framework is used as an example for description in FIG. 4. In the example in FIG. 4, the decoder 200 may include a demultiplexer module 201, an image-based or video-based decoding module 202, an occupancy map decoding module 203, an auxiliary information decoding module 204, a point cloud geometry information reconstruction module 205, a filtering module 206, and a point cloud texture information reconstruction module 207.

The demultiplexer module 201 is configured to send an input bitstream (that is, a combined bitstream) to a corresponding decoding module. Further, a bitstream including an encoded texture map and an encoded depth map is sent to the image-based or video-based decoding module 202, a bitstream including an encoded occupancy map is sent to the occupancy map decoding module 203, and a bitstream including encoded auxiliary information is sent to the auxiliary information decoding module 204.

The image-based or video-based decoding module 202 is configured to decode the received encoded texture map and the received encoded depth map, send texture map information obtained through decoding to the point cloud texture information reconstruction module 207, and send depth map information obtained through decoding to the point cloud geometry information reconstruction module 205. The occupancy map decoding module 203 is configured to decode the received bitstream including the encoded occupancy map, and send occupancy map information obtained through decoding to the point cloud geometry information reconstruction module 205. The auxiliary information decoding module 204 is configured to decode the received encoded auxiliary information, and send, to the point cloud geometry information reconstruction module 205, information that indicates the auxiliary information and that is obtained through decoding.

The point cloud geometry information reconstruction module 205 is configured to reconstruct geometry information of a point cloud based on the received occupancy map information and the received auxiliary information. After filtering is performed on the reconstructed geometry information of the point cloud by the filtering module 206, filtered reconstructed geometry information of the point cloud is sent to the point cloud texture information reconstruction module 207. The point cloud texture information reconstruction module 207 is configured to reconstruct texture information of the point cloud, to obtain a reconstructed point cloud.

It can be understood that the decoder 200 shown in FIG. 4 is merely an example. In specific implementation, the decoder 200 may include more or fewer modules than the modules shown in FIG. 4. This is not limited in the embodiments of this application.

To ease of understanding the technical solutions provided in the embodiments of this application, the following describes, using examples, a process of generating a patch by the patch information generation module 101 and related information that is of the patch and that is obtained by the patch information generation module 101.

Figure 5:
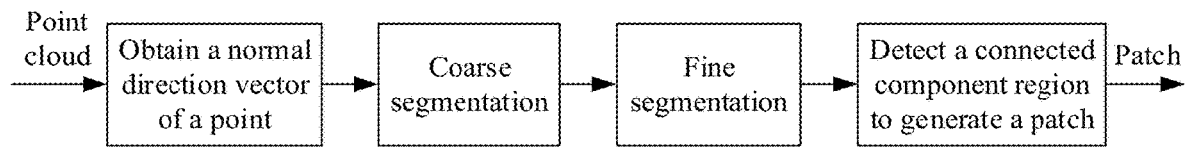
FIG. 5 is a schematic diagram of a patch generation process applicable to a Test Model Category 2 (TMC2).

FIG. 5 is a schematic diagram of a patch generation process applicable to a TMC2. Details may include, a K-dimension (KD) tree is constructed based on a point cloud, a neighborhood point of each point in the point cloud is determined based on the KD tree, and a normal direction vector (that is, a normal vector) of each point is obtained based on the neighborhood point of the point. Then, coarse segmentation is performed on the point cloud based on the normal direction vector of each point and a predefined projection plane (that is, a projection plane of each point is determined). One type of predefined projection plane includes six planes of a bounding box of a point cloud. A method for coarse segmentation may include calculating an included angle between the normal direction vector of each point and each of normal direction vectors of the six planes, and selecting a plane corresponding to a smallest included angle as a projection plane of the point. Then, fine segmentation is performed on the projection plane that is of each point and that is obtained through coarse segmentation. Further, a coarse segmentation result is adjusted by iteratively updating a projection plane of the neighborhood point of each point. The projection plane of each point in the point cloud is determined based on a fine segmentation result. Finally, a connected component region is detected based on each projection plane, to generate a patch. For example, a set including all samples in a connected component region is a patch.

Figures 6A, 6B, 6C:
FIG. 6A, FIG. 6B, and FIG. 6C are a schematic diagram of an example patch applicable to an embodiment of this application.

FIG. 6A to FIG. 6C are a schematic diagram of an example patch applicable to an embodiment of this application. FIG. 6A shows one frame of point cloud. FIG. 6B shows patches generated based on FIG. 6A. A set including points in each connected component region in FIG. 6B is a patch.

As described above, the patch information generation module 101 may further obtain the related information of the generated patch of the point cloud. The related information may include an index of a tangent axis, an index of a bitangent axis, an index of a normal axis, and the like of each patch.

The tangent axis of the patch is an axis on which a tangent of the patch is located. The bitangent axis of the patch is an axis on which a bitangent of the patch is located. The bitangent axis of the patch is perpendicular to the tangent axis of the patch. The normal axis of the patch is an axis on which a normal of the patch is located. The normal axis of the patch is perpendicular to a two-dimensional space (that is, a projection plane of the patch) in which the tangent axis and the bitangent axis of the patch are located. To simplify subsequent processing, in the embodiments of this application, an example in which "each of a tangent axis, a bitangent axis, and a normal axis of a patch is one of axes in a world coordinate system" is used for description. This can reduce coordinate system conversion complexity accompanied when a patch is projected to the two-dimensional space. Certainly, this application is not limited thereto. In actual implementation, a three-dimensional coordinate system constituted by "a normal axis, a tangent axis, and a bitangent axis of a patch" may be alternatively obtained from the world coordinate system (or another reference coordinate system) based on a transformation matrix.

In the MPEG PCC encoding framework, the tangent axis and the bitangent axis of the patch are generally determined according to the following method. The index of the normal axis of the patch is first determined, and the index of the tangent axis and the index of the bitangent axis of the patch are then obtained by looking up Table 2. The indexes of the axes in Table 2 are obtained based on Table 1.

TABLE 2

| Index of the normal axis of the patch | Index of the tangent axis (a U axis) of the patch | Index of the bitangent axis (a V axis) of the patch |
| --- | --- | --- |
| 0 | 2 | 1 |
| 1 | 2 | 0 |
| 2 | 0 | 1 |

Refer to Table 2. It can be learned that, when the index of the normal axis of the patch is 0, the index of the tangent axis of the patch is 2, and the index of the bitangent axis of the patch is 1. That is, when the normal axis of the patch is the X axis, the tangent axis of the patch is the Z axis, and the bitangent axis of the patch is the Y axis. Principles of other examples are similar to the principle described herein, and are not enumerated herein.

Figures 7A, 7B:
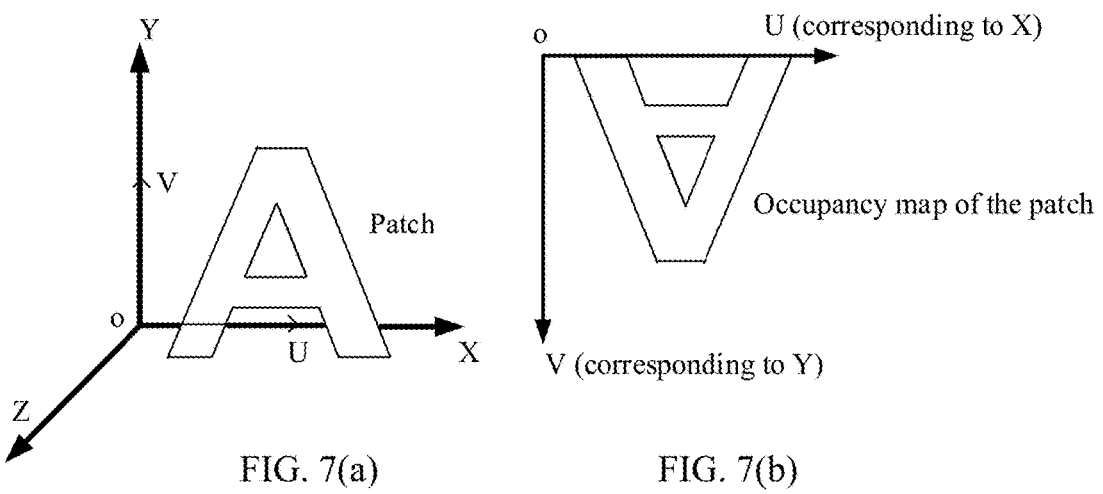
FIG. 7A and FIG. 7B are a schematic diagram of projection of a patch from a three-dimensional space to a two-dimensional plane in a current technology.

FIG. 7A and FIG. 7B are a schematic diagram of projection of a patch from a three-dimensional space to a two-dimensional space. In FIG. 7A and FIG. 7B, the coordinate origin is denoted as O. It is assumed that a character "A" shown in FIG. 7A represents a patch in the three-dimensional space, and a normal axis of the patch is a Z axis. In addition, it is assumed that in the two-dimensional space, a tangent direction of the patch is a horizontal axis (a U axis), and a bitangent direction of the patch is a vertical axis (a V axis). Refer to Table 2. It can be learned that a tangent axis of the patch is an X axis, and the bitangent axis is a Y axis. That is, in the two-dimensional space to which the patch is mapped, the U axis is the X axis, and the V axis is the Y axis. Based on this, after the patch is projected to the two-dimensional space, an occupancy map shown in FIG. 7B may be obtained.

After determining a tangent axis and a bitangent axis of each patch, the patch information generation module 101 may further obtain an occupancy map obtained by projecting the patch to the two-dimensional space. Coordinate values of each point in the occupancy map are determined based on a coordinate system that is constituted by "the tangent axis and the bitangent axis of the patch". Then, the packing module 102 may pack occupancy maps of these patches in the two-dimensional space (that is, occupancy maps of the patches described in this specification), to obtain an occupancy map of a point cloud.

Figures 8A, 8B:
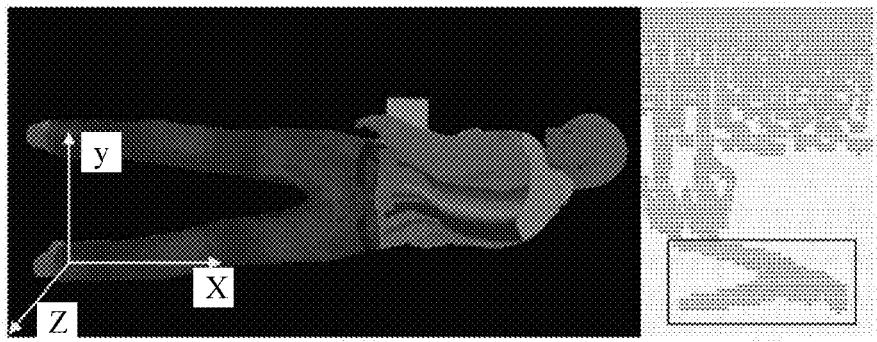
FIG. 8A and FIG. 8B are a schematic diagram of an occupancy map of a point cloud according to a current technology.

FIG. 8A and FIG. 8B are a schematic diagram of an occupancy map of a point cloud. The patch information generation module 101 may generate patches based on the point cloud shown in FIG. 8A, and obtain a tangent axis and a bitangent axis of each patch based on Table 2, to obtain an occupancy map of each patch. Based on this, after packing the occupancy maps of the patches, the packing module 102 may obtain the occupancy map of the point cloud shown in FIG. 8B. It can be learned from FIG. 8B that in the occupancy map of the point cloud, some patches that are relatively high (which are located on a side on which the Y axis is located) are vertically arranged and some patches that are relatively high (for example, patches in a rectangular box) are horizontally arranged. Consequently, there is a large amount of empty space, such as a region in which empty pixels are located in FIG. 8B, in the occupancy map of the point cloud. In addition, this leads to a relatively large size of the occupancy map of the point cloud, and is unfavorable to subsequent video compression coding.

In addition, as shown in FIG. 6A to FIG. 6C, if the tangent axis and the bitangent axis of each patch are obtained based on Table 2, an occupancy map shown in FIG. 6C may be obtained based on the patches shown in FIG. 6B.

The following describes a point cloud encoding method and a point cloud decoding method provided in the embodiments of this application. It should be noted that, with reference to the point cloud coding system shown in FIG. 1, any one of the following point cloud encoding methods may be performed by the source apparatus 10 in the point cloud coding system. Furthermore, the point cloud encoding method is performed by the encoder 100 in the source apparatus 10. Any of the following point cloud decoding methods may be performed by the destination apparatus 20 in the point cloud coding system. Furthermore, the point cloud decoding method is performed by the decoder 200 in the destination apparatus 20.

Figure 9:
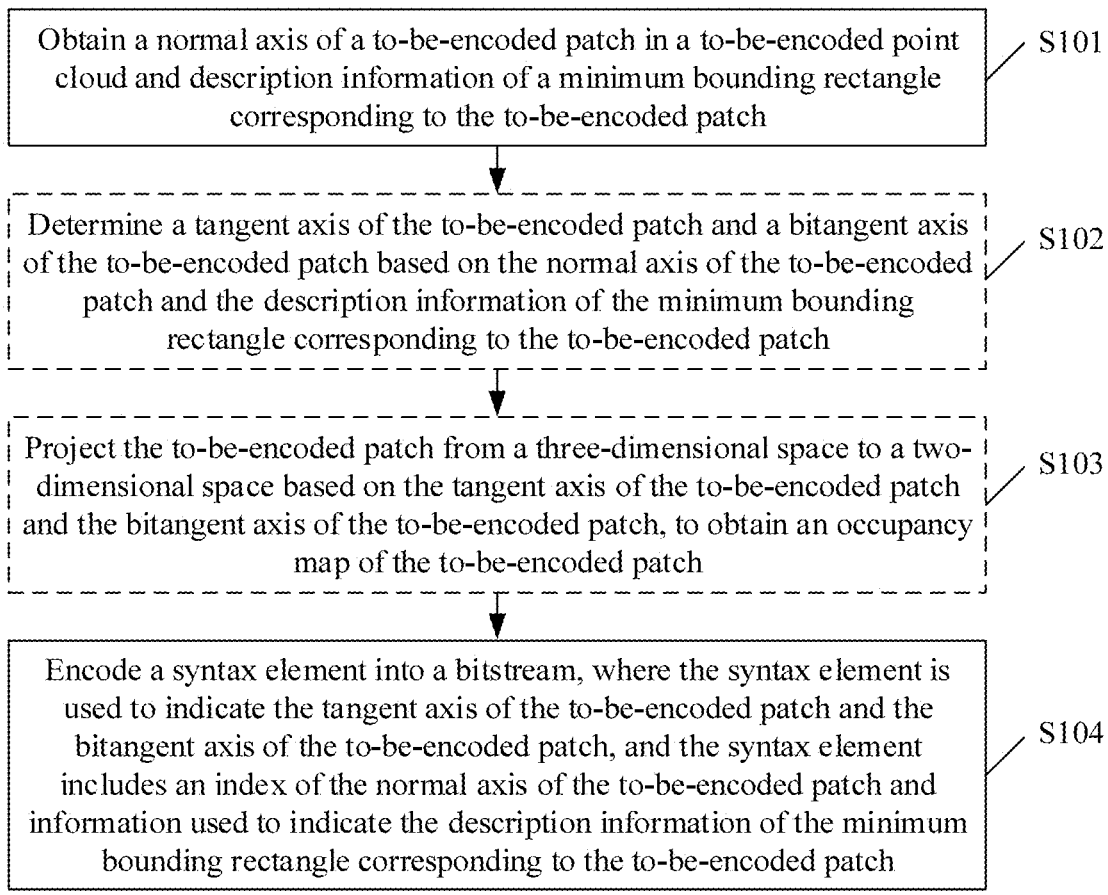
FIG. 9 is a schematic flowchart of a point cloud encoding method according to an embodiment of this application.

FIG. 9 is a schematic flowchart of a point cloud encoding method according to an embodiment of this application. The method may include the following steps.

S101: Acquire a normal axis of a to-be-encoded patch in a to-be-encoded point cloud and description information of a minimum bounding rectangle corresponding to the to-be-encoded patch. The normal axis of the to-be-encoded patch and the description information of the minimum bounding rectangle corresponding to the to-be-encoded patch are used to determine a tangent axis and a bitangent axis of the to-be-encoded patch. The to-be-encoded point cloud may be any frame of to-be-encoded point cloud. The to-be-encoded patch may be any patch in the to-be-encoded point cloud.

The minimum bounding rectangle corresponding to the patch is a minimum bounding rectangle of a two-dimensional image (referred to as a pre-occupancy map hereinafter) obtained by pre-projecting the patch from a three-dimensional space to a two-dimensional space. It should be noted that in this embodiment of this application, one side of the minimum bounding rectangle corresponding to the patch is a first axis of a world coordinate system or is parallel to a first axis, and another side is a second axis of the world coordinate system or is parallel to a second axis. The first axis may be any axis in the world coordinate system, and the second axis may be any axis, other than the first axis, in the world coordinate system.

"Pre-projection" is a term introduced to describe the technical solutions provided in the embodiments of this application more clearly, and is used to distinguish from a real mapping process. A process of pre-projecting a patch is a process of projecting the patch from the three-dimensional space to the two-dimensional space, and the pre-projection process is performed before a tangent axis and a bitangent axis of the patch are determined. Details are as follows.

The process of pre-projecting the patch may include determining a reference tangent axis and a reference bitangent axis of the patch, and then projecting the patch from the three-dimensional space to the two-dimensional space based on the determined reference tangent axis and the determined reference bitangent axis of the patch. One of the reference tangent axis and the reference bitangent axis of the patch is the first axis described above, and the other is the second axis described above. How to determine the reference tangent axis and the reference bitangent axis of the patch is not limited in this embodiment of this application. For example, the tangent axis and the bitangent axis of the patch may be determined using any method (for example, by looking up Table 2) provided in a current technology, the determined tangent axis is used as the reference tangent axis of the patch, and the determined bitangent axis is determined as the reference bitangent axis of the patch.

A process of mapping of the patch may include determining the tangent axis and the bitangent axis of the patch, and then projecting the patch from the three-dimensional space to the two-dimensional space based on the determined tangent axis and the determined bitangent axis of the patch. In this embodiment, one of the tangent axis and the bitangent axis of the patch is the first axis described above, and the other is the second axis described above.

For ease of description, in the following, the reference tangent axis of the patch is referred to as a U0 axis, and the reference bitangent axis of the patch is referred to as a V0 axis. For ease of description, in the following, an example in which the U0 axis is a horizontal axis and the V0 axis is a vertical axis is used for description. Further, if the normal axis of the patch is not a Y axis, the vertical axis is the Y axis, and the horizontal axis is an axis that is different from both the normal axis and the Y axis. If the normal axis of the patch is the Y axis, the vertical axis is an X axis, and the horizontal axis is a Z axis. Certainly, this application is not limited thereto. For ease of description, in the following, the tangent axis of the patch is referred to as a U1 axis, and the bitangent axis of the patch is referred to as a V1 axis.

In this embodiment, a relationship between the U0 axis, the V0 axis, the U1 axis, and the V1 axis that correspond to the patch may include the following manners.

Manner A: The tangent axis of the patch is the same as the reference tangent axis of the patch, and the bitangent axis of the patch is the same as the reference bitangent axis of the patch. That is, the U1 axis is the same as the U0 axis, and the V1 axis is the same as the V0 axis.

Manner B: The tangent axis of the patch is the same as the reference bitangent axis of the patch, and the bitangent axis of the patch is the same as the reference tangent axis of the patch. That is, the U1 axis is the same as the V0 axis, and the V1 axis is the same as the U0 axis.

Figure 10:
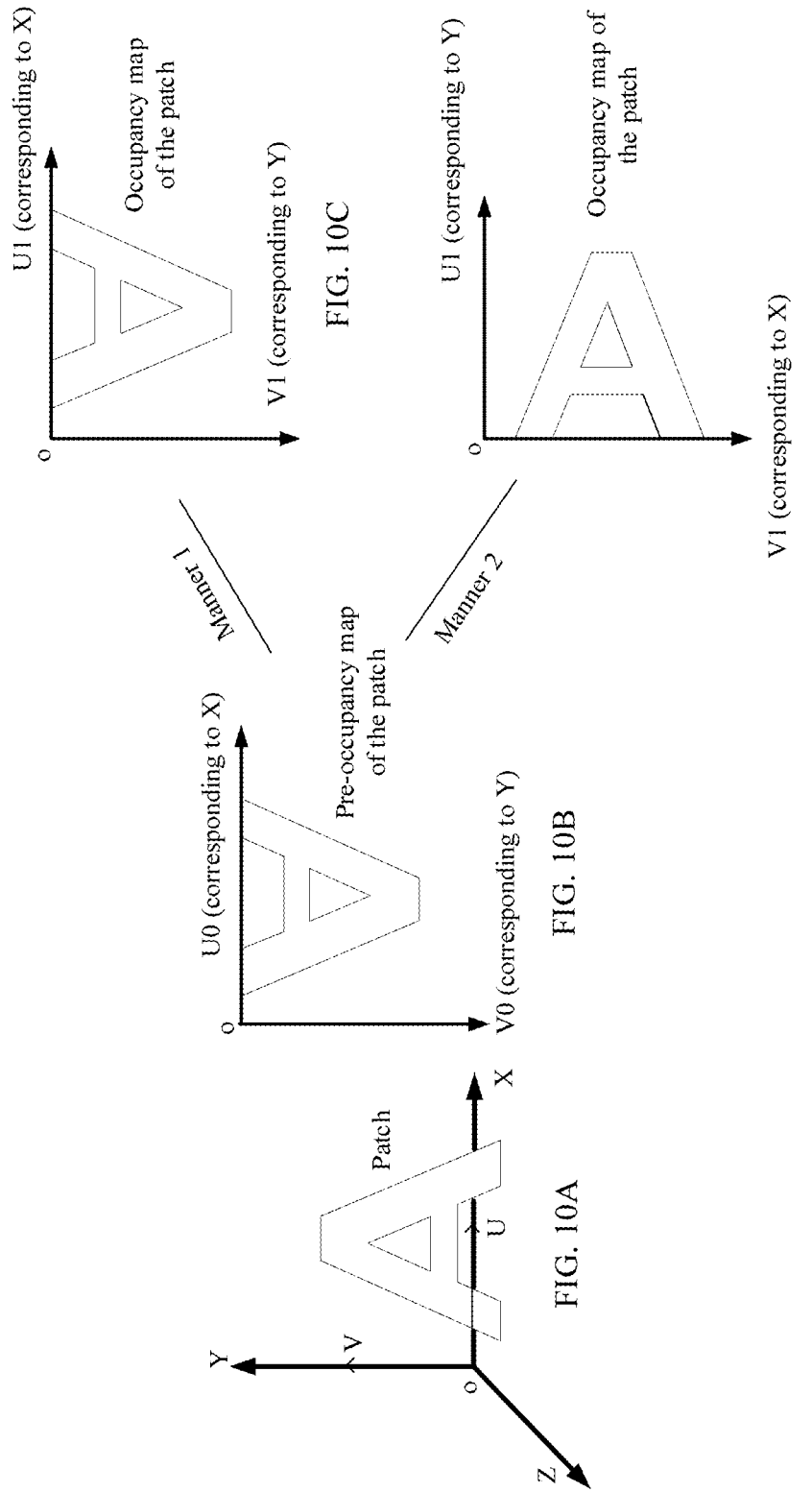
FIG. 10A, FIG. 10B, FIG. 10C, and FIG. 10D are a schematic diagram of a patch, a pre-occupancy map of the patch, and an occupancy map of the patch according to an embodiment of this application.

Based on this, a patch, a pre-occupancy map of the patch, and an occupancy map of the patch that are provided in this embodiment of this application are shown in FIG. 10A to FIG. 10D. If a reference tangent axis and a reference bitangent axis of the patch shown in FIG. 10A are obtained by looking up Table 2, and the patch is mapped from the three-dimensional space to the two-dimensional space based on the reference tangent axis and the reference bitangent axis, an obtained pre-occupancy map of the patch is shown in FIG. 10B. If the relationship between the U0 axis, the V0 axis, the U1 axis, and the V1 axis is as described in Manner A, an obtained occupancy map of the patch is shown in FIG. 10C. If the relationship between the U0 axis, the V0 axis, the U1 axis, and the V1 axis is as described in Manner B, an obtained occupancy map of the patch is shown in FIG. 10D.

Figure 11:
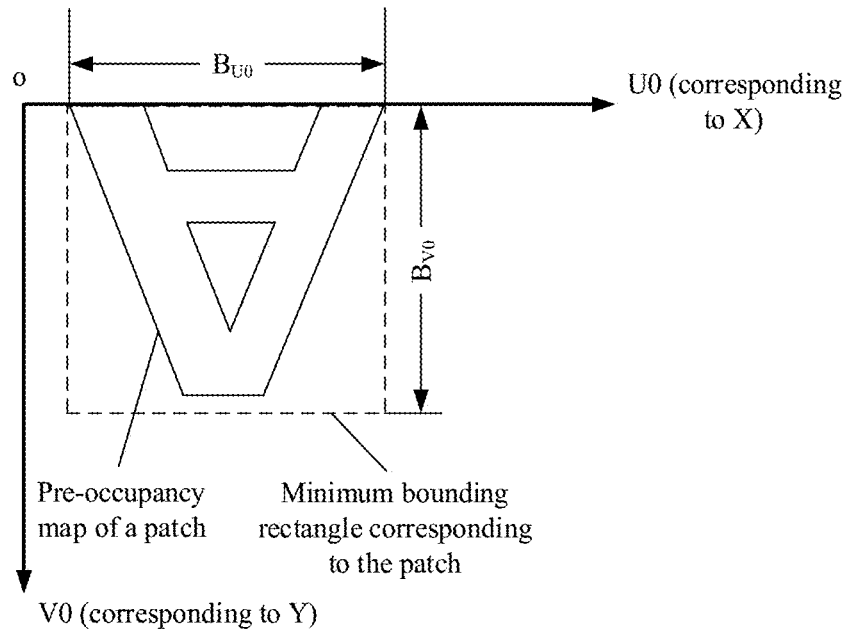
FIG. 11 is a schematic diagram of a minimum bounding rectangle corresponding to an example patch applicable to an embodiment of this application.

The description information of the minimum bounding rectangle corresponding to the patch is information used to describe the minimum bounding rectangle corresponding to the patch, and is further used to describe a side size (which may also be referred to as a two-dimensional size) of the minimum bounding rectangle. For example, $B_{U0}$ and $B_{V0}$ may be used to describe sizes of sides of the minimum bounding rectangle corresponding to the patch, as shown in FIG. 11. $B_{U0}$ represents a size of a side, on the U0 axis (or an axis parallel to the U0 axis), of the minimum bounding rectangle corresponding to the patch, and $B_{V0}$ represents a size of a side, on the V0 axis (or an axis parallel to the V0 axis), of the minimum bounding rectangle corresponding to the patch. The description information of the minimum bounding rectangle corresponding to the patch may include a relationship between sizes of sides of the minimum bounding rectangle corresponding to the patch.

Generally, a side corresponding to a larger value of $B_{U0}$ and $B_{V0}$ of the patch is a longest side of the minimum bounding rectangle corresponding to the patch, and a side corresponding to a smaller value is a shortest side of the minimum bounding rectangle corresponding to the patch. Particularly, if $B_{U0}$ is equal to $B_{V0}$, either of $B_{U0}$ and $B_{V0}$ may be used as the longest side of the minimum bounding rectangle corresponding to the patch, and the other one is used as the shortest side of the minimum bounding rectangle corresponding to the patch.

The foregoing describes related terms in the embodiments from a perspective of a general patch, and the general patch includes the to-be-encoded patch.

A manner of obtaining the normal axis of the to-be-encoded patch is not limited in this embodiment of this application. For example, reference may be made to the current technology. In this embodiment of this application, an example in which the normal axis of the to-be-encoded patch is one of the X axis, the Y axis, and the Z axis of the world coordinate system is used for description.

Optionally, the tangent axis and the bitangent axis of the to-be-encoded patch may be determined by performing the following S102.

S102: Determine the tangent axis of the to-be-encoded patch and the bitangent axis of the to-be-encoded patch based on the normal axis of the to-be-encoded patch and the description information of the minimum bounding rectangle corresponding to the to-be-encoded patch.

Optionally, an encoder may predefine the following mapping relationship, for example, according to a protocol. The mapping relationship is a mapping relationship between the following items: a plurality of normal axes (or indexes of the plurality of normal axes) of a patch, a plurality of types of description information (or indexes of the plurality of types of description information) of a minimum bounding rectangle corresponding to the patch, a plurality of tangent axes (or indexes of the plurality of tangent axes) of the patch, and a plurality of bitangent axes (or indexes of the plurality of bitangent axes) of the patch. Then, after the encoder obtains the normal axis (or an index of the normal axis) of the to-be-encoded patch and the description information (or an index of the description information) of the minimum bounding rectangle corresponding to the to-be-encoded patch, the encoder obtains the tangent axis (or an index of the tangent axis of the to-be-encoded patch) and the bitangent axis (or an index of the bitangent axis) of the to-be-encoded patch based on the foregoing mapping relationship.

A specific form of the mapping relationship is not limited in this embodiment of this application. For example, the mapping relationship may be in a form of a table, a formula, or a logical judgment (for example, an if else operation or a switch operation) performed based on a condition. The following mainly uses an example in which the mapping relationship is in a form of a table for description. Based on this, when S102 is performed, the encoder may obtain the tangent axis and the bitangent axis of the to-be-encoded patch by looking up the table. It can be understood that the foregoing mapping relationship is embodied in one or more tables. This is not limited in this embodiment of this application. For ease of description, the embodiments of this application are described using an example in which the foregoing mapping relationship is embodied in one table. A general description is provided herein, and details are not described below.

When the description information of the minimum bounding rectangle corresponding to the patch includes the relationship between sizes of sides of the minimum bounding rectangle corresponding to the patch, possible description information of the minimum bounding rectangle corresponding to the patch and indexes of the description information may be shown in Table 3.

TABLE 3

|  | Relationship between sizes of sides of the minimum bounding rectangle corresponding to a patch | |
| --- | --- | --- |
|  | $B_{U0} \geq B_{V0}$ | $B_{V0} > B_{U0}$ |
| Index of the relationship between sizes of sides of the minimum bounding rectangle corresponding to the patch | 0 | 1 |

$B_{U0} \geq B_{V0}$ may include two cases: $B_{U0} > B_{V0}$ and $B_{U0} = B_{V0}$. It may be considered that in Table 3, an example in which both the two cases "$B_{U0} = B_{V0}$" and "$B_{U0} > B_{V0}$" correspond to an index "0" is used for description. Alternatively, both two cases "$B_{U0} = B_{V0}$" and "$B_{V0} > B_{U0}$" may correspond to an index "1". In this case, a relationship corresponding to the index "1" may be replaced with "$B_{V0} \geq B_{U0}$".

It should be noted that Table 3 is merely an example, and does not constitute any limitation on the possible description information of the minimum bounding rectangle corresponding to the patch and the indexes of the description information, where the possible description information and the indexes of the description information are provided in this embodiment of this application. The following uses the example in which "possible description information of the minimum bounding rectangle corresponding to the patch and indexes of the description information" shown in Table 3 for description.

S103: Project the to-be-encoded patch from the three-dimensional space to the two-dimensional space based on the tangent axis of the to-be-encoded patch and the bitangent axis of the to-be-encoded patch, to obtain an occupancy map of the to-be-encoded patch.

Further, if the tangent axis of the to-be-encoded patch is the same as the reference tangent axis of the to-be-encoded patch, and the bitangent axis of the to-be-encoded patch is the same as the reference bitangent axis of the to-be-encoded patch, a pre-occupancy map of the to-be-encoded patch may be directly used as the occupancy map of the to-be-encoded patch, as shown in FIG. 10B and FIG. 10C. If the tangent axis of the to-be-encoded patch is the same as the reference bitangent axis of the to-be-encoded patch, and the bitangent axis of the to-be-encoded patch is the same as the reference tangent axis of the to-be-encoded patch, the occupancy map of the to-be-encoded patch may be obtained based on a pre-occupancy map of the to-be-encoded patch, as shown in FIG. 10B and FIG. 10D. In addition, S103 may be alternatively implemented using the current technology.

After the encoder performs S103 to obtain the occupancy map of the to-be-encoded patch, for steps performed by the encoder, refer to the foregoing description of the encoder shown in FIG. 2. However, this is not limited thereto. Details are not described herein again.

S104: Encode a syntax element into a bitstream, where the syntax element is used to indicate the tangent axis of the to-be-encoded patch and the bitangent axis of the to-be-encoded patch, and the syntax element includes the index of the normal axis of the to-be-encoded patch and information used to indicate the description information of the minimum bounding rectangle corresponding to the to-be-encoded patch.

The information used to indicate the description information of the minimum bounding rectangle corresponding to the to-be-encoded patch may include information 1 or information 2.

The information 1 is the index of the relationship between sizes of sides of the minimum bounding rectangle corresponding to the to-be-encoded patch. For example, if $B_{U0}=10$ centimeters (cm), and $B_{V0}=8$ cm, it can be learned from Table 3 that the information used to indicate the description information of the minimum bounding rectangle corresponding to the to-be-encoded patch may include the index "0" of the relationship (that is, $B_{U0} > B_{V0}$) between the sizes of the sides of the minimum bounding rectangle corresponding to the to-be-encoded patch.

The information 2 is size information (or side size information) of the minimum bounding rectangle corresponding to the to-be-encoded patch. For example, assuming that $B_{U0}$=10 cm and $B_{V0}$=8 cm, the information used to indicate the description information of the minimum bounding rectangle corresponding to the to-be-encoded patch may include $B_{U0}$=10 cm and $B_{V0}$=8 cm.

During specific implementation, whether the information used to indicate the description information of the minimum bounding rectangle corresponding to the to-be-encoded patch includes the information 1 or the information 2 may be predefined (for example, predefined according to a protocol). Certainly, this application is not limited thereto.

During specific implementation, information encoded into the bitstream may further include auxiliary information such as size information of a minimum bounding rectangle of an occupancy map of the to-be-encoded patch. Based on this, with reference to the information 1 and the information 2, the following optional implementations are provided in this embodiment of this application.

Optionally, if the information used to indicate the description information of the minimum bounding rectangle corresponding to the to-be-encoded patch includes the information 1, the encoder may further encode the size information of the minimum bounding rectangle of the occupancy map of the to-be-encoded patch into the bitstream.

Optionally, if the information used to indicate the description information of the minimum bounding rectangle corresponding to the to-be-encoded patch includes the information 2, the encoder may not encode the size information of the minimum bounding rectangle of the occupancy map of the to-be-encoded patch into the bitstream. In this way, bitstream transmission overheads can be reduced. In this case, a decoder may determine, based on the size information (that is, $B_{U0}$ and $B_{V0}$) of the minimum bounding rectangle corresponding to the to-be-encoded patch (a minimum bounding rectangle of a pre-occupancy map of the to-be-encoded patch), whether the tangent axis of the to-be-encoded patch is the same as the reference tangent axis or the reference bitangent axis. If the tangent axis of the to-be-encoded patch is the same as the reference tangent axis, the decoder determines that a relationship between the size information (that is, $B_{U1}$ and $B_{V1}$) of the minimum bounding rectangle of the occupancy map of the to-be-encoded patch and the size information of the minimum bounding rectangle of the pre-occupancy map is $B_{U1}=B_{U0}$ and $B_{V1}=B_{V0}$. If the tangent axis of the patch is the same as the reference bitangent axis, the decoder determines that a relationship between the size information of the minimum bounding rectangle of the occupancy map of the to-be-encoded patch and the size information of the minimum bounding rectangle of the pre-occupancy map is $B_{U1}=B_{V0}$, and $B_{V1}=B_{U0}$.

Both the index of the normal axis of the to-be-encoded patch and the information used to indicate the description information of the minimum bounding rectangle corresponding to the to-be-encoded patch are patch-level information. Therefore, with reference to the bitstream structure shown in FIG. 3, if the to-be-encoded point cloud is the $1^{st}$ frame of point cloud in the GOF, the two pieces of information may be encoded into the field 1104 in the bitstream. The two pieces of information may be encoded into the bitstream at the same time, or certainly, the two pieces of information may be encoded into the bitstream at different times.

An order of performing S102 and S103 and performing S104 is not limited in this embodiment of this application. For example, S102 and S103 may be performed before S104, or S104 may be performed before S102 and S103, or S104 may be performed in a process of performing S102 and S103.

In this embodiment, in one aspect, the description information of the minimum bounding rectangle corresponding to the patch may reflect a pose of the patch. For example, the pose of the patch may be represented by whether an occupancy map obtained by mapping the patch from the three-dimensional space to the two-dimensional space is vertical or horizontal. For example, the occupancy map of the patch shown in FIG. 10C is vertical, and the occupancy map of the patch shown in FIG. 10D is horizontal. In another aspect, whether an occupancy map of a patch of a same pose is vertical or horizontal affects a size of an occupancy map of a point cloud obtained by packing the occupancy map of the patch. Therefore, the tangent axis and the bitangent axis of the to-be-encoded patch are determined based on the normal axis of the to-be-encoded patch and the description information of the minimum bounding rectangle corresponding to the to-be-encoded patch. This is favorable to implementing that occupancy maps of patches are closely arranged in the occupancy map of the point cloud by adjusting an orientation (a vertical orientation or a horizontal orientation) of the occupancy map of the to-be-encoded patch, that is, there are a comparatively few empty pixels in the occupancy map of the point cloud, thereby helping perform image-/video-based encoding on a depth map and a texture map that are determined based on the occupancy map of the point cloud. That is, this can improve point cloud encoding performance, and further improve point cloud decoding performance. For example, if the tangent axis and the bitangent axis of the patch are determined using the current technology, only the occupancy map of the point cloud shown in FIG. 8B can be obtained based on the point cloud shown in FIG. 8A. However, if the tangent axis and the bitangent axis of the patch are determined using the method provided in this embodiment of this application, the occupancy map of each patch in FIG. 8B can be set to be vertical or horizontal such that the occupancy maps of the patches in the point cloud are closely arranged in the occupancy map of the point cloud.

Optionally, if the description information of the minimum bounding rectangle corresponding to the patch includes the relationship between sizes of sides of the minimum bounding rectangle corresponding to the patch, a mapping relationship between the normal axis of the patch, the description information of the minimum bounding rectangle corresponding to the patch, the tangent axis of the patch, and the bitangent axis of the patch may be the case in the following Solution 1 or Solution 2. Whether the mapping relationship is the case in Solution 1 or Solution 2 may be predefined (for example, predefined according to a protocol), or may be notified by the encoder to the decoder by encoding indication information into a bitstream. Specific content of the indication information is not limited in this embodiment of this application. For example, the indication information may be an identifier of Solution 1 or Solution 2, or may be information used to indicate a projection rule below.

Solution 1 An axis on which a longest side of the minimum bounding rectangle corresponding to the to-be-encoded patch is located is the bitangent axis of the to-be-encoded patch, and an axis on which a shortest side of the minimum bounding rectangle corresponding to the to-be-encoded patch is located is the tangent axis of the to-be-encoded patch.

Based on Solution 1, if the reference tangent axis and the reference bitangent axis of the patch are determined based on Table 2 in the pre-projection process, "a mapping relationship between the following items a plurality of normal axes of a patch, a plurality of types of description information of a minimum bounding rectangle corresponding to the patch, a plurality of tangent axes of the patch, and a plurality of bitangent axes of the patch" provided in this embodiment of this application may be shown in Table 4.

TABLE 4

| Index of the normal axis of the patch | Index of the relationship between sizes of sides of the minimum bounding rectangle corresponding to the patch | Index of the tangent axis of the patch | Index of the bitangent axis of the patch |
|---|---|---|---|
| 0 | 0 | 1 | 2 |
|   | 1 | 2 | 1 |
| 1 | 0 | 0 | 2 |
|   | 1 | 2 | 0 |
| 2 | 0 | 1 | 0 |
|   | 1 | 0 | 1 |

For example, refer to Table 4. It can be learned that, when the index of the normal axis of the patch is 0, and the index of the relationship between sizes of sides of the minimum bounding rectangle corresponding to the patch is 0, the index of the tangent axis of the patch is 1, and the index of the bitangent axis of the patch is 2. With reference to Table 1 to Table 3, it can be learned that this example is as follows. If the reference tangent axis (the U0 axis) of the patch is the Z axis, and the reference bitangent axis (the V0 axis) of the patch is the Y axis, when the normal axis of the patch is the X axis, and $B_{U0} \geq B_{V0}$, the tangent axis (the U1 axis) of the patch is the Y axis, and the bitangent axis (the V1 axis) of the patch is the Z axis. Principles of other examples are similar to the principle described herein, and are not enumerated herein.

Solution 2: An axis on which a longest side of the minimum bounding rectangle corresponding to the to-be-encoded patch is located is the tangent axis of the to-be-encoded patch, and an axis on which a shortest side of the minimum bounding rectangle corresponding to the to-be-encoded patch is located is the bitangent axis of the to-be-encoded patch.

Based on Solution 2, if the reference tangent axis and the reference bitangent axis of the patch are determined based on Table 2 in the pre-projection process, "a mapping relationship between the following items: a plurality of normal axes of a patch, a plurality of types of description information of a minimum bounding rectangle corresponding to the patch, a plurality of tangent axes of the patch, and a plurality of bitangent axes of the patch" provided in this embodiment of this application may be shown in Table 5.

TABLE 5

| Index of the normal axis of the patch | Index of the relationship between sizes of sides of the minimum bounding rectangle corresponding to the patch | Index of the tangent axis of the patch | Index of the bitangent axis of the patch |
|---|---|---|---|
| 0 | 0 | 2 | 1 |
|   | 1 | 1 | 2 |
| 1 | 0 | 2 | 0 |
|   | 1 | 0 | 2 |
| 2 | 0 | 0 | 1 |
|   | 1 | 1 | 0 |

For example, refer to Table 5. It can be learned that, when the index of the normal axis of the patch is 0, the index of the relationship between sizes of sides of the minimum bounding rectangle corresponding to the patch is 0, the index of the tangent axis of the patch is 2, and the index of the bitangent axis of the patch is 1. With reference to Table 1 to Table 3, it can be learned that this example is as follows. If the reference tangent axis (the U0 axis) of the patch is the Z axis, and the reference bitangent axis (the V0 axis) of the patch is the Y axis, when the normal axis of the patch is the X axis, when $B_{U0} \geq B_{V0}$, the tangent axis (the U1 axis) of the patch is the Z axis, and the bitangent axis (the V1 axis) of the patch is the Y axis. Principles of other examples are similar to the principle described herein, and are not enumerated herein.

It should be noted that both Table 4 and Table 5 are described using the example in which the reference tangent axis and the reference bitangent axis of the patch are determined based on Table 2 in the pre-projection process. This embodiment of this application is not limited thereto.

Optionally, S102 may be implemented using one of the following steps S102A to S102C (not shown).

S102A: Determine, based on the mapping relationship, a target tangent axis and a target bitangent axis that correspond to both the normal axis of the to-be-encoded patch and the description information of the minimum bounding rectangle corresponding to the to-be-encoded patch, where the mapping relationship is a mapping relationship between the following items: a plurality of normal axes of a patch, a plurality of types of description information of a minimum bounding rectangle corresponding to the patch, a plurality of tangent axes of the patch, and a plurality of bitangent axes of the patch. The target tangent axis is the tangent axis of the to-be-encoded patch, and the target bitangent axis is the bitangent axis of the to-be-encoded patch.

S102A may be replaced with the following content. Determine, based on the mapping relationship, an index of a target tangent axis and an index of a target bitangent axis that correspond to both the index of the normal axis of the to-be-encoded patch and an index of the description information of the minimum bounding rectangle corresponding to the to-be-encoded patch, where the mapping relationship is a mapping relationship between the following items indexes of a plurality of normal axes of a patch, indexes of a plurality of types of description information of a minimum bounding rectangle corresponding to the patch, indexes of a plurality of tangent axes of the patch, and indexes of a plurality of bitangent axes of the patch. The index of the target tangent axis is an index of the tangent axis of the to-be-encoded patch, and the index of the target bitangent axis is an index of the bitangent axis of the to-be-encoded patch. For example, the mapping relationship may be shown in Table 4 or Table 5.

S102B: Look up a table based on the normal axis of the to-be-encoded patch and the description information of the minimum bounding rectangle corresponding to the to-be-encoded patch, to obtain a target tangent axis and a target bitangent axis that correspond to both the normal axis of the to-be-encoded patch and the description information of the minimum bounding rectangle corresponding to the to-be-encoded patch. The target tangent axis is the tangent axis of the to-be-encoded patch, and the target bitangent axis is the bitangent axis of the to-be-encoded patch. The table that is looked up includes a mapping relationship between the following items: a plurality of normal axes of a patch, a plurality of types of description information of a minimum bounding rectangle corresponding to the patch, a plurality of tangent axes of the patch, and a plurality of bitangent axes of the patch.

S102B may be replaced with the following content. Look up a table based on the index of the normal axis of the to-be-encoded patch and an index of the description information of the minimum bounding rectangle corresponding to the to-be-encoded patch, to obtain an index of a target tangent axis and an index of a target bitangent axis that correspond to both the index of the normal axis of the to-be-encoded patch and the index of the description information of the minimum bounding rectangle corresponding to the to-be-encoded patch. The index of the target tangent axis is an index of the tangent axis of the to-be-encoded patch, and the index of the target bitangent axis is an index of the bitangent axis of the to-be-encoded patch. The table that is looked up includes a mapping relationship between the following items a plurality of normal axes of a patch, a plurality of types of description information of a minimum bounding rectangle corresponding to the patch, a plurality of tangent axes of the patch, and a plurality of bitangent axes of the patch. For example, the table that is looked up may be Table 4 or Table 5. Certainly, this embodiment of this application is not limited thereto.

S102C: Determine, according to the projection rule, the tangent axis of the to-be-encoded patch and the bitangent axis of the to-be-encoded patch based on the normal axis of the to-be-encoded patch and the description information of the minimum bounding rectangle corresponding to the to-be-encoded patch. The projection rule refers to distribution, in the two-dimensional space, of one or more occupancy map obtained by projecting one or more patches (for example, all patches) in the to-be-encoded point cloud to the two-dimensional space. For a specific implementation of determining the tangent axis of the to-be-encoded patch and the bitangent axis of the to-be-encoded patch based on the normal axis of the to-be-encoded patch and the description information of the minimum bounding rectangle corresponding to the to-be-encoded patch, refer to S102A. Optionally, the projection rule may include vertical projection or horizontal projection.

Vertical projection refers to a rule for enabling occupancy maps obtained by projecting most or all patches in a point cloud to a two-dimensional space to be vertically distributed in the two-dimensional space. For example, if the tangent axis of the patch is the horizontal axis, and the bitangent axis of the patch is the vertical axis, vertical projection refers to a rule for enabling a longest side of a minimum bounding rectangle of occupancy maps obtained by projecting all the patches in the point cloud to the two-dimensional space to be located on the bitangent axis.

Horizontal projection refers to a rule for enabling occupancy maps obtained by projecting most or all patches in a point cloud to a two-dimensional space to be horizontally distributed in the two-dimensional space. For example, if the tangent axis of the patch is the horizontal axis, and the bitangent axis of the patch is the vertical axis, horizontal projection refers to a rule for enabling a longest side of a minimum bounding rectangle of occupancy maps obtained by projecting all the patches in the point cloud to the two-dimensional space to be located on the tangent axis of the patch.

The projection rule may be predefined, for example, predefined according to a protocol. In addition, the projection rule may be determined according to a rate-distortion cost criterion. For example, the projection rule is determined from a candidate projection rule set according to the rate-distortion cost criterion. The candidate projection rule set may include at least two projection rules, for example, including horizontal projection and vertical projection.

Optionally, if the projection rule is not predefined, after the encoder obtains the projection rule, the encoder may encode, into the bitstream, information used to indicate the projection rule in order to notify the projection rule to the decoder. It can be understood that, the information used to indicate the projection rule is frame-level information. Therefore, with reference to FIG. 3, if the to-be-encoded point cloud is the $1^{st}$ frame of point cloud in the GOF, the information used to indicate the projection rule may be encoded into the field 1103 in the bitstream.

When the projection rule indicates vertical projection, the mapping relationship between the following items a plurality of normal axes of a patch, a plurality of types of description information of a minimum bounding rectangle corresponding to the patch, a plurality of tangent axes of the patch, and a plurality of bitangent axes of the patch may be the case in the foregoing Solution 1. In this case, the encoder may obtain the tangent axis and the bitangent axis of the to-be-encoded patch by looking up Table 4. When the projection rule indicates horizontal projection, the mapping relationship may be the case in the foregoing Solution 2. In this case, the encoder may obtain the tangent axis and the bitangent axis of the to-be-encoded patch by looking up Table 5.

The foregoing description is provided using the example in which the projection rule includes vertical projection and horizontal projection. The projection rule may further include another projection rule. In this case, the encoder may predefine (for example, predefine according to a protocol) a correspondence between each projection rule and "the mapping relationship between the following items: a plurality of normal axes of a patch, a plurality of types of description information of a minimum bounding rectangle corresponding to the patch, a plurality of tangent axes of the patch, and a plurality of bitangent axes of the patch". In this way, after determining the projection rule for projecting the to-be-encoded point cloud, the encoder may obtain "the mapping relationship between the following items: a plurality of normal axes of a patch, a plurality of types of description information of a minimum bounding rectangle corresponding to the patch, a plurality of tangent axes of the patch, and a plurality of bitangent axes of the patch" that corresponds to the projection rule, and further determine the tangent axis and the bitangent axis of the to-be-encoded patch based on the mapping relationship.

Figure 12:
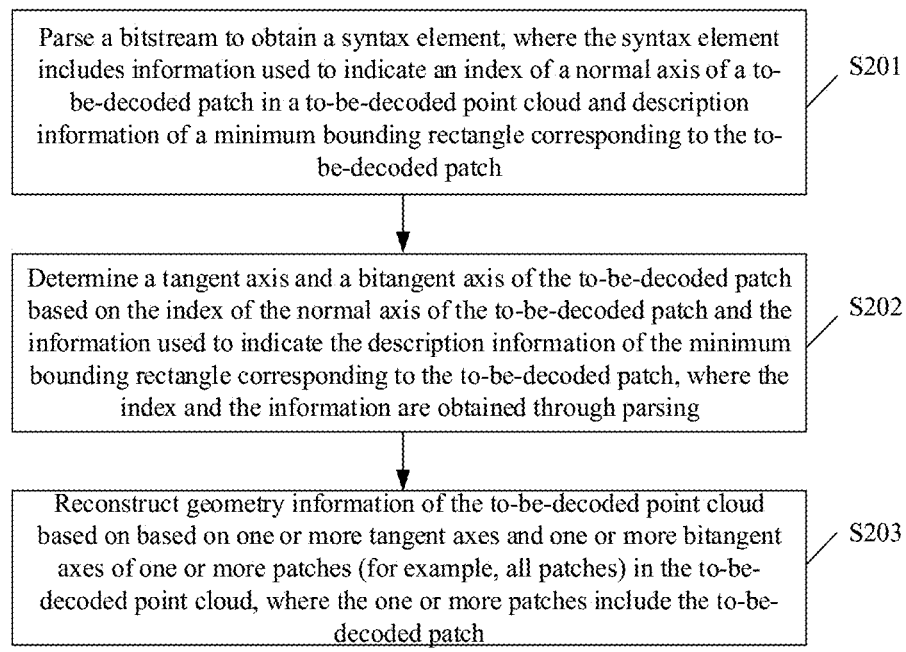
FIG. 12 is a schematic flowchart of a point cloud decoding method according to an embodiment of this application.

FIG. 12 is a schematic flowchart of a point cloud decoding method according to an embodiment of this application. The point cloud decoding method provided in this embodiment corresponds to the point cloud encoding method provided in the embodiment shown in FIG. 9. Therefore, for explanations of related content and beneficial effects in this embodiment, refer to the embodiment shown in FIG. 9. The method shown in FIG. 12 may include the following steps.

S201: Parse a bitstream to obtain a syntax element, where the syntax element includes an index of a normal axis of a to-be-decoded patch in a to-be-decoded point cloud and information used to indicate description information of a minimum bounding rectangle corresponding to the to-be-decoded patch.

The to-be-decoded point cloud may be a point cloud that is transmitted by an encoder to a decoder after the encoder encodes the to-be-encoded point cloud in the embodiment shown in FIG. 9. The to-be-decoded patch may be a patch that is transmitted by the encoder to the decoder after the encoder encodes the to-be-encoded patch in the embodiment shown in FIG. 9. With reference to the bitstream structure shown in FIG. 3, if the to-be-decoded point cloud is the 1$^{st}$ frame of point cloud in the GOF, S201 may include parsing the field 1104, to obtain the index of the normal axis of the to-be-decoded patch and the information used to indicate the description information of the minimum bounding rectangle corresponding to the to-be-decoded patch.

Optionally, the description information of the minimum bounding rectangle corresponding to the to-be-decoded patch may include a relationship between sizes of sides of the minimum bounding rectangle corresponding to the to-be-decoded patch.

Optionally, the information used to indicate the description information of the minimum bounding rectangle corresponding to the to-be-decoded patch may include an index of the relationship between sizes of sides of the minimum bounding rectangle corresponding to the to-be-decoded patch, or size information (or side size information) of the minimum bounding rectangle corresponding to the to-be-decoded patch. A specific type of included information may be predefined, for example, predefined according to a protocol, and the information is consistent with information predefined by the encoder. Certainly, this embodiment of this application is not limited thereto.

S202: Determine a tangent axis and a bitangent axis of the to-be-decoded patch based on the index of the normal axis of the to-be-decoded patch and the information used to indicate the description information of the minimum bounding rectangle corresponding to the to-be-decoded patch, where the index and the information are obtained through parsing.

Optionally, the decoder may predefine the following mapping relationship, for example, according to a protocol, where the mapping relationship is consistent with a mapping relationship predefined by the encoder. The mapping relationship is a mapping relationship between the following items: a plurality of normal axes (or indexes of the plurality of normal axes) of a patch, a plurality of types of description information (or indexes of the plurality of types of description information) of a minimum bounding rectangle corresponding to the patch, a plurality of tangent axes (or indexes of the plurality of tangent axes) of the patch, and a plurality of bitangent axes (or indexes of the plurality of bitangent axes) of the patch. Then, after the decoder parses the bitstream to obtain the index of the normal axis of the to-be-decoded patch and the description information used to indicate the minimum bounding rectangle corresponding to the to-be-decoded patch, the decoder obtains the tangent axis of the to-be-decoded patch (or an index of the tangent axis of the to-be-decoded patch) and the bitangent axis of the to-be-decoded patch (or an index of the bitangent axis of the to-be-decoded patch) based on the foregoing mapping relationship.

If the information used to indicate the description information of the minimum bounding rectangle corresponding to the to-be-decoded patch includes the size information of the minimum bounding rectangle corresponding to the to-be-decoded patch, the decoder may first obtain, based on the size information of the minimum bounding rectangle corresponding to the to-be-decoded patch, the description information (or the index of the description information) of the minimum bounding rectangle corresponding to the to-be-decoded patch, and then obtain the tangent axis of the to-be-decoded patch and the bitangent axis of the to-be-decoded patch based on the foregoing mapping relationship.

If the decoder stores the foregoing mapping relationship in form of a table, the foregoing mapping relationship may be the mapping relationship shown in Table 4 or Table 5. Based on this, the decoder may obtain the tangent axis and the bitangent axis of the to-be-decoded patch by looking up the table.

S203: Reconstruct geometry information of the to-be-decoded point cloud based on one or more tangent axes and one or more bitangent axes of one or more patches (for example, all patches) in the to-be-decoded point cloud, where the one or more patches include the to-be-decoded patch.

For the geometry information of the point cloud and a specific implementation of S203, refer to the foregoing descriptions. Details are not described herein again.

Because the point cloud decoding method provided in this embodiment corresponds to the point cloud encoding method provided above, for beneficial effects that can be achieved in this embodiment, refer to the related descriptions in the foregoing embodiment of the point cloud encoding method.

Optionally, S202 may be implemented using one of the following steps S202A to S202C (not shown).

S202A: Determine, based on the mapping relationship, a target tangent axis and a target bitangent axis that correspond to both the normal axis of the to-be-decoded patch and the description information of the minimum bounding rectangle corresponding to the to-be-decoded patch, where the mapping relationship is a mapping relationship between the following items: a plurality of normal axes of a patch, a plurality of types of description information of a minimum bounding rectangle corresponding to the patch, a plurality of tangent axes of the patch, and a plurality of bitangent axes of the patch. The target tangent axis is the tangent axis of the to-be-decoded patch, and the target bitangent axis is the bitangent axis of the to-be-decoded patch.

S202A may be replaced with the following content. Determine, based on a mapping relationship, an index of a target tangent axis and an index of a target bitangent axis that correspond to both the index of the normal axis of the to-be-decoded patch and the index of the description information of the minimum bounding rectangle corresponding to the to-be-decoded patch, where the mapping relationship is a mapping relationship between the following items: indexes of a plurality of normal axes of a patch, indexes of a plurality of types of description information of a minimum bounding rectangle corresponding to the patch, indexes of a plurality of tangent axes of the patch, and indexes of a plurality of bitangent axes of the patch. The index of the target tangent axis is an index of the tangent axis of the to-be-decoded patch, and the index of the target bitangent axis is an index of the bitangent axis of the to-be-decoded patch. Further, the mapping relationship may be shown in Table 4 or Table 5.

S202B: Look up a table based on the normal axis of the to-be-decoded patch and the description information of the minimum bounding rectangle corresponding to the to-be-decoded patch, to obtain a target tangent axis and a target bitangent axis that correspond to both the normal axis of the to-be-decoded patch and the description information of the minimum bounding rectangle corresponding to the to-be-decoded patch. The target tangent axis is the tangent axis of the to-be-decoded patch, and the target bitangent axis is the bitangent axis of the to-be-decoded patch. The table that is looked up includes a mapping relationship between the following items: a plurality of normal axes of a patch, a plurality of types of description information of a minimum bounding rectangle corresponding to the patch, a plurality of tangent axes of the patch, and a plurality of bitangent axes of the patch.

S202B may be replaced with the following content. Look up a table based on the index of the normal axis of the to-be-decoded patch and the index of the description information of the minimum bounding rectangle corresponding to the to-be-decoded patch, to obtain an index of a target tangent axis and an index of a target bitangent axis that correspond to both the index of the normal axis of the to-be-decoded patch and the index of the description information of the minimum bounding rectangle corresponding to the to-be-decoded patch. The index of the target tangent axis is an index of the tangent axis of the to-be-decoded patch, and the index of the target bitangent axis is an index of the bitangent axis of the to-be-decoded patch. The table that is looked up includes a mapping relationship between the following items: a plurality of normal axes of the patch, a plurality of types of description information of a minimum bounding rectangle corresponding to the patch, a plurality of tangent axes of the patch, and a plurality of bitangent axes of the patch. For example, the table that is looked up may be Table 4 or Table 5. Certainly, this embodiment of this application is not limited thereto.

S202C: Determine, according to a projection rule (that is, a projection rule used for projecting the to-be-decoded point cloud), the tangent axis of the to-be-decoded patch and the bitangent axis of the to-be-decoded patch based on the normal axis of the to-be-decoded patch and the description information of the minimum bounding rectangle corresponding to the to-be-decoded patch. The projection rule refers to distribution, in a two-dimensional space, of one or more occupancy map obtained by projecting one or more patches in the to-be-decoded point cloud to the two-dimensional space. Optionally, the projection rule includes vertical projection or horizontal projection.

Optionally, the projection rule may be predefined, for example, predefined according to a protocol. In addition, the projection rule is consistent with a projection rule predefined by the encoder.

Optionally, the projection rule may be obtained by the decoder by parsing the bitstream. The syntax element obtained by parsing the bitstream includes information used to indicate the projection rule. The information used to indicate the projection rule is frame-level information. Specific information used to indicate the projection rule is not limited in this embodiment of this application. For example, the information may be an index of the projection rule. For example, if the projection rule indicates vertical projection, the index of the projection rule may be 0. If the projection rule indicates horizontal projection, the index of the projection rule may be 1. Certainly, this application is not limited thereto.

In an example, when the projection rule indicates vertical projection, the mapping relationship between the following items: a plurality of normal axes of a patch, a plurality of types of description information of a minimum bounding rectangle corresponding to the patch, a plurality of tangent axes of the patch, and a plurality of bitangent axes of the patch may be the case in the foregoing Solution 1. In this case, the decoder may obtain the tangent axis and the bitangent axis of the to-be-decoded patch by looking up Table 4. When the projection rule indicates horizontal projection, the mapping relationship may be the case in the foregoing Solution 2. In this case, the decoder may obtain the tangent axis and the bitangent axis of the to-be-decoded patch by looking up Table 5.

It can be understood that, when the information used to indicate the description information of the minimum bounding rectangle corresponding to the to-be-decoded patch is the relationship between sizes of sides of the minimum bounding rectangle corresponding to the to-be-decoded patch, the decoder may directly determine the tangent axis and the bitangent axis of the to-be-decoded patch in one of the following Manners 1 to 3. When the information used to indicate the description information of the minimum bounding rectangle corresponding to the to-be-decoded patch is the size information of the minimum bounding rectangle corresponding to the to-be-decoded patch, the decoder may first determine the relationship between sizes of sides of the minimum bounding rectangle corresponding to the to-be-decoded patch, and then determine the tangent axis and the bitangent axis of the to-be-decoded patch in one of the following Manners 1 to 3.

Figure 13:
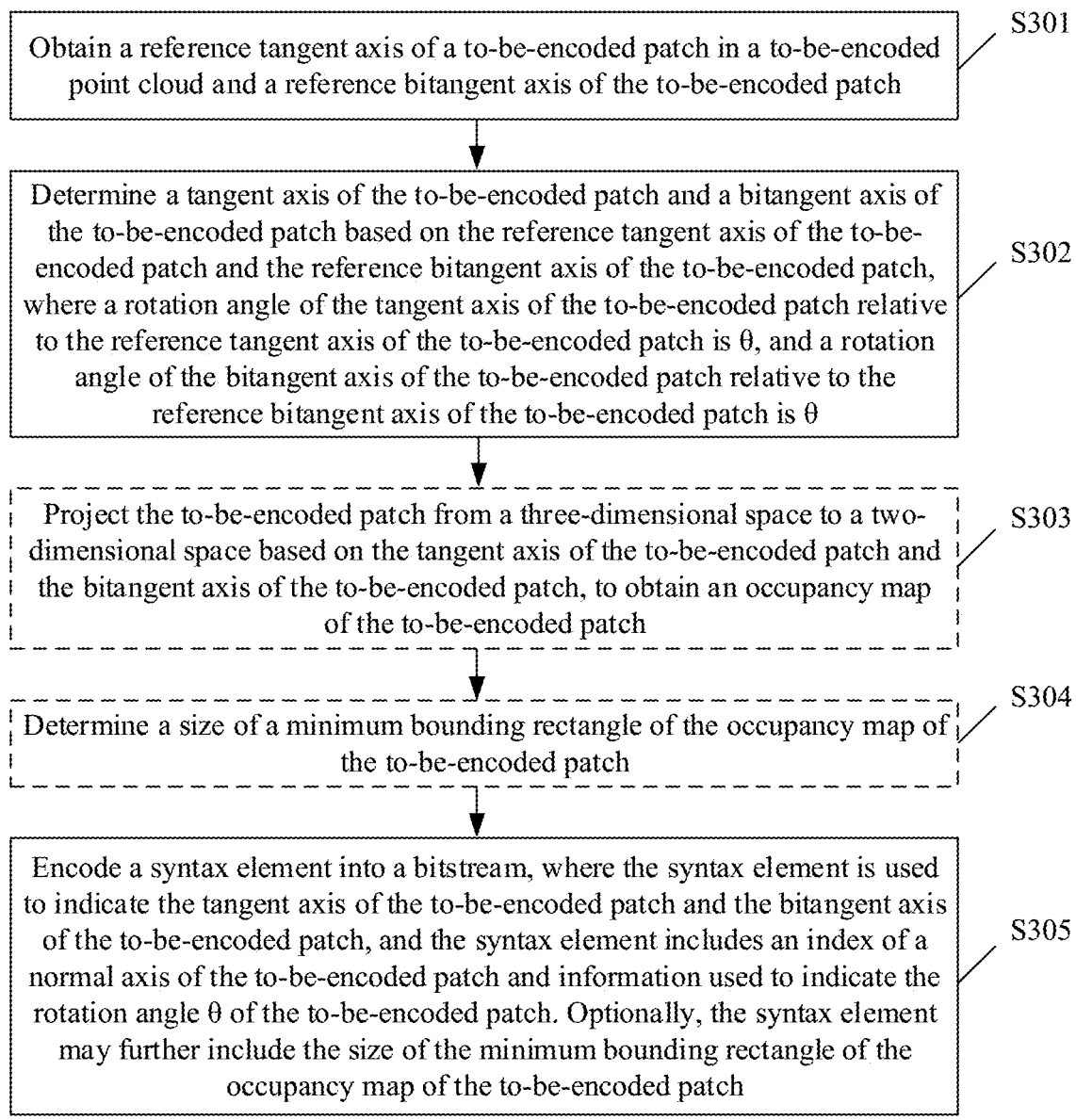
FIG. 13 is a schematic flowchart of a point cloud encoding method according to an embodiment of this application.

FIG. 13 is a schematic flowchart of a point cloud encoding method according to an embodiment of this application. The method may include the following steps.

S301: Obtain a reference tangent axis of a to-be-encoded patch in a to-be-encoded point cloud and a reference bitangent axis of the to-be-encoded patch. For related descriptions of the to-be-encoded point cloud, the to-be-encoded patch, and the reference tangent axis and the reference bitangent axis of the to-be-encoded patch, refer to the foregoing descriptions. Details are not described herein again.

Further, an index of the reference tangent axis of the to-be-encoded patch and an index of the reference bitangent axis of the to-be-encoded patch are obtained by looking up Table 2 based on an index of a normal axis of the to-be-encoded patch, and then the reference tangent axis and the reference bitangent axis of the to-be-encoded patch are obtained by looking up Table 1. Certainly, this embodiment of this application is not limited thereto.

S302: Determine a tangent axis of the to-be-encoded patch and a bitangent axis of the to-be-encoded patch based on the reference tangent axis of the to-be-encoded patch and the reference bitangent axis of the to-be-encoded patch, where a rotation angle of the tangent axis of the to-be-encoded patch relative to the reference tangent axis of the to-be-encoded patch is θ, and a rotation angle of the bitangent axis of the to-be-encoded patch relative to the reference bitangent axis of the to-be-encoded patch is θ.

The rotation angle θ may be an angle obtained by counterclockwise or clockwise rotating the tangent axis of the to-be-encoded patch relative to the reference tangent axis of the to-be-encoded patch. The tangent axis herein may be replaced with the bitangent axis. In this case, the reference tangent axis may be replaced with the reference bitangent axis. It should be noted that, for ease of description, the following uses an example in which a rotation direction is a counterclockwise direction for description. A general description is provided herein, and details are not described below.

If the reference tangent axis, the reference bitangent axis, the tangent axis, and the bitangent axis of the to-be-encoded patch are respectively denoted as a U0 axis, a V0 axis, a U1 axis, and a V1 axis, a relationship between the U0 axis, the V0 axis, the U1 axis, and the V1 axis in this embodiment is that a rotation angle of the U1 axis relative to the U0 axis is θ, and a rotation angle of the V1 axis relative to the V0 axis is θ.

Figure 14:
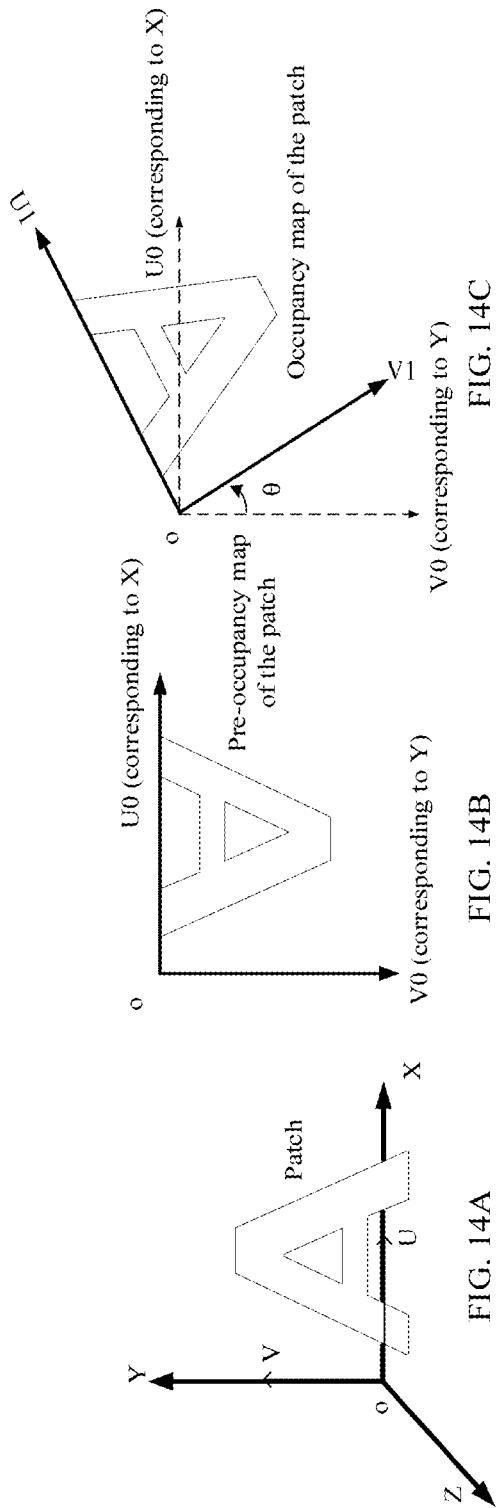
FIG. 14A, FIG. 14B, and FIG. 14C are a schematic diagram of a patch, a pre-occupancy map of the patch, and an occupancy map of the patch according to an embodiment of this application.

Based on this, a patch, a pre-occupancy map of the patch, and an occupancy map of the patch that are provided in this embodiment of this application are shown in FIG. 14A to FIG. 14C. If a reference tangent axis and a reference bitangent axis of the patch shown in FIG. 14A are obtained by looking up Table 2, and the patch is mapped from a three-dimensional space to a two-dimensional space based on the reference tangent axis and the reference bitangent axis, the obtained pre-occupancy map of the patch is shown in FIG. 14B. After the reference tangent axis and the reference bitangent axis are both counterclockwise rotated by an angle of θ, the obtained occupancy map of the patch is shown in FIG. 14C.

S303: Project the to-be-encoded patch from the three-dimensional space to the two-dimensional space based on the tangent axis of the to-be-encoded patch and the bitangent axis of the to-be-encoded patch, to obtain an occupancy map of the to-be-encoded patch.

For specific implementation of this step, refer to related descriptions in the following Manner 1 or Manner 2, or refer to a current technology.

S304: Determine a size of a minimum bounding rectangle of the occupancy map of the to-be-encoded patch. Subsequently, an encoder may obtain a depth map, a texture map, and the like of the to-be-encoded patch based on the size of the minimum bounding rectangle of the occupancy map of the to-be-encoded patch.

The minimum bounding rectangle is established based on a coordinate system that is constituted by the reference tangent axis and the reference bitangent axis of the to-be-encoded patch. That is, an axis on which a side of the minimum bounding rectangle is located is an axis other than the normal axis of the to-be-encoded patch in a world coordinate system or an axis parallel to the axis, and an axis on which another side is located is another axis in the world coordinate system or an axis parallel to the other axis.

It can be understood that, for resolving the technical problem described in the background part, S303 and S304 are optional technical features.

S305: Encode a syntax element into a bitstream, where the syntax element is used to indicate the tangent axis of the to-be-encoded patch and the bitangent axis of the to-be-encoded patch, and the syntax element includes an index of the normal axis of the to-be-encoded patch and information used to indicate the rotation angle θ of the to-be-encoded patch. Optionally, the syntax element may further include the size, determined in S304, of the minimum bounding rectangle of the occupancy map of the to-be-encoded patch, for example, a size of the minimum bounding rectangle on each axis of the coordinate system that is constituted by the reference tangent axis and the reference bitangent axis of the to-be-encoded patch. The size of the minimum bounding rectangle of the occupancy map of the to-be-encoded patch is used by a decoder side to obtain the depth map, the texture map, and the like of the to-be-encoded patch, to reconstruct geometry information of the to-be-decoded patch.

Both the index of the normal axis of the to-be-encoded patch and the information used to indicate the rotation angle θ of the to-be-encoded patch are patch-level information. Therefore, with reference to the bitstream structure shown in FIG. 3, if the to-be-encoded point cloud is the 1$^{st}$ frame of point cloud in the GOF, the two pieces of information may be encoded into the field 1104 in the bitstream. The two pieces of information may be encoded into the bitstream at the same time, or the two pieces of information may be encoded into the bitstream at different times. In addition, size information of the minimum bounding rectangle of the occupancy map of the to-be-encoded patch is also patch-level information.

Optionally, the information used to indicate the rotation angle θ of the to-be-encoded patch may include the rotation angle θ, or an index of the rotation angle θ, or an identifier of a patch that matches the to-be-encoded patch.

In this embodiment, the tangent axis and the bitangent axis of the to-be-encoded patch are obtained by rotating the reference tangent axis and the reference bitangent axis of the to-be-encoded patch. In this way, positions of occupancy maps of patches in an occupancy map of a point cloud may be adjusted by properly setting the rotation angle such that the occupancy maps of the patches are closely arranged in the occupancy map of the point cloud. This improves point cloud encoding performance, and further improves point cloud decoding performance. In addition, in comparison with the embodiment shown in FIG. 9, in this embodiment, the positions of the occupancy maps of the patches in the occupancy map of the point cloud can be more flexibly set such that the occupancy maps of the patches are arranged more densely (or more closely) in the occupancy map of the point cloud.

Optionally, before S302, the method may further include determining the rotation angle θ in one of the following manners.

Manner 1: Determine the rotation angle θ of the to-be-encoded patch from a plurality of candidate rotation angles according to a rate-distortion cost criterion.

Optionally, the plurality of candidate rotation angles may be angles obtained by evenly dividing 360° into N parts, where N is an integer greater than or equal to 2. For example, if N=4, the plurality of candidate rotation angles may be 0°, 90°, 180°, and 270°. If N=6, the plurality of candidate rotation angles may be 0°, 60°, 120°, 180°, 240°, and 300°. Certainly, this embodiment of this application is not limited thereto. For example, the plurality of candidate rotation angles may be alternatively angles obtained by unevenly dividing 360° into N parts.

Manner 1 may include the following steps 1 to 3.

Step 1: Perform the following steps 1-1 and 1-2 on a patch i (which is denoted as a patch[i]) in the to-be-encoded point cloud. 0≤i≤I−1, both i and I are integers, and I represents a quantity of patches included in the to-be-encoded point cloud.

Step 1-1: Project the patch[i] from the three-dimensional space to the two-dimensional space using a reference tangent axis and a reference bitangent axis of the patch[i], to obtain a reference occupancy map of the patch[i].

Step 1-2: First, traverse N possible rotation angles, and counterclockwise rotate the reference occupancy map of the patch[i] by each possible rotation angle, where a reference occupancy map, obtained through rotation, of the patch[i] is a pre-occupancy map of the patch[i]. Then, insert the pre-occupancy map of the patch [i] into an available region of a pre-occupancy map of the to-be-encoded point cloud. The available region is a region, in the pre-occupancy map of the to-be-encoded point cloud, into which a pre-occupancy map of a patch can be inserted.

Further, if the j$^{th}$ possible rotation angle of the patch [i] is $θ_j$, where 0≤j≤N−1, an image obtained by counterclockwise rotating the reference occupancy map of the patch [i] by $θ_j$ around the coordinate origin of a coordinate system that is constituted by the reference tangent axis and the reference bitangent axis of the patch [i] is the pre-occupancy map of the patch [i] obtained through rotation of the rotation angle $\theta_j$. If coordinates of a point P1 in an occupancy map (that is, the reference occupancy map) of the patch [i] are (x1, y1), coordinates of a point P2 obtained through rotation are (x2, y2), and $$x2 = x1 * \cos\theta_j - y1 * \sin\theta_j$$
$$y2 = x1 * \sin\theta_j + y1 * \cos\theta_j.$$

Step 2: After all patches in the to-be-encoded point cloud are processed according to step 1, collect statistics about a size of each obtained pre-occupancy map in the to-be-encoded point cloud.

For example, if N=4, there may be four possible rotation angles of each patch: 0°, 90°, 180°, and 270°. Because rotation angles of any two patches in the to-be-encoded point cloud may be the same or may be different, if the to-be-encoded point cloud includes three patches (which are denoted as patches 1 to 3), there are $4^3$ possible combinations (which are denoted as combinations 1 to $4^3$) of rotation angles of all the patches in the to-be-encoded point cloud. $4^3$ pre-occupancy maps (which are denoted as pre-occupancy maps 1 to $4^3$) of the to-be-encoded point cloud may be obtained through pre-packing. That is, in this example, sizes of the pre-occupancy maps 1 to $4^3$ need to be separately calculated. This is merely an example. In actual implementation, a possible rotation angle of each patch may be determined based on requirements (for example, based on a calculation complexity requirement and a bitstream transmission overhead requirement).

Step 3: Select, according to the rate-distortion cost criterion from pre-occupancy maps of the to-be-encoded point cloud that are obtained based on all possible combinations, a pre-occupancy map that enables bitstream transmission overheads to be lowest or a value of bitstream overheads to be less than or equal to a preset threshold (for example, selecting a pre-occupancy map that is of the to-be-encoded point cloud and that has a smallest size), and use a rotation angle of each patch corresponding to the selected pre-occupancy map as an optimal rotation angle of the corresponding patch. It can be understood that the selected pre-occupancy map may be subsequently used as the occupancy map of the to-be-encoded point cloud.

For example, based on the example in step 2, assuming that the pre-occupancy map that has the smallest size and that is selected from the $4^3$ pre-occupancy maps of the to-be-encoded point cloud according to the rate-distortion cost criterion is an occupancy map 5, rotation angles included in a combination 5 are correspondingly used as optimal rotation angles of patches in the to-be-encoded point cloud. For example, if the combination 5 includes a rotation angle of the patch 1 is 0°, a rotation angle of the patch 2 is 90°, and a rotation angle of the patch 3 is 180°, when the to-be-encoded patch is the patch 1, the rotation angle θ of the to-be-encoded patch is 0°, when the to-be-encoded patch is the patch 2, the rotation angle θ of the to-be-encoded patch is 90°, and when the to-be-encoded patch is the patch 3, the rotation angle θ of the to-be-encoded patch is 180°.

In Manner 1, the information used to indicate the rotation angle θ of the to-be-encoded patch may include the rotation angle θ, or the index of the rotation angle θ.

Manner 2: Obtain a rotation angle of a patch that matches the to-be-encoded patch in an encoded point cloud, and use the obtained rotation angle as the rotation angle θ of the to-be-encoded patch.

Optionally, the encoded point cloud may be any frame of encoded point cloud previous to the to-be-encoded point cloud. Optionally, the encoded point cloud may be an encoded point cloud that belongs to a same GOF as the to-be-encoded point cloud. Optionally, the encoded point cloud may be a previous frame of encoded point cloud of the to-be-encoded point cloud.

The patch that matches the to-be-encoded patch is a patch with a minimum matching cost. For example, the patch may be a patch that is in the encoded point cloud, has a same normal axis as the to-be-encoded patch, and has a largest intersection-over-union (IoU) between a corresponding minimum bounding rectangle and the minimum bounding rectangle corresponding to the to-be-encoded patch.

In Manner 2, the information used to indicate the rotation angle θ of the to-be-encoded patch may include the identifier of the patch that matches the to-be-encoded patch, or the rotation angle θ, or the index of the rotation angle θ.

In an implementation, the identifier of the patch that matches the to-be-encoded patch is used to indicate an index of the patch that matches the to-be-encoded patch. In this case, the syntax element may further include information used to indicate whether there is a patch that matches the to-be-encoded patch in the encoded point cloud. For example, the syntax element may include an identifier 1, and the identifier 1 is used to indicate whether there is a patch that matches the to-be-encoded patch in the encoded point cloud. When the identifier 1 is used to indicate that there is a patch that matches the to-be-encoded patch in the encoded point cloud, the syntax element may further include an identifier 2, and the identifier 2 is an index of the patch that matches the to-be-encoded patch.

In another implementation, the identifier of the patch that matches the to-be-encoded patch is used to indicate that there is the patch that matches the to-be-encoded patch in the encoded point cloud and an index of the patch that matches the to-be-encoded patch. For example, it is assumed that when there is a patch that matches the to-be-encoded patch in the encoded point cloud, the index of the patch that matches the to-be-encoded patch ranges from 0 to P−1, where P is an integer greater than or equal to 1. When there is no patch that matches the to-be-encoded patch in the encoded point cloud, the index of the patch that matches the to-be-encoded patch is a default value −1. Therefore, for ease of implementation, the bitstream may include a value that is obtained by adding 1 to the index of the patch that matches the to-be-encoded patch. That is, when there is a patch that matches the to-be-encoded patch in the encoded point cloud, the identifier of the patch that matches the to-be-encoded patch is a value greater than 0, and is a value obtained by adding 1 to the index of the patch that matches the to-be-encoded patch. When there is no patch that matches the to-be-encoded patch in the encoded point cloud, the identifier of the patch that matches the to-be-encoded patch is 0.

It should be noted that, in Manner 2, the identifier of the patch that matches the to-be-encoded patch is included in the syntax element to indirectly indicate the rotation angle θ of the to-be-encoded patch. Because in an inter prediction mode, the encoder needs to transmit, to the decoder, the identifier of the patch that matches the to-be-encoded patch, it may be considered that in the technical solution provided in Manner 2, the information used to indicate the rotation angle θ does not need to be additionally transmitted. Therefore, bitstream transmission overheads can be reduced. In addition, the encoder does not need to obtain the rotation angle θ. Therefore, calculation complexity of the encoder can be reduced.

Figure 15:
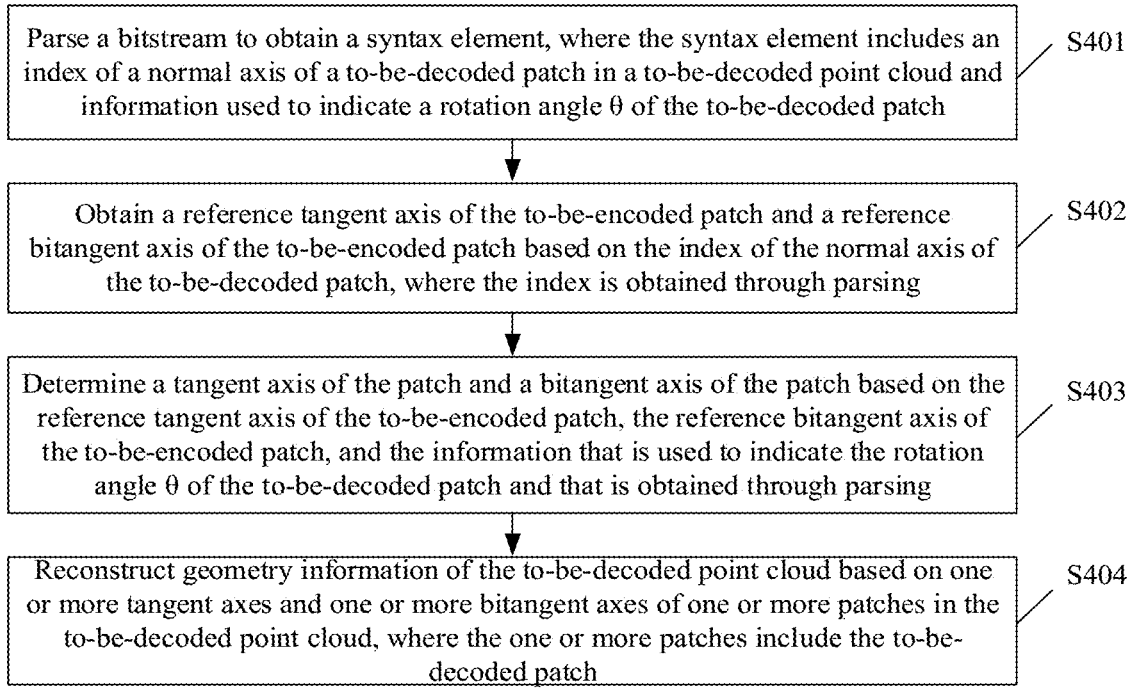
FIG. 15 is a schematic flowchart of a point cloud decoding method according to an embodiment of this application.

FIG. 15 is a schematic flowchart of a point cloud decoding method according to an embodiment of this application. The point cloud decoding method provided in this embodiment corresponds to the point cloud encoding method provided in the embodiment shown in FIG. 13. Therefore, for explanations of related content in this embodiment, refer to the embodiment shown in FIG. 13. The method shown in FIG. 15 may include the following steps.

S01: Parse a bitstream to obtain a syntax element, where the syntax element includes an index of a normal axis of a to-be-decoded patch in a to-be-decoded point cloud and information used to indicate a rotation angle θ of the to-be-decoded patch.

The to-be-decoded point cloud may be a point cloud that is transmitted by an encoder to a decoder after the encoder encodes the to-be-encoded point cloud in the embodiment shown in FIG. 13. The to-be-decoded patch may be a patch that is transmitted by the encoder to the decoder after the encoder encodes the to-be-encoded patch in the embodiment shown in FIG. 13. With reference to the bitstream structure shown in FIG. 3, if the to-be-decoded point cloud is the 1$^{st}$ frame of point cloud in the GOF, S401 may include parsing the field 1104, to obtain the index of the normal axis of the to-be-decoded patch and the information used to indicate the rotation angle θ of the to-be-decoded patch.

Optionally, the information used to indicate the rotation angle θ of the to-be-decoded patch may include the rotation angle θ, or an index of the rotation angle θ, or an identifier of a patch that matches the to-be-decoded patch. A specific type of included information may be predefined, for example, predefined according to a protocol, and the information is consistent with information predefined by the encoder. Certainly, this embodiment of this application is not limited thereto.

Further, optionally, the identifier of the patch that matches the to-be-decoded patch is used to indicate an index of the patch that matches the to-be-decoded patch, or used to indicate that there is the patch that matches the to-be-decoded patch in a decoded point cloud and an index of the patch that matches the to-be-decoded patch. A specific type of information that is indicated by the identifier of the patch that matches the to-be-decoded patch may be predefined, for example, predefined according to a protocol, and the information is consistent with information predefined by the encoder. Certainly, this embodiment of this application is not limited thereto.

S402: Obtain a reference tangent axis of the to-be-decoded patch and a reference bitangent axis of the to-be-decoded patch based on the index of the normal axis of the to-be-decoded patch, where the index is obtained through parsing. For example, an index of the reference tangent axis of the to-be-decoded patch and an index of the reference bitangent axis of the to-be-decoded patch are obtained by looking up Table 2 based on the index of the normal axis of the to-be-decoded patch, and then the reference tangent axis and the reference bitangent axis of the to-be-decoded patch are obtained by looking up Table 2.

S403: Determine a tangent axis of the patch and a bitangent axis of the patch based on the reference tangent axis of the to-be-encoded patch, the reference bitangent axis of the to-be-decoded patch, and the information that is used to indicate the rotation angle θ of the to-be-decoded patch and that is obtained through parsing.

S403 may be implemented using one of the following steps S403A to S403C (not shown).

S403A: When the information used to indicate the rotation angle θ of the to-be-decoded patch includes the rotation angle θ, determine the tangent axis and the bitangent axis of the to-be-decoded patch based on the reference tangent axis and the reference bitangent axis of the to-be-decoded patch and the rotation angle θ. Further, the reference tangent axis of the to-be-decoded patch is counterclockwise rotated, around the coordinate origin (that is, the coordinate origin of a coordinate system constituted by the reference tangent axis and the reference bitangent axis of the to-be-decoded patch) by −θ (that is, clockwise rotated by θ), to obtain the tangent axis of the to-be-decoded patch. Correspondingly, the reference bitangent axis of the to-be-decoded patch is counterclockwise rotated by −θ (that is, clockwise rotated by θ) around the coordinate origin, to obtain the bitangent axis of the to-be-decoded patch.

S403B: When the information used to indicate the rotation angle θ of the to-be-decoded patch includes the index of the rotation angle θ, obtain the rotation angle θ indicated by the index of the rotation angle θ, and then determine the tangent axis and the bitangent axis of the to-be-decoded patch based on the reference tangent axis and the reference bitangent axis of the to-be-decoded patch and the rotation angle θ.

S403C: When the information used to indicate the rotation angle θ of the to-be-decoded patch includes the identifier of the patch that matches the to-be-decoded patch, determine, based on the identifier that is of the patch matching the to-be-decoded patch and that is obtained through parsing, the patch that matches the to-be-decoded patch, and obtain a rotation angle θ of the patch that matches the to-be-decoded patch, and determine the tangent axis and the bitangent axis of the to-be-decoded patch based on the reference tangent axis and the reference bitangent axis of the to-be-decoded patch and the rotation angle θ.

For example, if the identifier of the patch that matches the to-be-decoded patch is used to indicate the index of the patch that matches the to-be-decoded patch, the patch that matches the to-be-decoded patch may be obtained by looking up a table based on the index. The table that is looked up includes a mapping relationship between the following items: a plurality of patches and indexes of the patches.

For example, if the identifier of the patch that matches the to-be-decoded patch is used to indicate that there are the patch that matches the to-be-decoded patch in the decoded point cloud and the index of the patch that matches the to-be-decoded patch, optionally, if a value of the identifier is not 0, it indicates that there is the patch that matches the to-be-decoded patch in the decoded point cloud, and a value obtained by subtracting 1 from the value of the identifier is used as the index of the patch that matches the to-be-decoded patch.

S404: Reconstruct geometry information of the to-be-decoded point cloud based on one or more tangent axes and one or more bitangent axes of one or more patches in the to-be-decoded point cloud, where the one or more patches include the to-be-decoded patch.

For a specific implementation of S404, refer to the foregoing descriptions or a current technology.

Optionally, the syntax element further includes information used to indicate a size of a minimum bounding rectangle of an occupancy map of the to-be-decoded patch. In this case, S404 may include reconstructing the geometry information of the to-be-decoded point cloud based on the one or more tangent axes and the one or more bitangent axes of the one or more patches in the to-be-decoded point cloud and the size information of the minimum bounding rectangle of the occupancy map of the to-be-decoded patch, where the size information is obtained by parsing the bitstream. For a specific implementation, refer to the foregoing descriptions or the current technology. For related descriptions such as the geometry information of the point cloud and the size information of the minimum bounding rectangle of the occupancy map of the to-be-decoded patch, refer to the foregoing descriptions.

Because the point cloud decoding method provided in this embodiment corresponds to the point cloud encoding method provided in the embodiment shown in FIG. 13, for beneficial effects that can be achieved in this embodiment, refer to the related descriptions in the embodiment shown in FIG. 13.

Figure 16:
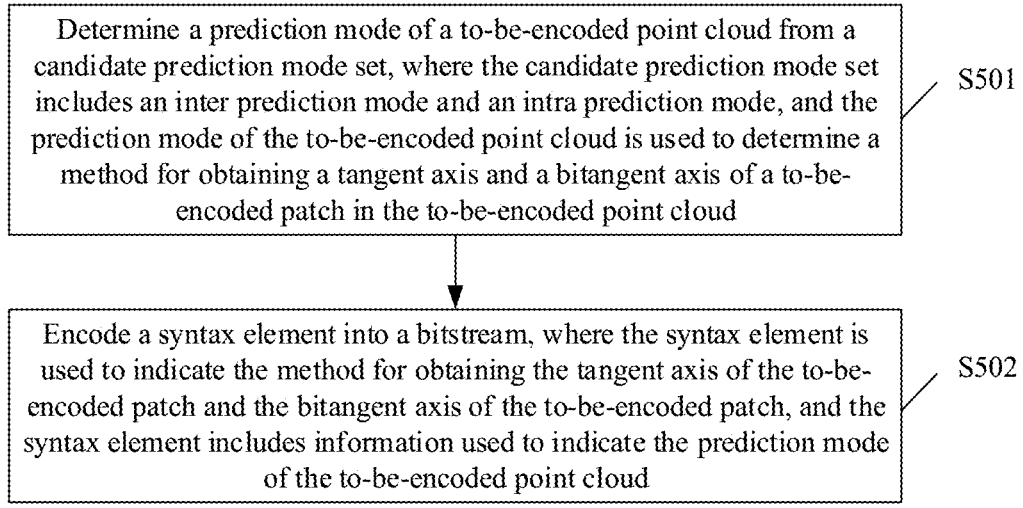
FIG. 16 is a schematic flowchart of a point cloud encoding method according to an embodiment of this application.

FIG. 16 is a schematic flowchart of a point cloud encoding method according to an embodiment of this application. The method may include the following steps.

S501: Determine a prediction mode of a to-be-encoded point cloud from a candidate prediction mode set, where the candidate prediction mode set includes an inter prediction mode and an intra prediction mode, and the prediction mode of the to-be-encoded point cloud is used to determine a method for obtaining a tangent axis and a bitangent axis of a to-be-encoded patch in the to-be-encoded point cloud.

The inter prediction mode is a mode in which the to-be-encoded patch in the point cloud is encoded based on a correlation between point clouds. For example, the inter prediction mode is a mode in which a to-be-encoded patch in another point cloud is encoded based on information about an encoded point cloud (for example, a rotation angle of a patch in the encoded point cloud).

The intra prediction mode is a mode in which the to-be-encoded patch in the point cloud is encoded based on information about the point cloud (for example, a projection rule of the point cloud).

Optionally, the inter prediction mode may further include an inter prediction mode 1, an inter prediction mode 2, . . . , and an inter prediction mode M1, where M1 is an integer greater than or equal to 2. Likewise, the intra prediction mode may further include an intra prediction mode 1, an intra prediction mode 2, . . . , and an intra prediction mode M2, where M2 is an integer greater than or equal to 2.

S502: Encode a syntax element into a bitstream, where the syntax element is used to indicate the method for obtaining the tangent axis of the to-be-encoded patch and the bitangent axis of the to-be-encoded patch, and the syntax element includes information used to indicate the prediction mode of the to-be-encoded point cloud.

The information used to indicate the prediction mode of the to-be-encoded point cloud is frame-level information. With reference to the bitstream structure shown in FIG. 3, if the to-be-encoded point cloud is the 1$^{st}$ frame of point cloud in the GOF, the information may be encoded into the field 1103 in the bitstream. Optionally, the information used to indicate the prediction mode of the to-be-encoded point cloud may be an index of the prediction mode of the to-be-encoded point cloud.

Optionally, when the prediction mode of the to-be-encoded point cloud is the inter prediction mode, the method for obtaining the tangent axis of the to-be-encoded patch and the bitangent axis of the to-be-encoded patch includes obtaining a reference tangent axis of the to-be-encoded patch and a reference bitangent axis of the to-be-encoded patch, determining the tangent axis of the to-be-encoded patch and the bitangent axis of the to-be-encoded patch based on the reference tangent axis of the to-be-encoded patch and the reference bitangent axis of the to-be-encoded patch, where a rotation angle of the tangent axis of the to-be-encoded patch relative to the reference tangent axis of the to-be-encoded patch is θ, and a rotation angle of the bitangent axis of the to-be-encoded patch relative to the reference bitangent axis of the to-be-encoded patch is θ, and obtaining a rotation angle of a patch that matches the to-be-encoded patch in an encoded point cloud, and using the obtained rotation angle as a rotation angle θ of the to-be-encoded patch, where the syntax element further includes an identifier of the patch that matches the to-be-encoded patch and an index of a normal axis of the to-be-encoded patch. For a specific implementation process and related descriptions of the optional manner, refer to the embodiment shown in Manner 2 in FIG. 13.

Optionally, when the prediction mode of the to-be-encoded point cloud is the intra prediction mode, the method for obtaining the tangent axis of the to-be-encoded patch and the bitangent axis of the to-be-encoded patch includes obtaining a reference tangent axis of the to-be-encoded patch and a reference bitangent axis of the to-be-encoded patch, determining the tangent axis of the to-be-encoded patch and the bitangent axis of the to-be-encoded patch based on the reference tangent axis of the to-be-encoded patch and the reference bitangent axis of the to-be-encoded patch, where a rotation angle of the tangent axis of the to-be-encoded patch relative to the reference tangent axis of the to-be-encoded patch is θ, and a rotation angle of the bitangent axis of the to-be-encoded patch relative to the reference bitangent axis of the to-be-encoded patch is θ, and determining a rotation angle θ of the to-be-encoded patch from a plurality of candidate rotation angles according to a rate-distortion cost criterion, where the syntax element further includes the rotation angle θ or an index of the rotation angle θ, and an index of a normal axis of the to-be-encoded patch. For a specific implementation process and related descriptions of the optional manner, refer to the embodiment shown in Manner 1 in FIG. 13.

Optionally, when the prediction mode of the to-be-encoded point cloud is the intra prediction mode, the method for obtaining the tangent axis of the to-be-encoded patch and the bitangent axis of the to-be-encoded patch includes acquiring a normal axis of the to-be-encoded patch and description information of a minimum bounding rectangle corresponding to the to-be-encoded patch, and determining the tangent axis of the to-be-encoded patch and the bitangent axis of the to-be-encoded patch based on the normal axis of the to-be-encoded patch and the description information of the minimum bounding rectangle corresponding to the to-be-encoded patch, where the syntax element further includes an index of the normal axis of the to-be-encoded patch and information that is used to indicate the description information of the minimum bounding rectangle corresponding to the to-be-encoded patch. For a specific implementation process and related descriptions of the optional manner, refer to the embodiment shown in FIG. 9.

Optionally, when the prediction mode of the to-be-encoded point cloud is the intra prediction mode, the method for obtaining the tangent axis of the to-be-encoded patch and the bitangent axis of the to-be-encoded patch includes obtaining a normal axis of the to-be-encoded patch, and determining the tangent axis of the to-be-encoded patch and the bitangent axis of the to-be-encoded patch based on the normal axis of the to-be-encoded patch. For example, the tangent axis and the bitangent axis of the to-be-encoded patch are determined by looking up Table 2. The syntax element further includes an index of the normal axis of the to-be-encoded patch.

This embodiment provides an implementation solution to determining "a method for obtaining a tangent axis and a bitangent axis of a to-be-encoded patch in a to-be-encoded point cloud". This technical solution can support a scenario in which a plurality of methods for obtaining the tangent axis and the bitangent axis of the to-be-encoded patch coexist.

Figure 17:
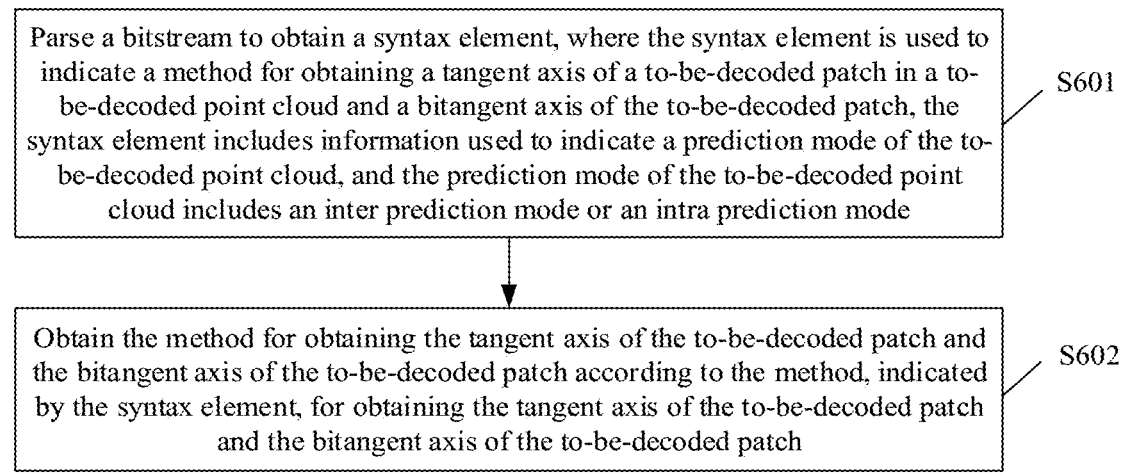
FIG. 17 is a schematic flowchart of a point cloud decoding method according to an embodiment of this application.

FIG. 17 is a schematic flowchart of a point cloud decoding method according to an embodiment of this application. The point cloud decoding method provided in this embodiment corresponds to the point cloud encoding method provided in the embodiment shown in FIG. 16. Therefore, for explanations of related content in this embodiment, refer to the embodiment shown in FIG. 16. The method shown in FIG. 17 may include the following steps.

S601: Parse a bitstream to obtain a syntax element, where the syntax element is used to indicate a method for obtaining a tangent axis of a to-be-decoded patch in a to-be-decoded point cloud and a bitangent axis of the to-be-decoded patch, the syntax element includes information used to indicate a prediction mode of the to-be-decoded point cloud, and the prediction mode of the to-be-decoded point cloud includes an inter prediction mode or an intra prediction mode.

The to-be-decoded point cloud may be a point cloud that is transmitted by an encoder to a decoder after the encoder encodes the to-be-encoded point cloud in the embodiment shown in FIG. 16. The to-be-decoded patch may be a patch that is transmitted by the encoder to the decoder after the encoder encodes the to-be-encoded patch in the embodiment shown in FIG. 16. With reference to the bitstream structure shown in FIG. 3, if the to-be-decoded point cloud is the $1^{st}$ frame of point cloud in the GOF, S601 may include parsing the field 1103 to obtain the information used to indicate the prediction mode of the to-be-decoded point cloud. Optionally, the information used to indicate the prediction mode of the to-be-decoded point cloud may be an index of the prediction mode of the to-be-decoded point cloud.

S602: Obtain the method for obtaining the tangent axis of the to-be-decoded patch and the bitangent axis of the to-be-decoded patch according to the method, indicated by the syntax element, for obtaining the tangent axis of the to-be-decoded patch and the bitangent axis of the to-be-decoded patch.

Optionally, when the prediction mode of the to-be-decoded point cloud is the inter prediction mode, and the syntax element further includes an identifier of a patch that matches the to-be-decoded patch and an index of a normal axis of the to-be-decoded patch, the method for obtaining the tangent axis of the to-be-decoded patch and the bitangent axis of the to-be-decoded patch includes obtaining a reference tangent axis of the to-be-decoded patch and a reference bitangent axis of the to-be-decoded patch based on the index that is of the normal axis of the to-be-decoded patch and that is obtained through parsing, determining, based on the identifier that is of the patch matching the to-be-decoded patch and that is obtained through parsing, the patch that matches the to-be-decoded patch, and obtaining a rotation angle θ of the patch that matches the to-be-decoded patch, and determining the tangent axis of the to-be-decoded patch and the bitangent axis of the to-be-decoded patch based on the reference tangent axis of the to-be-decoded patch, the reference bitangent axis of the to-be-decoded patch, and the rotation angle θ. For a specific implementation process and related descriptions of the optional manner, refer to the related embodiment shown in FIG. 15.

Optionally, when the prediction mode of the to-be-decoded point cloud is the intra prediction mode, and the syntax element further includes the rotation angle θ of the to-be-decoded patch or an index of the rotation angle θ of the to-be-decoded patch, and an index of a normal axis of the to-be-decoded patch, the method for obtaining the tangent axis of the to-be-decoded patch and the bitangent axis of the to-be-decoded patch includes obtaining a reference tangent axis of the to-be-decoded patch and a reference bitangent axis of the to-be-decoded patch based on the index that is of the normal axis of the to-be-decoded patch and that is obtained through parsing, and determining the tangent axis of the to-be-decoded patch and the bitangent axis of the to-be-decoded patch based on the reference tangent axis of the to-be-decoded patch, the reference bitangent axis of the to-be-decoded patch, and the rotation angle θ. For a specific implementation process and related descriptions of the optional manner, refer to the related embodiment shown in FIG. 15.

Optionally, when the prediction mode of the to-be-decoded point cloud is the intra prediction mode, and the syntax element further includes an index of a normal axis of the to-be-decoded patch and information used to indicate description information of a minimum bounding rectangle corresponding to the to-be-decoded patch, the method for obtaining the tangent axis of the to-be-decoded patch and the bitangent axis of the to-be-decoded patch includes determining the tangent axis of the to-be-decoded patch and the bitangent axis of the to-be-decoded patch based on the index of the normal axis of the to-be-decoded patch and the information used to indicate the description information of the minimum bounding rectangle corresponding to the to-be-decoded patch, where the index of the normal axis and the information used to indicate the description information are obtained through parsing. For a specific implementation process and related descriptions of the optional manner, refer to the related embodiment shown in FIG. 12.

Optionally, when the prediction mode of the to-be-decoded point cloud is the intra prediction mode, and the syntax element further includes an index of a normal axis of the to-be-decoded patch, the method for obtaining the tangent axis of the to-be-decoded patch and the bitangent axis of the to-be-decoded patch includes determining the tangent axis of the to-be-decoded patch and the bitangent axis of the to-be-decoded patch based on the index that is of the normal axis of the to-be-decoded patch and that is obtained through parsing. For example, the tangent axis of the to-be-decoded patch and the bitangent axis of the to-be-decoded patch are determined by looking up Table 2.

The point cloud decoding method provided in this embodiment corresponds to the point cloud encoding method provided in the embodiment shown in FIG. 16. This embodiment provides an implementation solution to determining "a method for obtaining a tangent axis and a bitangent axis of a to-be-decoded patch in a to-be-decoded point cloud". This technical solution can support a scenario in which a plurality of methods for obtaining the tangent axis and the bitangent axis of the to-be-decoded patch coexist.

The foregoing mainly describes the solutions provided in the embodiments of this application from a perspective of the methods. To implement the foregoing functions, apparatuses include corresponding hardware structures and/or software modules for performing the functions. A person skilled in the art should be easily aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Division into functional modules may be performed on an encoder and a decoder in the embodiments of this application based on the foregoing method examples. For example, each functional module may be obtained through division in correspondence to each function, or at least two functions may be integrated into one processing module. The integrated module may be implemented in a form of hardware, or may be implemented in a form of a software functional module. It should be noted that, in the embodiments of this application, division into the modules is an example, and is merely a logical function division. In actual implementation, division into the modules may be performed in another manner.

Figure 18:
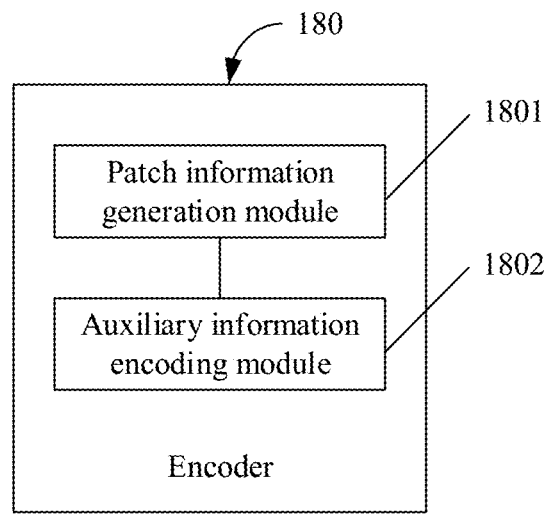
FIG. 18 is a schematic block diagram of an encoder according to an embodiment of this application.

FIG. 18 is a schematic block diagram of an encoder 180 according to an embodiment of this application. The encoder 180 may include a patch information generation module 1801 and an auxiliary information encoding module 1802. In an example, the patch information generation module 1801 may correspond to the patch information generation module 101 in FIG. 2, and the auxiliary information encoding module 1802 may correspond to the auxiliary information encoding module 108 in FIG. 2. Certainly, this application is not limited thereto.

The following describes a feasible implementation of performing point cloud-based encoding by the encoder 180.

In a feasible implementation, the patch information generation module 1801 is configured to acquire a normal axis of a to-be-encoded patch in a to-be-encoded point cloud and description information of a minimum bounding rectangle corresponding to the to-be-encoded patch, where the normal axis of the to-be-encoded patch and the description information of the minimum bounding rectangle corresponding to the to-be-encoded patch are used to determine a tangent axis of the to-be-encoded patch and a bitangent axis of the to-be-encoded patch, and the auxiliary information encoding module 1802 is configured to encode a syntax element into a bitstream, where the syntax element is used to indicate the tangent axis of the to-be-encoded patch and the bitangent axis of the to-be-encoded patch, and the syntax element includes an index of the normal axis of the to-be-encoded patch and information used to indicate the description information of the minimum bounding rectangle corresponding to the to-be-encoded patch. For example, the patch information generation module 1801 can be configured to perform S101 in FIG. 9 and/or another step described in the embodiments of this application, and the auxiliary information encoding module 1802 can be configured to perform S104 in FIG. 9 and/or another step described in the embodiments of this application.

In a feasible implementation, the description information of the minimum bounding rectangle corresponding to the to-be-encoded patch may include a relationship between sizes of sides of the minimum bounding rectangle corresponding to the to-be-encoded patch.

In a feasible implementation, the information used to indicate the description information of the minimum bounding rectangle corresponding to the to-be-encoded patch includes an index of the relationship between sizes of sides of the minimum bounding rectangle corresponding to the to-be-encoded patch, or size information of the minimum bounding rectangle corresponding to the to-be-encoded patch.

In a feasible implementation, the patch information generation module 1801 is further configured to determine the tangent axis of the to-be-encoded patch and the bitangent axis of the to-be-encoded patch based on the normal axis of the to-be-encoded patch and the description information of the minimum bounding rectangle corresponding to the to-be-encoded patch, and project the to-be-encoded patch from a three-dimensional space to a two-dimensional space based on the tangent axis of the to-be-encoded patch and the bitangent axis of the to-be-encoded patch. For example, the patch information generation module 1801 can be configured to perform S101 in FIG. 9 and/or another step described in the embodiments of this application, and the auxiliary information encoding module 1802 can be configured to perform S104 in FIG. 9 and/or another step described in the embodiments of this application.

In a feasible implementation, the patch information generation module 1801 is further configured to determine, according to a projection rule, the tangent axis of the to-be-encoded patch and the bitangent axis of the to-be-encoded patch based on the normal axis of the to-be-encoded patch and the description information of the minimum bounding rectangle corresponding to the to-be-encoded patch, where the projection rule refers to distribution, in the two-dimensional space, of one or more occupancy map obtained by projecting one or more patches in the to-be-encoded point cloud to the two-dimensional space.

In a feasible implementation, the projection rule is preset, or the projection rule is determined according to a rate-distortion cost criterion.

In a feasible implementation, if the projection rule is determined according to the rate-distortion cost criterion, the syntax element further includes information used to indicate the projection rule.

In a feasible implementation, the patch information generation module 1801 is further configured to determine, based on a mapping relationship, a target tangent axis and a target bitangent axis that correspond to both the normal axis of the to-be-encoded patch and the description information of the minimum bounding rectangle corresponding to the to-be-encoded patch, where the mapping relationship is a mapping relationship between the following items a plurality of normal axes of a patch, a plurality of types of description information of a minimum bounding rectangle corresponding to the patch, a plurality of tangent axes of the patch, and a plurality of bitangent axes of the patch, and the target tangent axis is the tangent axis of the to-be-encoded patch, and the target bitangent axis is the bitangent axis of the to-be-encoded patch.

In a feasible implementation, the patch information generation module 1801 is configured to look up a table based on the normal axis of the to-be-encoded patch and the description information of the minimum bounding rectangle corresponding to the to-be-encoded patch, to obtain a target tangent axis and a target bitangent axis that correspond to both the normal axis of the to-be-encoded patch and the description information of the minimum bounding rectangle corresponding to the to-be-encoded patch, where the target tangent axis is the tangent axis of the to-be-encoded patch, and the target bitangent axis is the bitangent axis of the to-be-encoded patch, and the table includes a mapping relationship between the following items a plurality of normal axes of a patch, a plurality of types of description information of a minimum bounding rectangle corresponding to the patch, a plurality of tangent axes of the patch, and a plurality of bitangent axes of the patch.

In a feasible implementation, if a projection rule indicates vertical projection, an axis on which a longest side of the minimum bounding rectangle corresponding to the to-be-encoded patch is located is the bitangent axis of the to-be-encoded patch, and an axis on which a shortest side of the minimum bounding rectangle corresponding to the to-be-encoded patch is located is the tangent axis of the to-be-encoded patch.

In a feasible implementation, if a projection rule indicates horizontal projection, an axis on which a longest side of the minimum bounding rectangle corresponding to the to-be-encoded patch is located is the tangent axis of the to-be-encoded patch, and an axis on which a shortest side of the minimum bounding rectangle corresponding to the to-be-encoded patch is located is the bitangent axis of the to-be-encoded patch.

The projection rule refers to distribution, in the two-dimensional space, of one or more occupancy map obtained by projecting one or more patches in the to-be-encoded point cloud to the two-dimensional space. The normal axis of the to-be-encoded patch is perpendicular to the two-dimensional space.

Figure 19:
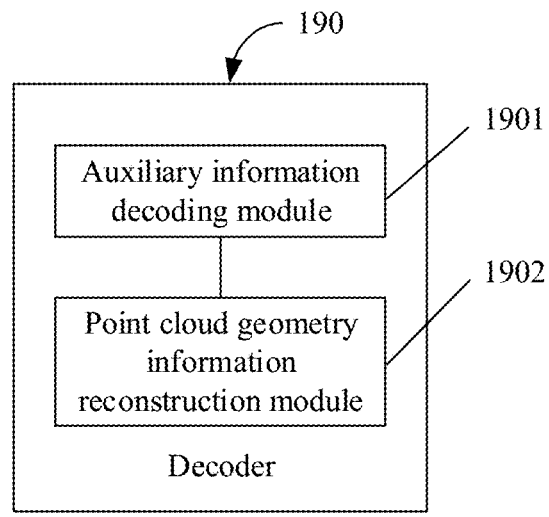
FIG. 19 is a schematic block diagram of a decoder according to an embodiment of this application.

FIG. 19 is a schematic block diagram of a decoder 190 according to an embodiment of this application. The decoder 190 may include an auxiliary information decoding module 1901 and a point cloud geometry information reconstruction module 1902. In an example, the auxiliary information decoding module 1901 may correspond to the auxiliary information decoding module 204 in FIG. 4, and the point cloud geometry information reconstruction module 1902 may correspond to the point cloud geometry information reconstruction module 205 in FIG. 4. Certainly, this application is not limited thereto.

The following describes a feasible implementation of performing point cloud-based decoding by the decoder 190.

In a feasible implementation, the auxiliary information decoding module 1901 is configured to parse a bitstream to obtain a syntax element, where the syntax element includes an index of a normal axis of a to-be-decoded patch in a to-be-decoded point cloud and information used to indicate description information of a minimum bounding rectangle corresponding to the to-be-decoded patch, and determine a tangent axis of the to-be-decoded patch and a bitangent axis of the to-be-decoded patch based on the index of the normal axis of the to-be-decoded patch and the information used to indicate the description information of the minimum bounding rectangle corresponding to the to-be-decoded patch, where the index and the information are obtained through parsing. The point cloud geometry information reconstruction module 1902 is configured to reconstruct geometry information of the to-be-decoded point cloud based on one or more tangent axes and one or more bitangent axes of one or more patches in the to-be-decoded point cloud, where the one or more patches include the to-be-decoded patch. For example, the auxiliary information decoding module 1901 can be configured to perform S201 and S202 in FIG. 12 and/or another step described in the embodiments of this application, and the point cloud geometry information reconstruction module 1902 can be configured to perform S203 in FIG. 12 and/or another step described in the embodiments of this application.

In a feasible implementation, the description information of the minimum bounding rectangle corresponding to the to-be-decoded patch includes a relationship between sizes of sides of the minimum bounding rectangle corresponding to the to-be-decoded patch.

In a feasible implementation, the information used to indicate the description information of the minimum bounding rectangle corresponding to the to-be-decoded patch includes an index of the relationship between sizes of sides of the minimum bounding rectangle corresponding to the to-be-decoded patch, or size information of the minimum bounding rectangle corresponding to the to-be-decoded patch.

In a feasible implementation, the auxiliary information decoding module 1901 is further configured to determine, according to a projection rule, the tangent axis of the to-be-decoded patch and the bitangent axis of the to-be-decoded patch based on the normal axis of the to-be-decoded patch and the description information of the minimum bounding rectangle corresponding to the to-be-decoded patch, where the projection rule refers to distribution, in a two-dimensional space, of one or more occupancy map obtained by projecting one or more patches in the to-be-decoded point cloud to the two-dimensional space.

In a feasible implementation, the projection rule is preset, or the syntax element further includes information used to indicate the projection rule, and correspondingly, the projection rule is a projection rule indicated by the syntax element that is obtained by parsing the bitstream.

In a feasible implementation, the auxiliary information decoding module 1901 is further configured to determine, based on a mapping relationship, a target tangent axis and a target bitangent axis that correspond to both the normal axis of the to-be-decoded patch and the description information of the minimum bounding rectangle corresponding to the to-be-decoded patch, where the mapping relationship is a mapping relationship between the following items a plurality of normal axes of a patch, a plurality of types of description information of a minimum bounding rectangle corresponding to the patch, a plurality of tangent axes of the patch, and a plurality of bitangent axes of the patch, and the target tangent axis is the tangent axis of the to-be-decoded patch, and the target bitangent axis is the bitangent axis of the to-be-decoded patch.

In a feasible implementation, the auxiliary information decoding module 1901 is further configured to look up a table based on the normal axis of the to-be-decoded patch and the description information of the minimum bounding rectangle corresponding to the to-be-decoded patch, to obtain a target tangent axis and a target bitangent axis that correspond to both the normal axis of the to-be-decoded patch and the description information of the minimum bounding rectangle corresponding to the to-be-decoded patch, where the target tangent axis is the tangent axis of the to-be-decoded patch, and the target bitangent axis is the bitangent axis of the to-be-decoded patch, and the table includes a mapping relationship between the following items a plurality of normal axes of a patch, a plurality of types of description information of a minimum bounding rectangle corresponding to the patch, a plurality of tangent axes of the patch, and a plurality of bitangent axes of the patch.

In a feasible implementation, if a projection rule indicates vertical projection, an axis on which a longest side of the minimum bounding rectangle corresponding to the to-be-decoded patch is located is the bitangent axis of the to-be-decoded patch, and an axis on which a shortest side of the minimum bounding rectangle corresponding to the to-be-decoded patch is located is the tangent axis of the to-be-decoded patch, or if a projection rule indicates horizontal projection, an axis on which a longest side of the minimum bounding rectangle corresponding to the to-be-decoded patch is located is the tangent axis of the to-be-decoded patch, and an axis on which a shortest side of the minimum bounding rectangle corresponding to the to-be-decoded patch is located is the bitangent axis of the to-be-decoded patch. The projection rule refers to distribution, in a two-dimensional space, of one or more occupancy map obtained by projecting one or more patches in the to-be-decoded point cloud to the two-dimensional space, and the normal axis of the to-be-decoded patch is perpendicular to the two-dimensional space.

The following describes some other feasible implementations of performing point cloud-based encoding by the encoder 180.

In a feasible implementation, the patch information generation module 1801 is configured to obtain a reference tangent axis of a to-be-encoded patch in a to-be-encoded point cloud and a reference bitangent axis of the to-be-encoded patch, and determine a tangent axis of the to-be-encoded patch and a bitangent axis of the to-be-encoded patch based on the reference tangent axis of the to-be-encoded patch and the reference bitangent axis of the to-be-encoded patch, where a rotation angle of the tangent axis of the to-be-encoded patch relative to the reference tangent axis of the to-be-encoded patch is θ, and a rotation angle of the bitangent axis of the to-be-encoded patch relative to the reference bitangent axis of the to-be-encoded patch is θ, and the auxiliary information encoding module 1802 is configured to encode a syntax element into a bitstream, where the syntax element is used to indicate the tangent axis of the to-be-encoded patch and the bitangent axis of the to-be-encoded patch, and the syntax element includes an index of a normal axis of the to-be-encoded patch and information used to indicate the rotation angle θ of the to-be-encoded patch. For example, the patch information generation module 1801 can be configured to perform S301 and S302 in FIG. 13 and/or another step described in the embodiments of this application, and the auxiliary information encoding module 1802 can be configured to perform S305 in FIG. 13 and/or another step described in the embodiments of this application.

In a feasible implementation, the information used to indicate the rotation angle θ of the to-be-encoded patch includes the rotation angle θ, or an index of the rotation angle θ, or an identifier of a patch that matches the to-be-encoded patch.

In a feasible implementation, the identifier of the patch that matches the to-be-encoded patch is used to indicate an index of the patch that matches the to-be-encoded patch, or used to indicate that there is the patch that matches the to-be-encoded patch in an encoded point cloud and an index of the patch that matches the to-be-encoded patch.

In a feasible implementation, the patch information generation module 1801 is further configured to determine the rotation angle θ from a plurality of candidate rotation angles according to a rate-distortion cost criterion, or obtain a rotation angle of the patch that matches the to-be-encoded patch from the encoded point cloud, and use the obtained rotation angle as the rotation angle θ of the to-be-encoded patch.

In a feasible implementation, the patch information generation module 1801 is further configured to project the to-be-encoded patch from a three-dimensional space to a two-dimensional space based on the tangent axis of the to-be-encoded patch and the bitangent axis of the to-be-encoded patch, to obtain an occupancy map of the to-be-encoded patch, and determine a minimum bounding rectangle of the occupancy map of the to-be-encoded patch. The syntax element further includes size information of the minimum bounding rectangle of the occupancy map of the to-be-encoded patch. For example, the patch information generation module 1801 can be configured to perform S303 and S304 in FIG. 13.

The following describes some other feasible implementations of performing point cloud-based decoding by the decoder 190.

In a feasible implementation, the auxiliary information decoding module 1901 is configured to parse a bitstream to obtain a syntax element, where the syntax element includes an index of a normal axis of a to-be-decoded patch in a to-be-decoded point cloud and information used to indicate a rotation angle θ of the to-be-decoded patch, obtain a reference tangent axis of the to-be-decoded patch and a reference bitangent axis of the to-be-decoded patch based on the index of the normal axis of the to-be-decoded patch, where the index is obtained through parsing, and determine a tangent axis of the patch and a bitangent axis of the patch based on the reference tangent axis of the to-be-decoded patch, the reference bitangent axis of the to-be-decoded patch, and the information that is used to indicate the rotation angle θ of the to-be-decoded patch and that is obtained through parsing, and the point cloud geometry information reconstruction module 1902 is configured to reconstruct geometry information of the to-be-decoded point cloud based on one or more tangent axes and one or more bitangent axes of one or more patches in the to-be-decoded point cloud, where the one or more patches include the to-be-decoded patch. For example, the auxiliary information decoding module 1901 can be configured to perform S401, S402, and S403 in FIG. 15 and/or another step described in the embodiments of this application, and the point cloud geometry information reconstruction module 1902 can be configured to perform S404 in FIG. 15 and/or another step described in the embodiments of this application.

In a feasible implementation, the information used to indicate the rotation angle θ of the to-be-decoded patch includes the rotation angle θ, or an index of the rotation angle θ, or an identifier of a patch that matches the to-be-decoded patch.

In a feasible implementation, the identifier of the patch that matches the to-be-decoded patch is used to indicate an index of the patch that matches the to-be-decoded patch, or used to indicate whether there is the patch that matches the to-be-decoded patch in a decoded point cloud and an index of the patch that matches the to-be-decoded patch.

In a feasible implementation, the information used to indicate the rotation angle θ of the to-be-decoded patch includes the identifier of the patch that matches the to-be-decoded patch, and the auxiliary information decoding module 1901 is further configured to determine, based on the identifier that is of the patch matching the to-be-decoded patch and that is obtained through parsing, the patch that matches the to-be-decoded patch, and obtain a rotation angle θ of the patch that matches the to-be-decoded patch, and determine the tangent axis of the to-be-decoded patch and the bitangent axis of the to-be-decoded patch based on the reference tangent axis of the to-be-decoded patch, the reference bitangent axis of the to-be-decoded patch, and the rotation angle θ.

In a feasible implementation, the syntax element further includes size information of a minimum bounding rectangle of an occupancy map of the to-be-decoded patch, and the point cloud geometry information reconstruction module 1902 is further configured to reconstruct the geometry information of the to-be-decoded point cloud based on the one or more tangent axes and the one or more bitangent axes of the one or more patches in the to-be-decoded point cloud and the size information of the minimum bounding rectangle of the occupancy map of the to-be-decoded patch, where the size information is obtained by parsing the bitstream.

The following describes some other feasible implementations of performing point cloud-based encoding by the encoder 180.

In a feasible implementation, the patch information generation module 1801 is configured to project a to-be-encoded patch from a three-dimensional space to a two-dimensional space, to obtain a first occupancy map of the to-be-encoded patch, and obtain a second occupancy map of the to-be-encoded patch, where the second occupancy map of the to-be-encoded patch is obtained by counterclockwise or clockwise rotating the first occupancy map of the to-be-encoded patch by a rotation angle θ, and the auxiliary information encoding module 1802 is configured to encode a syntax element into a bitstream, where the syntax element includes information used to indicate the rotation angle θ.

In a feasible implementation, coordinates (x2, y2) of a point in the second occupancy map of the to-be-encoded patch are obtained based on coordinates (x1, y1) of a point in the first occupancy map of the to-be-encoded patch and a rotation matrix, where the rotation matrix corresponds to the rotation angle.

In a feasible implementation, the rotation matrix is determined based on the rotation angle θ, or is determined based on a functional relationship of the rotation angle θ.

In a feasible implementation, the rotation matrix is represented as $$\begin{bmatrix} \cos\theta & -\sin\theta \\ \sin\theta & \cos\theta \end{bmatrix}.$$

In a feasible implementation, when the rotation angle θ is 0°, the rotation matrix is represented as $$\begin{bmatrix} 1 & 0 \\ 0 & -1 \end{bmatrix},$$

when the rotation angle θ is 90°, the rotation matrix is represented as $$\begin{bmatrix} 0 & -1 \\ 1 & 0 \end{bmatrix},$$

when the rotation angle θ is 180°, the rotation matrix is represented as $$\begin{bmatrix} -1 & 0 \\ 0 & 1 \end{bmatrix},$$

and/or when the rotation angle θ is 270°, the rotation matrix is represented as $$\begin{bmatrix} 0 & 1 \\ -1 & 0 \end{bmatrix}.$$

In a feasible implementation, coordinates (x1, y1) of a point P1 in the first occupancy map of the to-be-encoded patch and coordinates (x2, y2) of a point P2 in the second occupancy map of the to-be-encoded patch satisfy the following formula, where the coordinates (x2, y2) of the point P2 are obtained through rotation $$x2 = x1 * \cos\theta - y1 * \sin\theta$$
$$y2 = x1 * \sin\theta + y1 * \cos\theta.$$

In a feasible implementation, coordinates (x2, y2) of P2 in the second occupancy map of the to-be-encoded patch are obtained according to the following formula $$x2 = x1 * \cos\theta - y1 * \sin\theta$$
$$y2 = x1 * \sin\theta + y1 * \cos\theta,$$

where (x1, y1) represents coordinates of a point P1 in the first occupancy map of the to-be-encoded patch, and represents the rotation angle.

In a feasible implementation, the second occupancy map is obtained by counterclockwise or clockwise rotating the first occupancy map of the to-be-encoded patch by the rotation angle θ around a coordinate origin of a coordinate system constituted by a first tangent axis and a first bitangent axis.

In a feasible implementation, the information used to indicate the rotation angle θ is an index used to indicate the rotation angle θ.

In a feasible implementation, a rotation angle by which a second tangent axis of the to-be-encoded patch rotates relative to a first tangent axis of the to-be-encoded patch is θ, and a rotation angle by which a second bitangent axis of the to-be-encoded patch rotates relative to a first bitangent axis of the to-be-encoded patch is θ.

Correspondingly, some other feasible implementations of performing point cloud-based decoding by the decoder 190 are described.

In a feasible implementation, the auxiliary information decoding module 1901 is configured to parse a bitstream to obtain a syntax element, where the syntax element includes information used to indicate a rotation angle θ of a to-be-decoded patch, and obtain a second occupancy map of the to-be-decoded patch, and the point cloud geometry information reconstruction module 1902 is configured to obtain a first occupancy map of the to-be-decoded patch, where the first occupancy map of the to-be-decoded patch is obtained by counterclockwise or clockwise counter-rotating the second occupancy map of the to-be-decoded patch by the rotation angle θ, and reconstruct a to-be-decoded point cloud based on one or more first occupancy maps of one or more patches in the to-be-decoded point cloud, where the one or more patches include the to-be-decoded patch.

In a feasible implementation, coordinates (x1, y1) of a point in the first occupancy map of the to-be-decoded patch are obtained based on coordinates (x2, y2) of a point in the second occupancy map of the to-be-decoded patch and a rotation matrix, where the rotation matrix corresponds to the rotation angle.

In a feasible implementation, the rotation matrix is determined based on the rotation angle θ, or is determined based on a functional relationship of the rotation angle θ.

In a feasible implementation, the rotation matrix is represented as $$\begin{bmatrix} \cos\theta & -\sin\theta \\ \sin\theta & \cos\theta \end{bmatrix},$$

or the rotation matrix is represented as an inverse matrix of $$\begin{bmatrix} \cos\theta & \sin\theta \\ -\sin\theta & \cos\theta \end{bmatrix}.$$

In a feasible implementation, when the rotation angle θ is 0°, the rotation matrix is represented as $$\begin{bmatrix} 1 & 0 \\ 0 & -1 \end{bmatrix},$$

when the rotation angle θ is 90°, the rotation matrix is represented as $$\begin{bmatrix} 0 & -1 \\ 1 & 0 \end{bmatrix},$$

when the rotation angle θ is 180°, the rotation matrix is represented as $$\begin{bmatrix} -1 & 0 \\ 0 & 1 \end{bmatrix},$$

and/or when the rotation angle θ is 270°, the rotation matrix is represented as $$\begin{bmatrix} 0 & 1 \\ -1 & 0 \end{bmatrix}.$$

In a feasible implementation, when the rotation angle θ is 0°, the rotation matrix is represented as an inverse matrix of $$\begin{bmatrix} 1 & 0 \\ 0 & -1 \end{bmatrix},$$

when the rotation angle θ is 90°, the rotation matrix is represented as an inverse matrix of $$\begin{bmatrix} 0 & -1 \\ 1 & 0 \end{bmatrix},$$

when the rotation angle θ is 180°, the rotation matrix is represented as an inverse matrix of $$\begin{bmatrix} -1 & 0 \\ 0 & 1 \end{bmatrix},$$

and/or when the rotation angle θ is 270°, the rotation matrix is represented as an inverse matrix of $$\begin{bmatrix} 0 & 1 \\ -1 & 0 \end{bmatrix}.$$

In a feasible implementation, coordinates (x2, y2) of a point P2 in the second occupancy map of the to-be-decoded patch and coordinates (x1, y1) of a point P1 in the first occupancy map of the to-be-decoded patch satisfy the following formula, where the coordinates (x1, y1) of the point P1 are obtained through counter-rotation:

$$x2 = x1 * \cos\theta - y1 * \sin\theta$$
$$y2 = x1 * \sin\theta + y1 * \cos\theta$$

or $$x1 = x2 \cos\theta + y2 \sin\theta$$
$$y1 = -x2 \sin\theta + y2 \cos\theta.$$

In a feasible implementation, coordinates (x1, y1) of a point P1 in the first occupancy map of the to-be-decoded patch are obtained according to the following formula:

$$x2 = x1 * \cos\theta - y1 * \sin\theta$$
$$y2 = x1 * \sin\theta + y1 * \cos\theta$$

or $$x1 = x2 * \cos\theta + y2 * \sin\theta$$
$$y1 = -x2 * \sin\theta + y2 * \cos\theta,$$

where (x2, y2) represents coordinates of a point P2 in the second occupancy map of the to-be-decoded patch, and θ represents the rotation angle.

In a feasible implementation, the first occupancy map of the to-be-decoded patch is obtained by counterclockwise or clockwise counter-rotating the second occupancy map of the to-be-decoded patch by the rotation angle θ around a coordinate origin of a coordinate system constituted by a first tangent axis and a first bitangent axis.

In a feasible implementation, the information used to indicate the rotation angle θ is an index used to indicate the rotation angle θ.

In a feasible implementation, a rotation angle by which a second tangent axis of the to-be-decoded patch rotates relative to a first tangent axis of the to-be-decoded patch is θ, and a rotation angle by which a second bitangent axis of the to-be-decoded patch rotates relative to a first bitangent axis of the to-be-decoded patch is θ.

In a feasible implementation, the auxiliary information decoding module 1901 is further configured to parse the bitstream to obtain the second occupancy map of the to-be-decoded patch, or parse the bitstream to obtain information that is used to indicate the second occupancy map of the to-be-decoded patch, and obtain the second occupancy map of the to-be-decoded patch based on the information that is used to indicate the second occupancy map of the to-be-decoded patch.

The following describes some other feasible implementations of performing point cloud-based encoding by the encoder 180.

The patch information generation module 1801 is configured to project a to-be-encoded patch from a three-dimensional space to a two-dimensional space, to obtain a first occupancy map of the to-be-encoded patch, and obtain a second occupancy map of the to-be-encoded patch, where coordinates (x2, y2) of a point in the second occupancy map of the to-be-encoded patch are obtained based on coordinates (x1, y1) of a point in the first occupancy map of the to-be-encoded patch and a rotation matrix, where the rotation matrix corresponds to a rotation angle θ, and the auxiliary information encoding module 1802 is configured to encode a syntax element into a bitstream, where the syntax element includes information used to indicate the rotation angle θ.

In a feasible implementation, the rotation matrix is determined based on the rotation angle θ, or is determined based on a functional relationship of the rotation angle θ.

In a feasible implementation, the rotation matrix is represented as $$\begin{bmatrix} \cos\theta & -\sin\theta \\ \sin\theta & \cos\theta \end{bmatrix}.$$

In a feasible implementation, when the rotation angle θ is 0°, the rotation matrix is represented as $$\begin{bmatrix} 1 & 0 \\ 0 & -1 \end{bmatrix},$$

when the rotation angle θ is 90°, the rotation matrix is represented as $$\begin{bmatrix} 0 & -1 \\ 1 & 0 \end{bmatrix},$$

when the rotation angle θ is 180°, the rotation matrix is represented as $$\begin{bmatrix} -1 & 0 \\ 0 & 1 \end{bmatrix},$$

and/or when the rotation angle θ is 270°, the rotation matrix is represented as $$\begin{bmatrix} 0 & 1 \\ -1 & 0 \end{bmatrix}.$$

In a feasible implementation, coordinates (x1, y1) of a point P1 in the first occupancy map of the to-be-encoded patch and coordinates (x2, y2) of a point P2 in the second occupancy map of the to-be-encoded patch satisfy the following formula, where the coordinates (x2, y2) of the point P2 are obtained through rotation:

$$x2 = x1\cos\theta - y1\sin\theta$$
$$y2 = x1\sin\theta + y1\cos\theta.$$

In addition, an embodiment of this application provides a decoding apparatus, including a point cloud memory and a point cloud decoder. The point cloud memory is configured to store point cloud data. The point cloud decoder is configured to reconstruct geometry information of a to-be-decoded point cloud based on one or more first occupancy maps of one or more to-be-decoded patches in the to-be-decoded point cloud, where the one or more patches include the to-be-decoded patch, coordinates (x1, y1) of a first point of the to-be-decoded patch are obtained based on coordinates (x2, y2) of a second point of the to-be-decoded patch and a rotation matrix, and the rotation matrix corresponds to a rotation angle θ of the to-be-decoded patch.

In a feasible implementation, that coordinates (x1, y1) of a first point of the to-be-decoded patch are obtained based on coordinates (x2, y2) of a second point of the to-be-decoded patch and a rotation matrix means that coordinates (x1, y1) of a point in a first occupancy map of the to-be-decoded patch are obtained based on coordinates (x2, y2) of a point in a second occupancy map of the to-be-decoded patch and a rotation matrix.

In a feasible implementation, the coordinates (x1, y1) of the first point of the to-be-decoded patch are coordinates (x1, y1) of a point in a first occupancy map of the to-be-decoded patch, and the coordinates (x2, y2) of the second point of the to-be-decoded patch are coordinates (x2, y2) of a point in a second occupancy map of the to-be-decoded patch.

In a feasible implementation, a first occupancy map of the to-be-decoded patch is obtained by counterclockwise or clockwise counter-rotating a second occupancy map of the to-be-decoded patch by the rotation angle θ, or a second occupancy map of the to-be-decoded patch is obtained by counterclockwise or clockwise rotating a first occupancy map of the to-be-decoded patch by the rotation angle θ.

In a feasible implementation, the rotation matrix is determined based on the rotation angle θ, or is determined based on a functional relationship of the rotation angle θ.

In a feasible implementation, the rotation matrix is represented as $$\begin{bmatrix} \cos\theta & -\sin\theta \\ \sin\theta & \cos\theta \end{bmatrix}.$$

In a feasible implementation, when the rotation angle θ is 0°, the rotation matrix is represented as $$\begin{bmatrix} 1 & 0 \\ 0 & -1 \end{bmatrix},$$

when the rotation angle θ is 90°, the rotation matrix is represented as $$\begin{bmatrix} 0 & -1 \\ 1 & 0 \end{bmatrix},$$

when the rotation angle θ is 180°, the rotation matrix is represented as $$\begin{bmatrix} -1 & 0 \\ 0 & 1 \end{bmatrix},$$

and/or when the rotation angle θ is 270°, the rotation matrix is represented as $$\begin{bmatrix} 0 & 1 \\ -1 & 0 \end{bmatrix}.$$

In a feasible implementation, coordinates (x1, y1) of a point P1 in the first occupancy map of the to-be-decoded patch and coordinates (x2, y2) of a point P2 in the second occupancy map of the to-be-decoded patch satisfy the following formula, where the coordinates (x2, y2) of the point P2 are obtained through rotation:

$$x2 = x1 * \cos\theta - y1 * \sin\theta$$

$$y2 = x1 * \sin\theta + y1 * \cos\theta.$$

Figure 20:
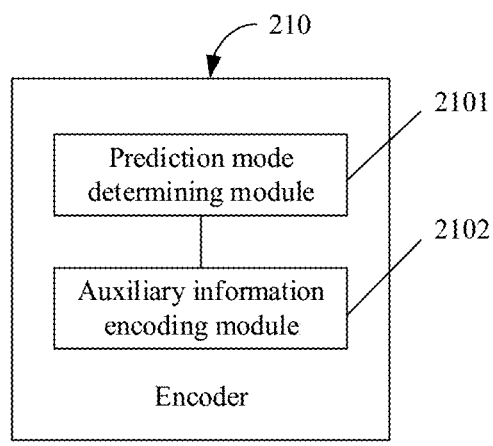
FIG. 20 is a schematic block diagram of an encoder according to an embodiment of this application.

FIG. 20 is a schematic block diagram of an encoder 210 according to an embodiment of this application. The encoder 210 may include a prediction mode determining module 2101 and an auxiliary information encoding module 2102. In an example, the prediction mode determining module 2101 may correspond to the prediction mode determining module related in the foregoing descriptions of the encoder shown in FIG. 2, and the auxiliary information encoding module 2102 may correspond to the auxiliary information encoding module 108 in FIG. 2. Certainly, this application is not limited thereto.

The following describes some feasible implementations of performing point cloud-based encoding by the encoder 210.

In a feasible implementation, the prediction mode determining module 2101 is configured to determine a prediction mode of a to-be-encoded point cloud from a candidate prediction mode set, where the candidate prediction mode set includes an inter prediction mode and an intra prediction mode, and the prediction mode of the to-be-encoded point cloud is used to determine a method for obtaining a tangent axis of a to-be-encoded patch in the to-be-encoded point cloud and a bitangent axis of the to-be-encoded patch, and the auxiliary information encoding module 2102 is configured to encode a syntax element into a bitstream, where the syntax element is used to indicate the method for obtaining the tangent axis of the to-be-encoded patch and the bitangent axis of the to-be-encoded patch, and the syntax element includes information used to indicate the prediction mode of the to-be-encoded point cloud. For example, the prediction mode determining module 2101 can be configured to perform S501 in FIG. 16, and the auxiliary information encoding module 2102 can be configured to perform S502 in FIG. 16 and/or another step described in the embodiments of this application.

For cases in which the prediction mode of the to-be-encoded point cloud is the inter prediction mode or the intra prediction mode, for related descriptions of the method for obtaining the tangent axis of the to-be-encoded patch and the bitangent axis of the to-be-encoded patch, refer to the related designs in the fifth aspect in the summary part or the related descriptions in the embodiment shown in FIG. 16.

Figure 21:
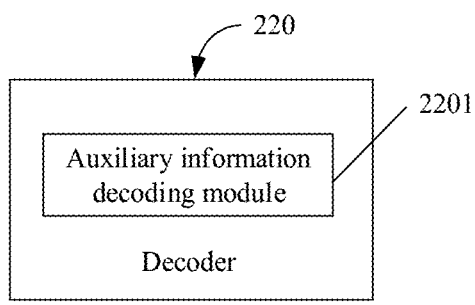
FIG. 21 is a schematic block diagram of a decoder according to an embodiment of this application.

FIG. 21 is a schematic block diagram of a decoder 220 according to an embodiment of this application. The decoder 220 may include an auxiliary information decoding module 2201. In an example, the auxiliary information decoding module 2201 may correspond to the auxiliary information decoding module 204 in FIG. 4. Certainly, this application is not limited thereto.

In a feasible implementation, the auxiliary information decoding module 2201 is configured to parse a bitstream to obtain a syntax element, where the syntax element is used to indicate a method for obtaining a tangent axis of a to-be-decoded patch in a to-be-decoded point cloud and a bitangent axis of the to-be-decoded patch, the syntax element includes information used to indicate a prediction mode of the to-be-decoded point cloud, and the prediction mode of the to-be-decoded point cloud includes an inter prediction mode or an intra prediction mode, and obtain the method for obtaining the tangent axis of the to-be-decoded patch and the bitangent axis of the to-be-decoded patch according to the method, indicated by the syntax element, for obtaining the tangent axis of the to-be-decoded patch and the bitangent axis of the to-be-decoded patch. For example, the auxiliary information decoding module 2201 can be configured to perform S601 and S602 in FIG. 17 and/or another step described in the embodiments of this application.

For cases in which the prediction mode of the to-be-decoded point cloud is the inter prediction mode or the intra prediction mode, for related descriptions of the method for obtaining the tangent axis of the to-be-decoded patch and the bitangent axis of the to-be-decoded patch, refer to the related designs in the sixth aspect in the summary part or the related descriptions in the embodiment shown in FIG. 17.

It can be understood that the modules in the encoder/decoder in the embodiments of this application are functional entities that implement various execution steps included in the point cloud encoding/decoding method corresponding to this application. To be specific, the modules are functional entities that can implement all steps in the point cloud encoding/decoding method corresponding to this application and extension and transformation of these steps. For details, refer to descriptions of the point cloud encoding/decoding method in this specification. For brevity, details are not described in this specification.

Figure 22:
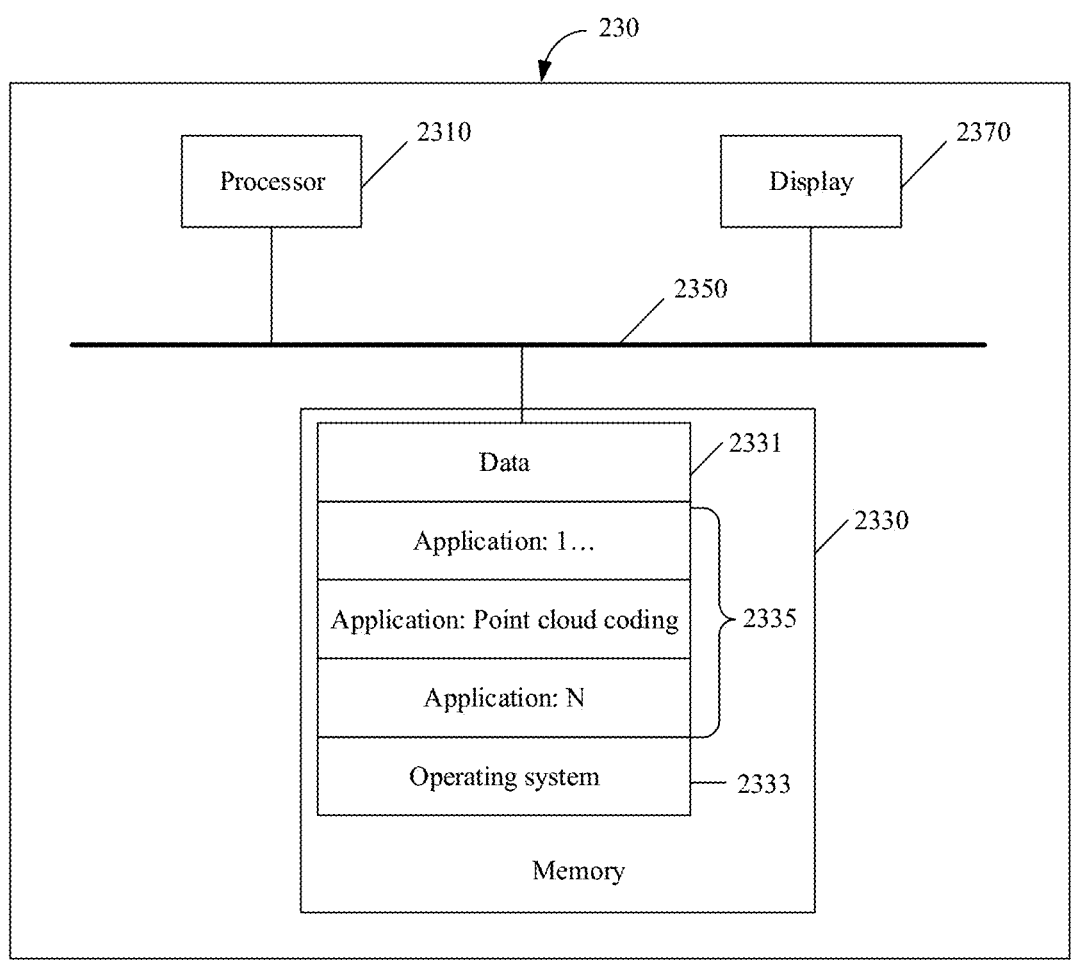
FIG. 22 is a schematic block diagram of an encoding device or a decoding device applicable to an embodiment of this application.

FIG. 22 is a schematic block diagram of an implementation of an encoding device or a decoding device (briefly referred to as a coding device 230 or a point cloud coding device 230) used in an embodiment of this application. The coding device 230 may include a processor 2310, a memory 2330, and a bus system 2350. The processor 2310 is connected to the memory 2330 through the bus system 2350. The memory 2330 is configured to store an instruction, and the processor 2310 is configured to execute the instruction stored in the memory 2330, to perform various point cloud encoding/decoding methods described in this application. To avoid repetition, details are not described herein again.

In this embodiment of this application, the processor 2310 may be a central processing unit (CPU), or the processor 2310 may be another general-purpose processor, a DSP, an ASIC, an FPGA, another programmable logic device, a discrete gate, a transistor logic device, a discrete hardware component, or the like. The general-purpose processor may be a microprocessor, or may be any conventional processor or the like.

The memory 2330 may include a ROM device or a RAM device. Any other appropriate type of storage device may also be used as the memory 2330. The memory 2330 may include code and data 2331 that are accessed by the processor 2310 through the bus system 2350. The memory 2330 may further include an operating system 2333 and an application program 2335. The application program 2335 includes at least one program that enables the processor 2310 to perform the point cloud encoding/decoding method described in this application. For example, the application program 2335 may include applications 1 to N, and further include a point cloud encoding/decoding application (referred to as a point cloud coding application) for performing the point cloud encoding/decoding method described in this application.

The bus system 2350 may further include a power bus, a control bus, a status signal bus, and the like, in addition to a data bus. However, for clear description, various types of buses in the figure are denoted as the bus system 2350.

Optionally, the coding device 230 may further include one or more output devices, such as a display 2370. In an example, the display 2370 may be a touch sensitive display that combines a display and a touch unit that operably senses touch input. The display 2370 may be connected to the processor 2310 through the bus system 2350.

A person skilled in the art can understand that, the functions described with reference to various illustrative logical blocks, modules, and algorithm steps disclosed and described in this specification can be implemented by hardware, software, firmware, or any combination thereof. If the functions are implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another place (for example, according to a communication protocol). In this manner, the computer-readable medium may generally correspond to (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

As an example but not a limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed a computer-readable medium. For example, if an instruction is transmitted from a website, a server, or another remote source through a coaxial cable, an optical fiber, a twisted pair, a digital subscriber line (DSL), or wireless technologies such as infrared, radio, and microwave technologies, the coaxial cable, the fiber optic cable, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a DVD, and a BLU-RAY DISC. The disks usually reproduce data magnetically, whereas the discs reproduce data optically with lasers. Combinations of the foregoing should also be included in the scope of the computer-readable media.

An instruction may be executed by one or more processors such as one or more DSP, general-purpose microprocessors, ASIC, FPGA, or other equivalent integrated circuit or discrete logic circuits. Therefore, the term "processor" used in this specification may be any one of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements. In an example, various descriptive logical blocks, units, and modules in the encoder 100 and the decoder 200 can be understood as corresponding circuit devices or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A point cloud encoding apparatus comprising:
a memory containing instructions; and
a processor, in communication with the memory and upon execution of the instructions, is configured to:
project a current patch from a three-dimensional space to a two-dimensional space;
transform first coordinates (x1, y1) of a point of the current patch in a first coordinate system to second coordinates (x2, y2) of the point of the current patch in a second coordinate system, wherein the second coordinates (x2, y2) of the point of the current patch are obtained based on the first coordinates (x1, y1) of the point of the current patch and a selected transform matrix, to obtain an occupancy map of the current patch;
obtain, by pre-projecting the current patch from a three-dimensional space to a two-dimensional space, size information of a minimum bounding rectangle corresponding to the two-dimensional space of the current patch, wherein the size information comprises an index of the relationship between the sizes of the sides of the minimum bounding rectangle;

obtain a tangent axis of the current patch and a bitangent axis of the current patch, wherein the selected transform matrix is selected from a plurality of transform matrices which correspond to different rotation angles, wherein a size of an occupancy map of a point cloud depends on the minimum bounding rectangle of the occupancy map of each patch of a plurality of patches of the point cloud;

generate one or more syntax elements indicating the selected transform matrix for the current patch, the tangent axis of the current patch, the bitangent axis of the current patch, and the size information of the minimum bounding rectangle;

encode the syntax element into a bitstream; and store the bitstream for communication toward a point cloud decoder.

2. The point cloud encoding apparatus of claim 1, wherein the selected transform matrix is a rotation matrix, and wherein the rotation matrix corresponds to a rotation angle θ of the current patch.

3. The point cloud encoding apparatus of claim 1, wherein the one or more syntax elements further include an index of the second coordinate system and information used to indicate a rotation angle θ of the current patch.

4. The point cloud encoding apparatus of claim 1, wherein the size information comprises side size information corresponding to lengths of two sides of the minimum bounding rectangle.

5. The point cloud encoding apparatus of claim 1, wherein the transformation matrix is represented as:

$$\begin{bmatrix} 1 & 0 \\ 0 & 1 \end{bmatrix}, \begin{bmatrix} 0 & -1 \\ 1 & 0 \end{bmatrix}, \begin{bmatrix} -1 & 0 \\ 0 & -1 \end{bmatrix}, \text{ or } \begin{bmatrix} 0 & 1 \\ -1 & 0 \end{bmatrix}.$$

6. A point cloud decoding apparatus comprising:

a memory containing instructions; and a processor, in communication with the memory and upon execution of the instructions, is configured to:

reconstruct a point cloud comprising one or more patches, wherein the one or more patches comprise a current patch, wherein the reconstructing process comprises:

parsing a bitstream to obtain one or more syntax elements, wherein the one or more syntax elements comprise information indicating a transform matrix of the current patch, a tangent axis of the current patch, and a bitangent axis of the current patch;

obtaining, by pre-projecting the current patch from a three-dimensional space to a two-dimensional space, size information of a minimum bounding rectangle corresponding to the two-dimensional space of the current patch, wherein the size information comprises an index of the relationship between the sizes of the sides of the minimum bounding rectangle;

determining, based on the size information, whether the tangent axis is the same as a reference tangent axis or a reference bitangent axis; and transforming second coordinates (x2, y2) of a second point of the current patch in a second coordinate system to first coordinates (x1, y1) of a first point of the current patch in a first coordinate system, wherein the first coordinates (x1, y1) of the first point of the current patch in the first coordinate system are obtained based on the second coordinates (x2, y2) of the second point of the current patch in the second coordinate system, the transform matrix, the tangent axis, and the bitangent axis, and wherein the transform matrix is selected, based on the information indicating the transform matrix, from a plurality of transform matrices which correspond to different rotation angles.

7. The point cloud decoding apparatus of claim 6, wherein the processor is further configured to reconstruct geometry information of the point cloud based on one or more first occupancy maps of the one or more patches in the point cloud.

8. The point cloud decoding apparatus of claim 6, wherein the transform matrix is a rotation matrix, and wherein the rotation matrix corresponds to a rotation angle θ of the current patch.

9. The point cloud decoding apparatus of claim 6, wherein the size information comprises side size information corresponding to lengths of two sides of the minimum bounding rectangle.

10. The point cloud decoding apparatus of claim 6, wherein the transformation matrix is represented as:

$$\begin{bmatrix} 1 & 0 \\ 0 & 1 \end{bmatrix}, \begin{bmatrix} 0 & -1 \\ 1 & 0 \end{bmatrix}, \begin{bmatrix} -1 & 0 \\ 0 & -1 \end{bmatrix}, \text{ or } \begin{bmatrix} 0 & 1 \\ -1 & 0 \end{bmatrix}.$$

11. A non-transitory computer-readable media storing computer instructions that when executed by one or more processors, cause the one or more processors to perform the steps of:

projecting a current patch from a three-dimensional space to a two-dimensional space;

transforming first coordinates (x1, y1) of a point of the current patch in a first coordinate system to second coordinates (x2, y2) of the point of the current patch in a second coordinate system, wherein the second coordinates (x2, y2) of the point of the current patch are obtained based on the first coordinates (x1, y1) of the point of the current patch and a selected transform matrix, to obtain an occupancy map of the current patch;

obtaining, by pre-projecting the current patch from a three-dimensional space to a two-dimensional space, size information of a minimum bounding rectangle corresponding to the two-dimensional space of the current patch, wherein the size information comprises an index of the relationship between the sizes of the sides of the minimum bounding rectangle;

obtaining a tangent axis of the current patch and a bitangent axis of the current patch, wherein the selected transform matrix is selected from a plurality of transform matrices which correspond to different rotation angles, wherein a size of an occupancy map of a point cloud depends on the minimum bounding rectangle of the occupancy map of each patch of a plurality of patches of the point cloud;

generating one or more syntax elements indicating the selected transform matrix for the current patch, the tangent axis of the current patch, the bitangent axis of the current patch and the size information of the minimum bounding rectangle;

encoding the syntax element into a bitstream; and storing the bitstream for communication toward a point cloud decoder.

12. The non-transitory computer-readable media of claim 11, wherein the one or more syntax elements further include an index of the second coordinate system and information used to indicate a rotation angle θ of the current patch.

13. The non-transitory computer-readable media of claim 11, wherein the transformation matrix is represented as:

$$\begin{bmatrix} 1 & 0 \\ 0 & 1 \end{bmatrix}, \begin{bmatrix} 0 & -1 \\ 1 & 0 \end{bmatrix}, \begin{bmatrix} -1 & 0 \\ 0 & -1 \end{bmatrix}, \text{ or } \begin{bmatrix} 0 & 1 \\ -1 & 0 \end{bmatrix}.$$

14. A non-transitory computer-readable media storing computer instructions that when executed by one or more processors, cause the one or more processors to perform the steps of:

reconstructing a point cloud comprising one or more patches, wherein the one or more patches comprise a current patch, wherein a reconstructing process comprises:

parsing a bitstream to obtain one or more syntax elements, wherein the one or more syntax elements comprise information indicating a transform matrix of the current patch, a tangent axis of the current patch, a bitangent axis of the current patch;

obtaining, by pre-projecting the current patch from a three-dimensional space to a two-dimensional space, size information of a minimum bounding rectangle corresponding to the two-dimensional space of the current patch, wherein the size information comprises an index of the relationship between the sizes of the sides of the minimum bounding rectangle;

determining, based on the size information, whether the tangent axis is the same as a reference tangent axis or a reference bitangent axis; and transforming second coordinates (x2, y2) of a second point of the current patch in a second coordinate system to first coordinates (x1, y1) of a first point of the current patch in a first coordinate system, wherein the first coordinates (x1, y1) of the first point of the current patch in the first coordinate system are obtained based on the second coordinates (x2, y2) of the second point of the current patch in the second coordinate system, the transform matrix, the tangent axis, and the bitangent axis, wherein the transform matrix is selected, based on information indicating the transform matrix, from a plurality of transform matrices which correspond to different rotation angles.

15. The non-transitory computer-readable media of claim 14, wherein the transformation matrix is represented as:

$$\begin{bmatrix} 1 & 0 \\ 0 & 1 \end{bmatrix}, \begin{bmatrix} 0 & -1 \\ 1 & 0 \end{bmatrix}, \begin{bmatrix} -1 & 0 \\ 0 & -1 \end{bmatrix}, \text{ or } \begin{bmatrix} 0 & 1 \\ -1 & 0 \end{bmatrix}.$$

16. A non-transitory storage medium comprising a bitstream encoded by performing the steps of:

projecting a current patch from a three-dimensional space to a two-dimensional space;

transforming first coordinates (x1, y1) of a point of the current patch in a first coordinate system to second coordinates (x2, y2) of the point of the current patch in a second coordinate system, wherein the second coordinates (x2, y2) of the point of the current patch are obtained based on the first coordinates (x1, y1) of the point of the current patch and a selected transform matrix, to obtain an occupancy map of the current patch;

obtaining, by pre-projecting the current patch from a three-dimensional space to a two-dimensional space, size information of a minimum bounding rectangle corresponding to the two-dimensional space of the current patch, wherein the size information comprises an index of the relationship between the sizes of the sides of the minimum bounding rectangle;

obtaining a tangent axis of the current patch and a bitangent axis of the current patch, wherein the selected transform matrix is selected from a plurality of transform matrices which correspond to different rotation angles, wherein a size of an occupancy map of a point cloud depends on the minimum bounding rectangle of the occupancy map of each patch of a plurality of patches of the point cloud;

generating one or more syntax elements indicating the selected transform matrix for the current patch, the tangent axis of the current patch, the bitangent axis of the current patch, and the size information of the minimum bounding rectangle; and encoding the syntax element into the bitstream.

17. The non-transitory storage medium of claim 16, wherein the one or more syntax elements further include an index of the second coordinate system and information used to indicate a rotation angle θ of the current patch.

18. The non-transitory storage medium of claim 16, wherein the transformation matrix is represented as:

$$\begin{bmatrix} 1 & 0 \\ 0 & 1 \end{bmatrix}, \begin{bmatrix} 0 & -1 \\ 1 & 0 \end{bmatrix}, \begin{bmatrix} -1 & 0 \\ 0 & -1 \end{bmatrix}, \text{ or } \begin{bmatrix} 0 & 1 \\ -1 & 0 \end{bmatrix}.$$

* * * * *

UNITED STATES PATENT AND TRADEMARK OFFICE
CERTIFICATE OF CORRECTION

Page 1 of 1

PATENT NO. : 12,165,366 B2
APPLICATION NO. : 17/145998
DATED : December 10, 2024
INVENTOR(S) : Dejun Zhang et al.

It is certified that error appears in the above-identified patent and that said Letters Patent is hereby corrected as shown below:

On the Title Page

Page 2, (56) References Cited, U.S. Patent Documents: "11,651,523 B2 5/2023 Aflaki" should read "11,651,523 B2 5/2023 Aflaki Beni"

Signed and Sealed this
Fourteenth Day of January, 2025

Derrick Brent
*Acting Director of the United States Patent and Trademark Office*